United States Patent [19]

Nagasaki et al.

[11] Patent Number: 4,926,247
[45] Date of Patent: May 15, 1990

[54] COLOR IMAGING APPARATUS INCLUDING A MEANS FOR ELECTRONICALLY NON-LINEARLY EXPANDING AND COMPRESSING DYNAMIC RANGE OF AN IMAGE SIGNAL

[75] Inventors: Tatsuo Nagasaki, Musashino; Hidetoshi Yamada, Tokyo; Hiroyoshi Fujimori, Hachioji, all of Japan

[73] Assignee: Olympus Optical Co., Ltd., Tokyo, Japan

[21] Appl. No.: 108,516

[22] Filed: Oct. 14, 1987

[30] Foreign Application Priority Data

Oct. 15, 1986 [JP] Japan .................. 61-244830
Sep. 18, 1987 [JP] Japan .................. 62-234133

[51] Int. Cl.$^5$ .................. H04N 9/09; H04N 9/07; H04N 9/077
[52] U.S. Cl. .................. 358/43; 358/41; 358/42; 358/44
[58] Field of Search .................. 358/41, 42, 43, 44, 358/50

[56] References Cited

U.S. PATENT DOCUMENTS

| | | | |
|---|---|---|---|
| 3,651,252 | 3/1972 | Land et al. | 358/212 |
| 3,953,733 | 4/1976 | Levine | 357/24 LR |
| 4,409,614 | 10/1983 | Eichler et al. | 358/80 |
| 4,495,516 | 1/1985 | Moore et al. | 358/54 |
| 4,544,945 | 10/1985 | Lewis, Jr. et al. | 358/30 |
| 4,584,606 | 4/1986 | Nagasaki | 358/209 |
| 4,642,677 | 2/1987 | Takanashi et al. | 358/43 |
| 4,692,797 | 9/1987 | Matsumoto | 358/76 |
| 4,713,683 | 12/1987 | Fujimori et al. | 358/42 |
| 4,725,880 | 2/1988 | Dischert | 358/43 |
| 4,736,244 | 4/1988 | Shiota et al. | 358/80 |
| 4,740,833 | 4/1988 | Shiota et al. | 358/80 |
| 4,780,762 | 10/1988 | Nagasaki | 358/98 |
| 4,809,061 | 2/1989 | Suzuki | 358/50 |
| 4,812,902 | 3/1989 | Fuchsberger | 358/80 |
| 4,812,903 | 3/1989 | Wagensonner et al. | 358/80 |
| 4,831,434 | 5/1989 | Fushsberger | 358/80 |

FOREIGN PATENT DOCUMENTS 53-54411 5/1978 Japan .
57-99876 6/1982 Japan .
59-158691 9/1984 Japan .

OTHER PUBLICATIONS

Yukio Endo et al., "A Photoelectric Conversion--Characteristic Control Method for Interline Transfer CCD Imager", *IEEE Transactions on Electron Devices*, vol. ED-32, No. 8, Aug. 1985, pp. 1511-1513.

Primary Examiner—James J. Groody
Assistant Examiner—Randall S. Svihla
Attorney, Agent, or Firm—Armstrong, Nikaido, Marmelstein, Kubovcik & Murray

[57] ABSTRACT

A color imaging apparatus includes means for electronically non-linearly expanding or compressing the dynamic range of an image signal output therefrom. Separate output signals of respective brightness for different colors are logarithmically compressed, inverse-logarithmically converted, then linear-matrix-converted and multipled by a compression factor of brightness level for the respective color signals to produce a logarithmically compressed color signal without varying the tone.

21 Claims, 36 Drawing Sheets

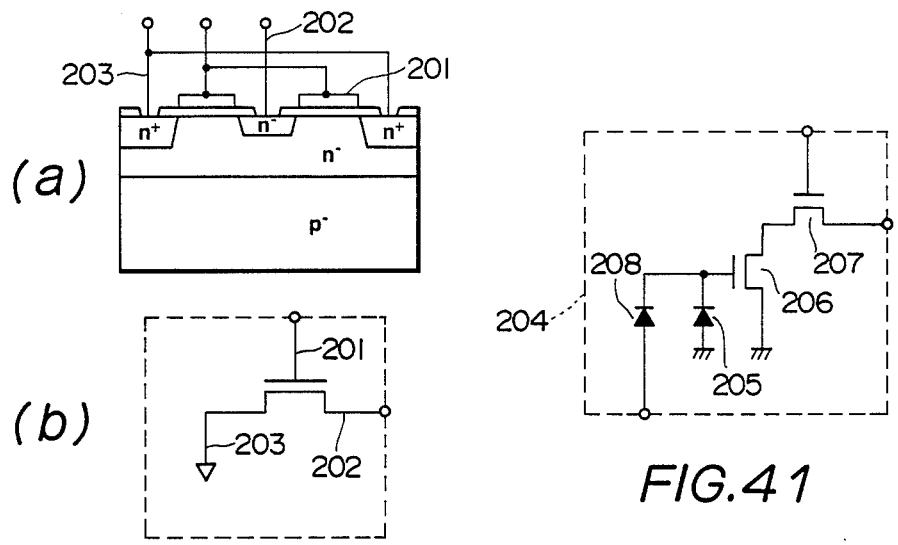
FIG.40
FIG.41
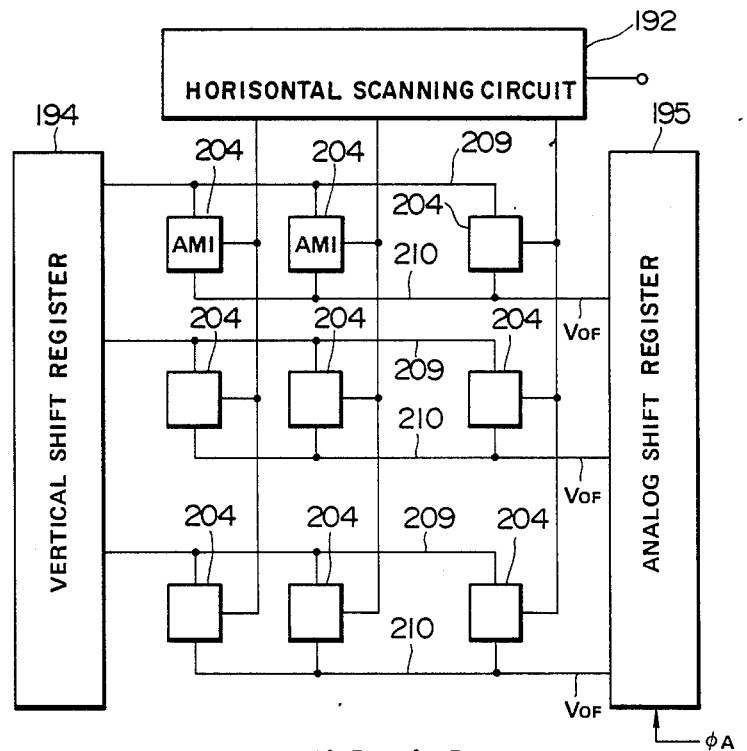
FIG.42

(a)

(b)

(c)

φPDG (a)

(b)

(a)

(b)

COLOR IMAGING APPARATUS INCLUDING A MEANS FOR ELECTRONICALLY NON-LINEARLY EXPANDING AND COMPRESSING DYNAMIC RANGE OF AN IMAGE SIGNAL

FIELD OF THE INVENTION AND RELATED ART STATEMENT

This invention relates to a logarithmic color imaging apparatus particularly having a means of expanding the dynamic range or the like It is generally said that the dynamic range of an imaging device is about 50 dB. However, the brightness difference, that is, the dynamic range of a general object to be imaged is mostly larger than this and sometimes more than 100 dB. As a means of solving this, there is such technical means as is mentioned in the gazette of Japanese patent laid open No. 52171/1985 (U.S. Pat. No. 4,584,606).

The dynamic range improving means mentioned in the gazette of Japanese patent laid open No. 52717/1985 is for black and white picture images and is not for color picture images. In the case of color picture images, it is necessary to carry out a special process in response to the properties peculiar to color picture images but, at present, there is no such concrete means. Therefore, in the case of color imaging, there have been various disadvantages and it has been difficult to obtain favorable color picture images.

OBJECT AND SUMMARY OF THE INVENTION

An object of the present invention is to provide a color imaging apparatus wherein a color picture image wide in the dynamic range can be obtained by using an imaging device narrow in the dynamic range.

Another object of the present invention is to provide a color imaging apparatus which can be made small.

Further another object of the present invention is to provide a color imaging apparatus wherein the dynamic range can be varied in response to the uses.

In the present invention, in the case of having no means of impressing a logarithmic compression controlling signal, the output of an imaging device received by different exposure amounts is logarithmically compressed and is then added to expand the dynamic range, is inverse-logarithmically converted, is then linear-matrix-converted and is multiplied by the compression factor of the brightness level for the respective color signals to produce a logarithmically compressed color signal without varying the tone.

BRIEF DESCRIPTION OF THE DRAWINGS

FIG. 1 is a principle view of the first embodiment.

FIGS. 2 and 3 are block diagrams showing the entire formation.

FIG. 4 is a diagram showing the characteristics of an imaging device.

FIG. 5 is a diagram showing the characteristics in case the outputs of two imaging devices are simply added.

FIG. 6 is a diagram showing the internal formation of a logarithmic amplifier.

FIG. 7 is a diagram showing the operation of the logarithmic amplifier shown is FIG. 6.

FIG. 8 is a diagram showing the operation of a inverse-logarithmic conversion circuit.

FIG. 9 is a diagram showing the internal formation of an inverse-logarithmic amplifier.

FIG. 40 is a diagram showing the structure and equivalent circuit of one picture element of a CMD in the eleventh embodiment.

FIG. 41 is an equivalent circuit diagram of one picture element of an AMI in the twelfth embodiment of the present invention.

FIG. 42 is a formation diagram of a device interior logarithmically imaging device apparatus using an AMI.

DETAILED DESCRIPTION OF PREFERRED EMBODIMENTS OF THE INVENTION

The operation, for example, of the first embodiment of the present invention shall be explained with reference to FIG. 1.

A color space shown by three primary color vectors of R, G and B can be considered as divided by a matrix-conversion into a brightness signal Y and a hue plane M (represented by rectangularly intersecting coordinates of R−Y and B−Y) represented as a plane perpendicular to Y. In FIG. 1, $\theta$ represents a hue, $\gamma$ represents a chromaticity and CB represents a color vector. Now, in order to expand the dynamic range of a color picture image, only the brightness signal Y may be compressed. However, as the visual colored degree $\gamma$ is standardized by the brightness Y (even if the absolute value of the colored degree is the same, if the brightness becomes twice as high, the colored degree will become ½), the colored degree $\gamma$ must be multiplied by the compression ratio of the brightness Y. That is to say, when the brightness Y is to be logarithmically compressed, R−Y and B−Y may be multiplied by log Y/Y (5 1/Y log Y. Therefore, in the formation of each embodiment, the dynamic range is expanded without any influence on the visual colored degree and hue.

Figure 2:
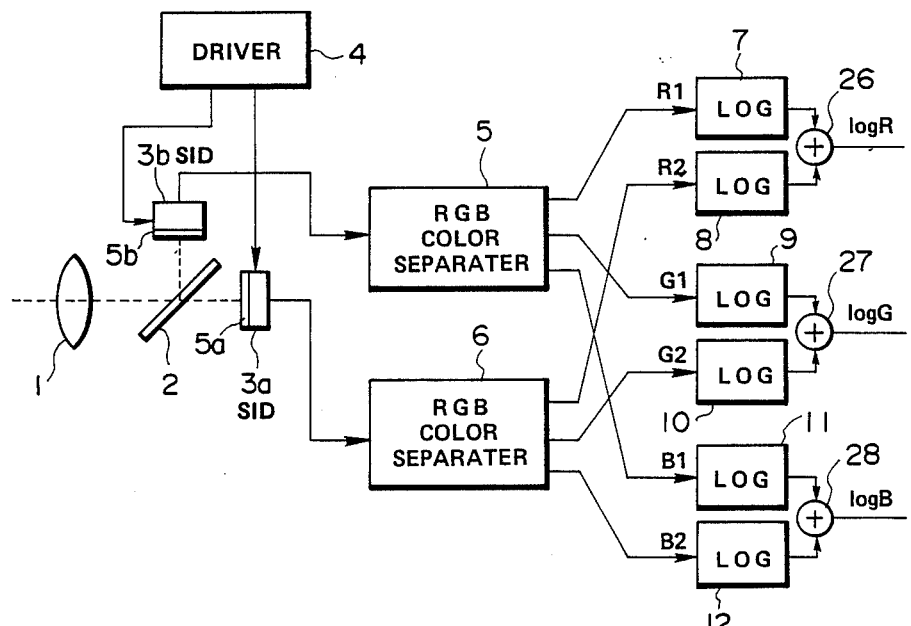
Figure 3:
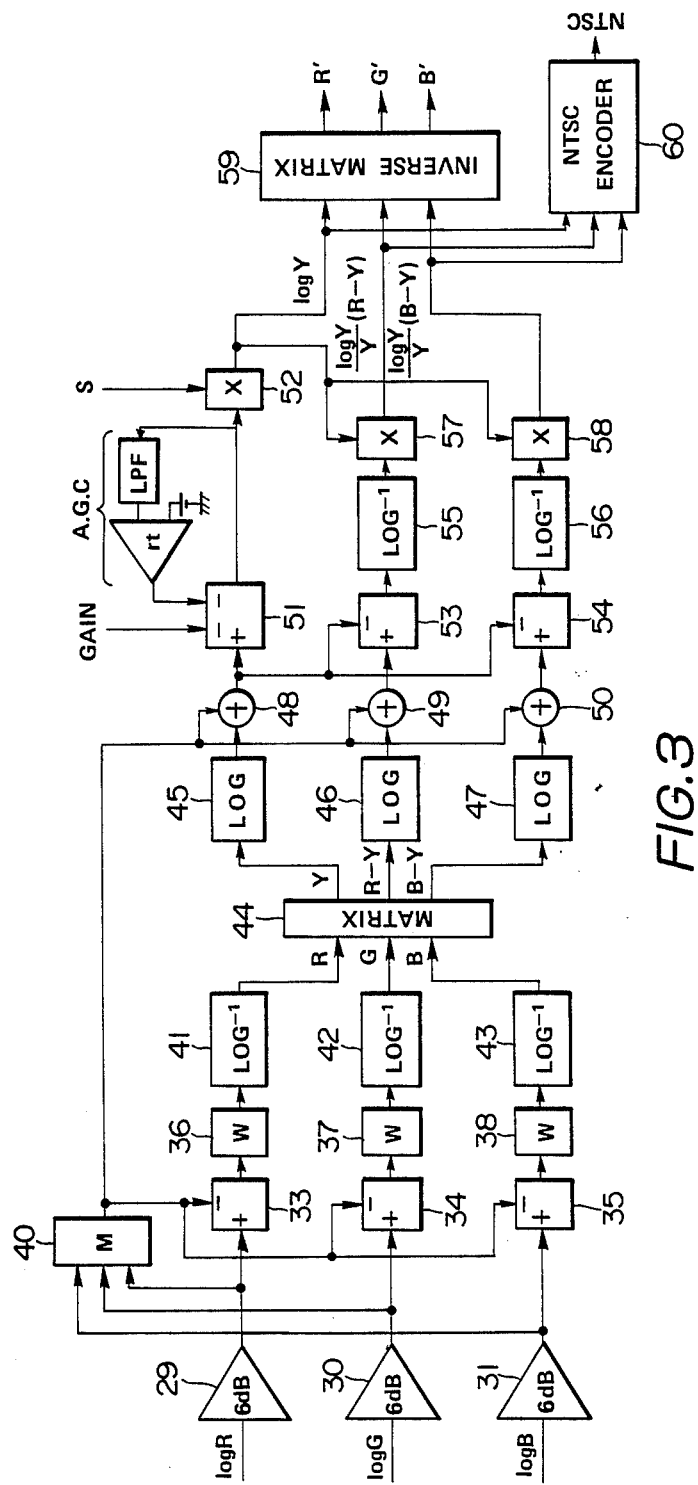

FIGS. 2 and 3 are block diagrams showing the entire formation of the first embodiment of the present invention. As shown in FIG. 2, a light image having passed through an image forming lens 1 and half-silvered mirror 2 enters imaging devices 3a and 3b. The imaging devices 3a and 3b are driven by a driving circuit 4 to convert the light image to an electric signal. By the way, on the light receiving surfaces of the respective imaging devices 3a and 3b, mosaic-like color filter arrays 5a and 5b, for example, of R, G and B are fitted so that the respective picture elements may become picture elements of R, G and B. The signal is transmitted to RGB separating circuits 6a and 6b to be separated into two sets of RGB signals.

Figure 4:
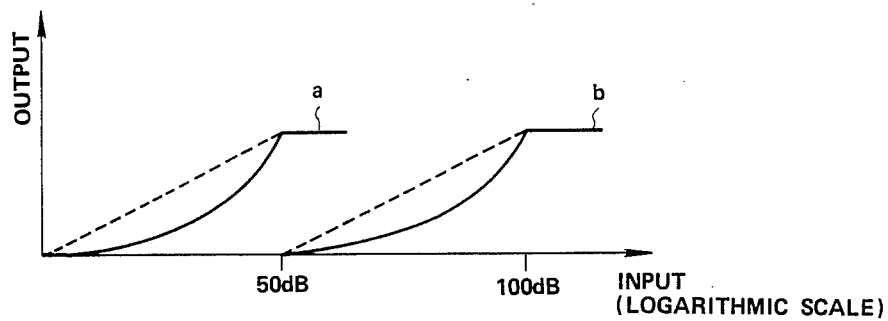
Figure 5:
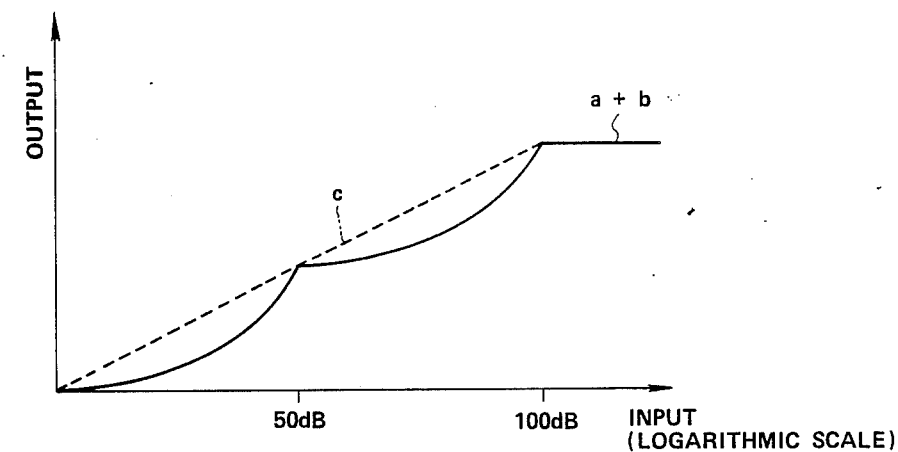

Now, if the dynamic range of the imaging devices 3a and 3b is made 50 dB and the [passed light amount]/[reflected light amount] of the half mirror 2 as a beam splitter is set at 50 dB, the imaging characteristics of the imaging devices 3a and 3b will be as in FIG. 4. The input coordinates in FIG. 4 are on a logarithmic scale. In FIG. 4, a represents an imaging characteristic of the imaging device 3a and b represents an imaging characteristic of the imaging device 3b. If the outputs of the above mentioned imaging devices 3a and 3b are simply added, a logarithmic imaging characteristic of 100 dB represented by a folded line approximation (or a curved line approximation in logarithmic scale) as in FIG. 5 will be obtained. The broken line in FIG. 5 shows an ideal logarithmic characteristic. In order to make the part of the above mentioned curved line approximation the ideal characteristic represented by the broken line as much as possible, logarithmic amplifiers 7 to 12 are used as shown in FIG. 2.

Figure 6:
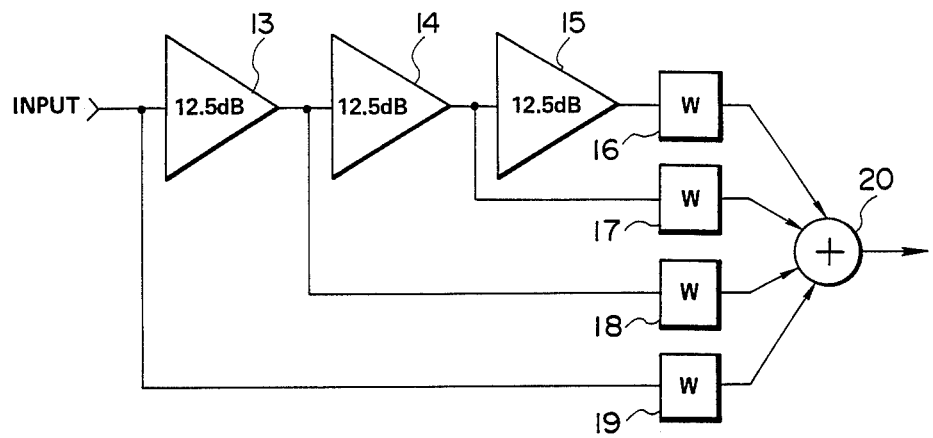

FIG. 6 is a diagram showing the internal formation of the logarithmic amplifiers 7 to 12 and is an example wherein the range (50 dB) of the curved line in FIG. 5 is made to further approximate the logarithmic characteristic by four steps of curved lines. In FIG. 6, 13 to 15 are amplifiers having respectively an amplification degree of 12.5 dB. 16 to 19 are window circuits acting as limiters with an amplitude corresponding to 12.5 dB. 20 is an adder.

Figure 7:
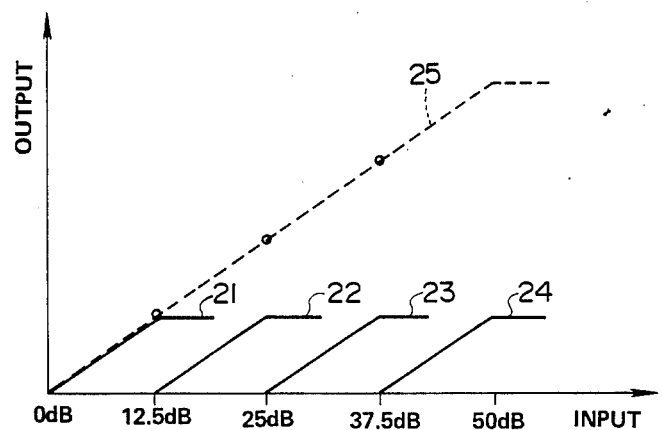

FIG. 7 is a diagram showing the operation of the logarithmic amplifiers shown in FIG. 6. The reference numeral 21 represents the output of the window circuit 16, 22 represents the output of the window circuit 17, 23 represents the output of the window circuit 18 and 24 represents the output of the window circuit 19. When these four outputs are added by the adder 20 in FIG. 6, such ideal logarithmic characteristic having a dynamic range of 100 dB as is shown by 25 in FIG. 7 can be approximated.

By the way, the case of the approximation by four steps is shown in the example in FIG. 6 but it is needless to say that, if the number of the steps is increased, a better approximation will be obtained. In fact, it is possible to work with less steps by utilizing the logarithmic characteristics of semiconductor devices used in the window circuits 16 to 19.

As understood from the above mentioned explanation, when the RGB outputs of two sets are further passed through the logarithmic amplifiers 7 to 12, ideal logarithmic characteristics will be made and, when these are added by the adders 26, 27 and 28 respectively for R, G and B as shown in FIG. 2, signals log R, log G and log B each having a more accurate dynamic range of 100 dB will be able to be obtained.

Now, as regards the color picture image, as described above, the signals log R, log G and log B must be converted to be in the form of log Y, log Y (R−Y)/Y, log Y (B−Y)/Y. The means therefore shall be explained in the following.

The fundamental principle is that the signals are inversely converted by inverse-logarithmic amplifiers and the respective color signals R, G and B are taken out, are converted to Y, R−Y and B−Y by a linear-matrix-conversion circuit and are then converted to log Y, log Y (R−Y)/Y and log Y (B−Y)/Y. However, in fact, in respect of the dynamic range of the electric circuit itself with respect to S/N, it is impossible to convert them to R, G and B signals having a dynamic range of 100 dB by the inverse-logarithmic amplifiers and then process them. Now, the relative ratio of R, G and B is considered to be unnecessary to be above 40 dB in the visual characteristic. That is to say, even above 40 dB, the difference of the brightness, colored degree and hue will not be sensed to the eye. By utilizing this visual characteristic, an inverse-logarithmic conversion circuit of the signals log R, log G and log B can be realized by a floating point system. Its concrete means shall be explained in the following.

Figure 8:
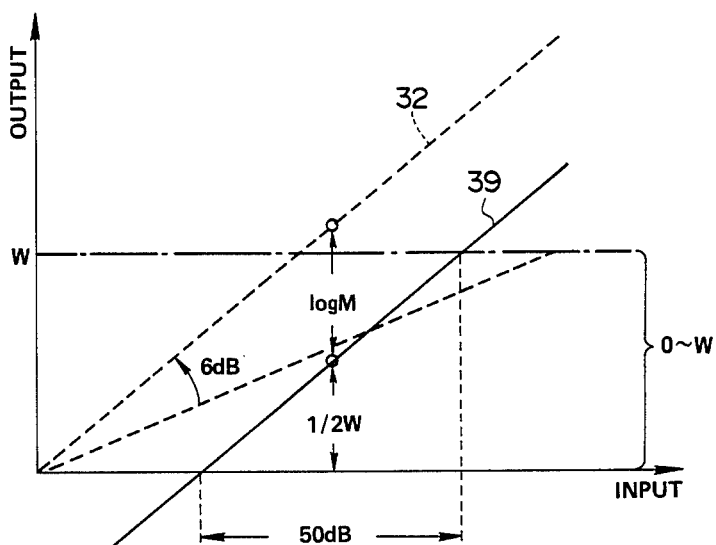

First of all, the signals log R, log G and log B are amplified to be twice as large as shown by 32 in FIG. 8 by the amplifiers 29, 30 and 31 shown in FIG. 3. Then, a dynamic subtraction is made by subtracters 33, 34 and 35 so that the actual time average value of these outputs may be always half the limiter value W of the window circuits 36, 37 and 38 in FIG. 3, that is, W/2 to make such characteristic as is shown by 39 in FIG. 8. O to W represent the window widths of 50 dB. The subtracting value log M in the above mentioned subtraction is represented by the formula $$\log M = \{(\log R + \log G + \log B)/3\} - W/2.$$

The above mentioned value log M is made by an average value operating circuit 40 shown in FIG. 3. The limiter value W of the window circuits 36, 37 and 38 corresponds to the dynamic range of 50 dB of the output of the amplifiers 29, 30 and 31. That is to say, signals in the range of 25 dB with the average value of the signals log R, log G and log B as a center will be output. Here, the window width is selected to be 50 dB, because it is set at 50 dB with a space of 10 dB for the above mentioned 40 dB. With a window width having a dynamic range of 50 dB, an inverse-logarithmic amplifier (index amplifier) can be formed with a favorable S/N ratio and the subsequent matrix-conversion process will be easy.

Figure 9:
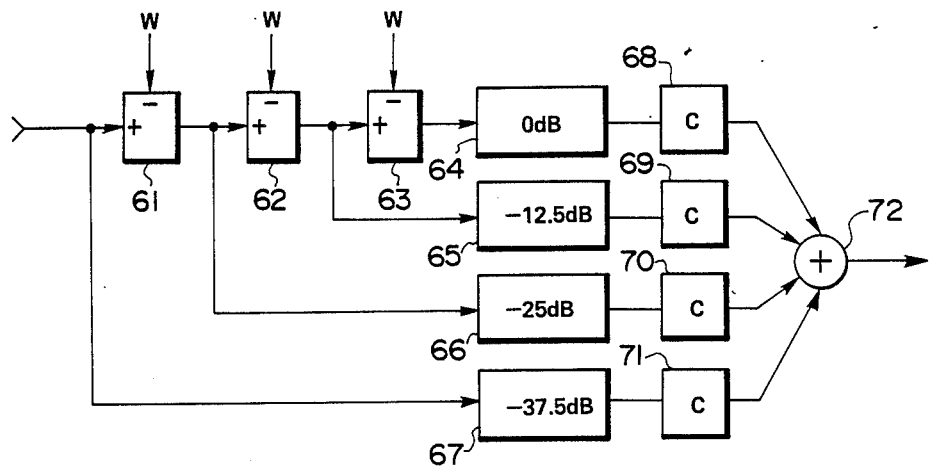

FIG. 9 is a diagram showing the internal formation of each of the inverse-logarithmic amplifiers 41, 42 and 43. In FIG. 9, 61 to 63 represent subtracters, 64 to 67 represent minus negative gain amplifiers, 68 to 71 represent clipping circuits clipping the values below 0 and 72 represents an adder.

The respective outputs of the window circuits 36, 37 and 38 shown in FIG. 3 are input into the inverse-logarithmic amplifiers 41, 42 and 43 having a dynamic range of 50 dB, are converted to be of linear values for the inputs and are then input into a matrix-converting circuit 44. The output of the matrix-converting circuit 44 is represented by the formulae:

$$Y = 0.3 [\log^{-1} (\log R - \log M) + 0.59 [\log^{-1} (\log G - \log M)] + 0.11[\log^{-1} (\log B - \log M)]$$
$$= 1/M(0.3 R + 0.59 G + 0.11 B).$$
$$R - Y = 0.7[\log^{-1} (\log R - \log M)] - 0.59 [\log^{-1} (\log G - \log M)] - 0.11[\log^{-1} (\log B - \log M)]$$
$$= 1/M (0.7 R - 0.59 G + 0.11 B).$$
$$B - Y = -0.3[\log^{-1} (\log R - \log M)]$$
$$\quad -0.59 [\log^{-1} (\log G - \log M) +$$
$$\quad 0.89[\log^{-1} (\log B - \log M)]$$
$$= 1/M(-0.3 R - 0.59 G + 0.89 B).$$

Here, $\log^{-1}$ is a range of 50 dB. That is to say $$\begin{bmatrix} Y \\ R-Y \\ B-Y \end{bmatrix} \cdot 1/M$$

wherein M is $(R \cdot G \cdot B)^{\frac{1}{3}}$ described above. The outputs of this matrix-converting circuit 44 are again input into logarithmic amplifiers 45, 46 and 47 of 50 dB, are logarithmically compressed and then have the above mentioned average value log M added by adders 48, 49 and 50. Thereby, log Y, log (R−Y) and log (B−Y) having a dynamic range of 100 dB can be compounded. Thereafter, log Y has the gain adjusted and the automatic gain controlled by an adder 51 and has the dynamic range adjusted by a multiplier 52 to be given a coefficient S. In this respect, the technical means disclosed in the above mentioned gazette of Japanese patent laid open No. 52171/1985 is used.

On the other hand, log (R−Y) and log (B−Y) have log Y which is an output of the logarithmic amplifier 45 subtracted by subtracters 53 and 54, are converted to be in the form of log [(B−Y)/Y], are then converted to be in the form of (R−Y)/Y and (B−Y)/Y by inverse-logarithmic amplifiers 55 and 56, are multiplied by log Y which is an output of a multiplier 52 by multipliers 57 and 58, are converted to be in the form of log Y/Y·(R−Y) and log Y/Y·(B−Y), are then converted to signals R', G' and B' by the inverse matrix circuit 59, are converted to NTSC signals and can be handled as ordinary color TV signals.

According to the above mentioned first embodiment, although an imaging device narrow in the dynamic range is used, the dynamic range of the color picture image can be greatly improved and a very favorable color picture image can be produced.

The second embodiment of the present invention shall be explained in the following with reference to FIG. 10. By the way, the same reference numerals are attached to the same circuits as in the first embodiment.

Figures 10, 11:
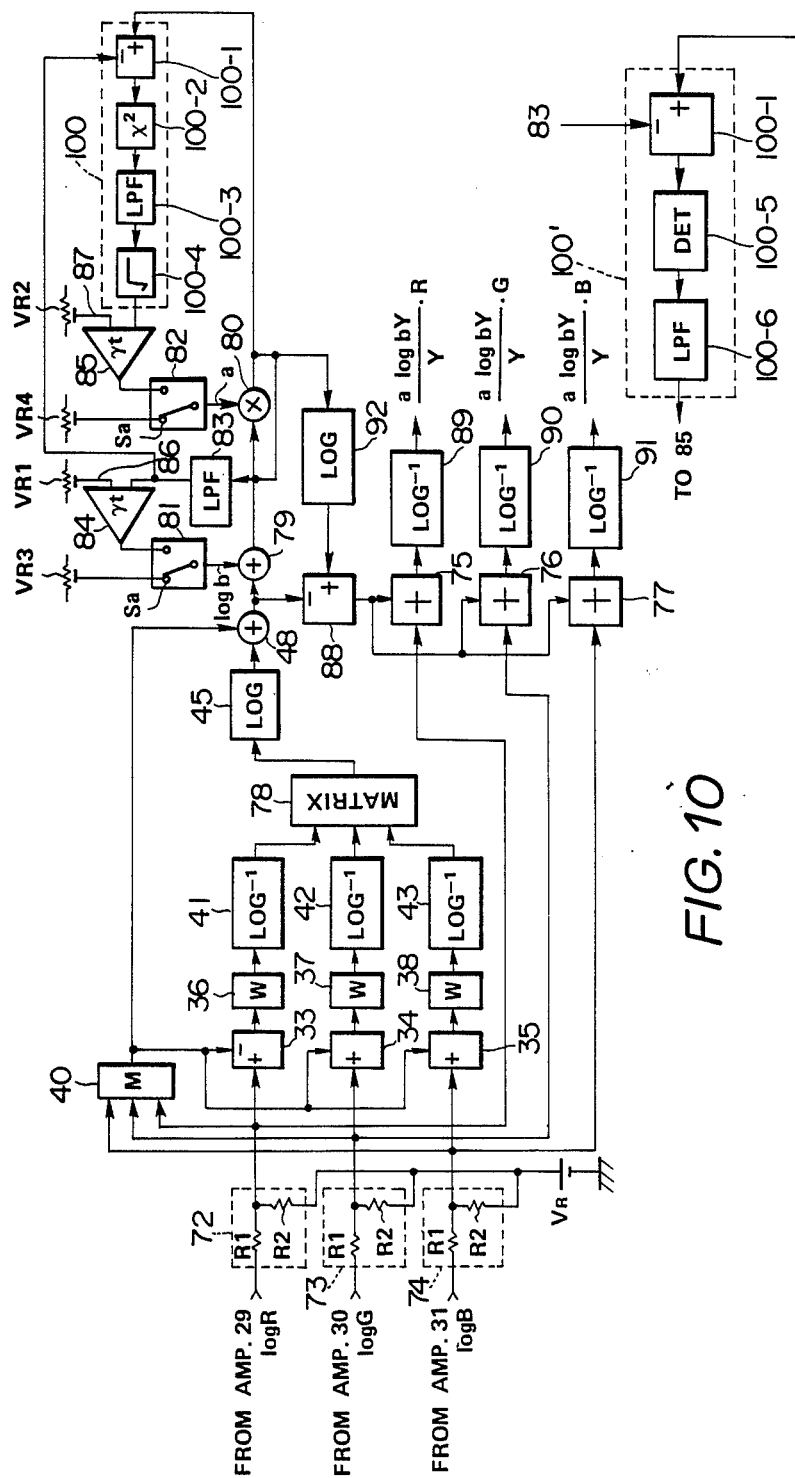
FIG. 10 is a block diagram of a color signal processing circuit in the second embodiment of the present invention.
FIG. 11 is a block diagram showing a standard deviation producing circuit of a formation different from the one shown in FIG. 10.

The outputs of the amplifiers 29, 30 and 31 shown in FIG. 3 of the first embodiment are input respectively into γ-correcting circuits 72, 73 and 74 in FIG. 10 to have γ corrected here to compensate linearity of output of the imaging device. That is to say, as the outputs of the amplifiers 29, 30 and 31 are logarithmically compressed as in log R, log G and log B, in order to γ-correct R, G and B, these signals may be multiplied by γ as shown in the following formulae:

log $R\gamma = \gamma \cdot \log R$, log $G\gamma = \cdot \log G$ and log $B\gamma = \cdot \log B$.

Figure 12:
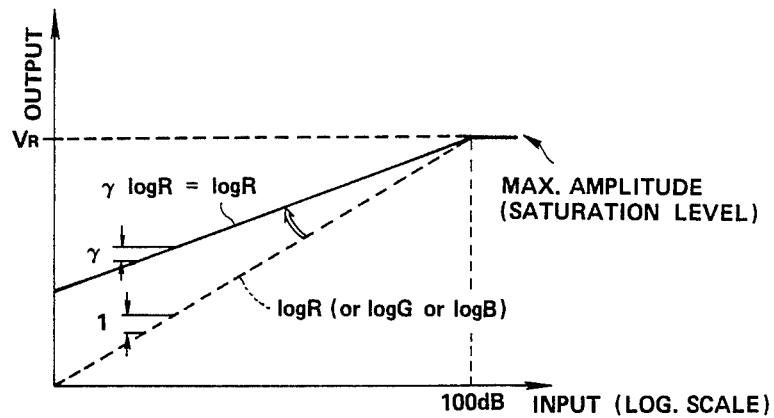
FIG. 12 is a diagram for explaining the operation of a $\gamma$ correcting circuit in the second embodiment.

Now, as usually γ<1, the γ-correcting circuit can be simply formed of subtracters by the resistance division respectively using resistances R1 and R2 as shown by 72, 73 and 74 in FIG. 10. However, so that the maximum amplitude value (saturation value) after the γ-correction may coincide with that before the correction as shown in FIG. 12, the reference voltage $V_R$ of the attenuation is set to be equal to the maximum amplitude value (saturation value) before the correction. Then, the γ-corrected signals log $R\gamma$, log $G\gamma$ and log $B\gamma$ are input into the average value operating circuit 40 having three input terminals and are input respectively into the subtracters 33, 34 and 35 and adders 75, 76 and 77. The operations of the average value operating circuit 40, subtracters 33, 34 and 35, window circuits 36, 37 and 38, inverse logarithmic amplifiers 41, 42 and 43, matrix circuit 78, logarithmic amplifier 45 and adder 48 are the same as in the above described first embodiment. The matrix circuit 78 is to make only the Y signal. The log Y (having a dynamic range of 100 dB) which is an output of the adder 48 has then the gain or automatic gain adjusted by the adder 79 and has the dynamic range or automatic dynamic range adjusted by a multiplier 80. If the gain adjusting voltage applied to the adder is represented by log b and the dynamic range adjusting voltage applied to the multiplier is represented by a, the output of the multiplier 80 will be a log (b Y). Switching switches 81 and 82 are to switch and select the automatic control and manual control respectively of the gain adjustment and dynamic range adjustment.

The principles of the automatic gain adjustment and automatic dynamic range adjustment shall be explained in the following. The automatic gain adjustment is carried out by controlling the feedback so that the average value of one picture plane, average value (which may be a square average) of a part of the picture plane or average value of a weighted part of the picture plane of a brightness signal may be constant. The automatic dynamic range adjustment is carried out by controlling the feedback so that the standard deviation value of one picture plane, standard deviation value of a part of the picture plane or standard deviation value of a weighted part of the picture plane of a brightness signal may be constant. In FIG. 10, the reference numeral 83 represents a low-pass filter for determining the above described average value of the brightness signal. The output of the low-pass filter 83 is amplified (differentially amplified) as compared with a gain reference voltage 86 (which can be set by a variable resistance VR1) by a comparing amplifier 84, is then input into the adder 79 through the switching switch 81. Thereby, a feedback loop is established and the average value (the output of the low-pass filter 83) of the brightness signal is automatically controlled so as to be equal to the gain reference voltage 86. The brightness signal thus having had the gain automatically controlled is then input into the multiplier 80. The output of the multiplier 80 is input into a standard deviation producing circuit 100 for determining the standard deviation value. First of all, the average value (the output of the low-pass filter 83) of the brightness signal is subtracted by a subtracter 100 - 1 and then waves are detected by a square wave detector 100 - 2. The average value is determined by a low-pass filter 100 - 3 and is then input into a square root circuit 100 - 4 to determine the standard deviation value of the brightness signal. This value is input into a comparing amplifier 85, is amplified (differentially amplified) as compared with a dynamic range reference voltage 87 (which can be set by a variable resistance VR2), is then input into the multiplier 80 through the switching switch 82 and is multiplied by the brightness signal. Thereby, a feedback loop is established and the standard deviation value of the brightness signal is automatically controlled so as to be equal to the dynamic reference voltage 87. By the way, the standard deviation producing circuit 100 for determining the standard deviation value shown in FIG. 10 may be simplified to be like a standard deviation producing circuit 100' shown in FIG. 11. That is to say, the average value is subtracted by the subtracting circuit 100 - 1, then the absolute value is detected by a wave detecting circuit 100 - 5 and the average value of the variance of the brightness signal may be determined. The brightness signal having had the gain and dynamic range thus controlled is then input into a logarithmic amplifier 92.

By the way, in FIG. 10, when the switching switch 81 or 82 is switched so as to be on the contact Sa side, a gain setting voltage or dynamic range setting voltage set respectively by a variable resistance VR3 or VR4 will be applied so that the gain or dynamic range may be manually controlled.

By the way, the gain or dynamic range can be selected so as to be controlled respectively manually or automatically or vice versa.

Now, in the above mentioned first embodiment, by multiplying the color signal R−Y and B−Y by the compressed degree log Y/Y of the brightness signal Y, only the brightness signal Y is compressed without influencing the hue and colored degree. In this respect, even if R, G and B are multiplied by the compressed degree log Y/Y of the brightness signal Y so as to be respectively log Y/Y·R, log Y/Y·G and log Y/Y·B, the results will be the same. This is found also from the fact that, when log Y, log Y /Y (R−Y) and log Y/Y (B−Y) are passed through an inverse matrix circuit, they will become respectively log Y /Y·R, log Y/Y·G and log Y/Y·B. Therefore, in this embodiment, the output of the multiplier 80, that is, a log (bY) is once compressed by a logarithmic amplifier 92 of 100 dB so as to be in the form of log (a log b Y). Then, by subtracting the output log Y of the adder 48 from this signal, a signal of log (a log bY/Y) is obtained. When the output of this subtracter 88 is added to log R, log G and log B respectively by the adders 75, 76 and 77, log (a log b Y/Y·R), log (a log bY/Y·G), log (a log bY/Y·B) can be obtained. Then, a log bY/Y·R, a log b Y/Y·G) and a log bY/Y·B can be obtained respectively by the inverse-logarithmic amplifiers 89, 90 and 91 of 100 dB and, as a result, only the brightness signal can be compressed without influencing the hue and colored degree. Here, the feature of the second embodiment as compared with the above mentioned first embodiment shall be described. In the first embodiment, as the color signals R−Y and B−Y have positive and negative amplitudes, the logarithmic amplifiers 46 and 47, adders 45 and 50, subtracters 53 and 54 and inverse-logarithmic amplifiers 55 and 56 must respectively calculate the signals as divided into positive and negative signals and the circuit is somewhat complicate, because the inverse-logarithm of the logarithm can take only a positive value mathematically. Now, in this second embodiment, as the process is made by only the signals R, G and B taking only positive values, the circuit is simple.

Figure 13:
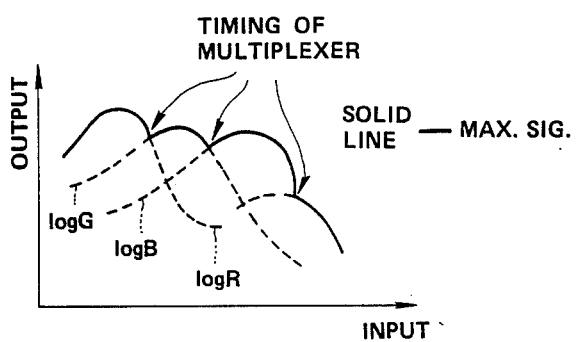
FIG. 13 is an explanatory diagram showing the switching operation of a multiplexer forming another floating point operating circuit.

Another system of the floating point system used in the above respective embodiments shall be explained in the following by using FIGS. 13 and 14.

In the above described floating system making the inverse-logarithmic conversion, for example, in FIG. 10, the input signals are log R$^\gamma$, log G$^\gamma$ and log B$^\gamma$ (in FIG. 3, log R, log G and log B) and the average value of these signals is set in the center of the window width. On the other hand, in this other floating point system, the largest signal is detected from among the input signals log R$^\gamma$, log G$^\gamma$ and log B$^\gamma$ (which may be log R, log G and log B) and is set at the upper limit of the window and the range to the level −50 dB below this upper limit is made the width of the window. Even if the signal is smaller than the width of the window, that is, a signal below −50 dB from the largest signal level is handled as of the same amplitude, as described above, it will have no influence at all on the human visual characteristic of the color picture image and will be therefore cut off. In the actual circuit, as shown in FIG. 14, the signals of log R$^\gamma$, log G$^\gamma$ and log B$^\gamma$ are input respectively into comparators 93, 94 and 95 comparing respectively log R$^\gamma$ with log G$^\gamma$, log G$^\gamma$ with log B$^\gamma$ and log B$^\gamma$ with log R$^\gamma$. The respective compared outputs are input into a read-only memory ROM (look-up table) 96 to judge the maximum value. The judging signal from the read-only memory 96 is input into a high speed multiplexer 97 and functions as a switching signal operating to be switched to a dynamic range. By this series of operations, as shown in FIG. 13, the largest signal is always selected from among the signals of log R$^\gamma$, log G$^\gamma$ and log B$^\gamma$. By the way, the low-pass filter 98 is to take switching noises. As it takes a window width of −50 dB from this maximum value, the output of the low-pass filter 98 has a voltage W corresponding to the window width of 50 dB added in an adding circuit 90 and is then input into the subtracting circuits 33, 34, and 35, is subtracted, is input into the adding circuit 48 (which is 48, 49 and 50 in FIG. 3) and is subjected to a matrix operation of a floating point system.

Now, the above embodiment can be naturally formed with the digital circuit as it is. The floating matrix operating circuit of the analogue amount shown in FIGS. 3 and 10 may be carried out by a non-linear matrix operation by the look-up table system using the read-only memory or the like after the A/D conversion or may be carried out by a digital signal processor (made LSI) of a floating decimal point operating system and will be practical in the future when the digital technique progresses.

An example in which another function is added to the present invention shall be explained in the following. As the output of the adder 48 is made by logarithmically compressing the brightness signal, when a two-dimensional bypass filter is put in after the adder 48, the multiplied noises of the illumination fluctuation and the like can be removed and the outline of structure can be enhanced efficiently. The detailed principle is mentioned in Japanese patent application No. 272885/1987 and therefore shall not explained here.

In the above described respective embodiments, the primary color signals of R, G and B are obtained from the imaging device. Such color filter as of an auxiliary color, that is, yellow (Ye), cyan (Cy) or magenta (Mg) may be used for the color imaging device. An embodiment in which such color imaging device is used shall be explained in the following.

Figures 14, 15:
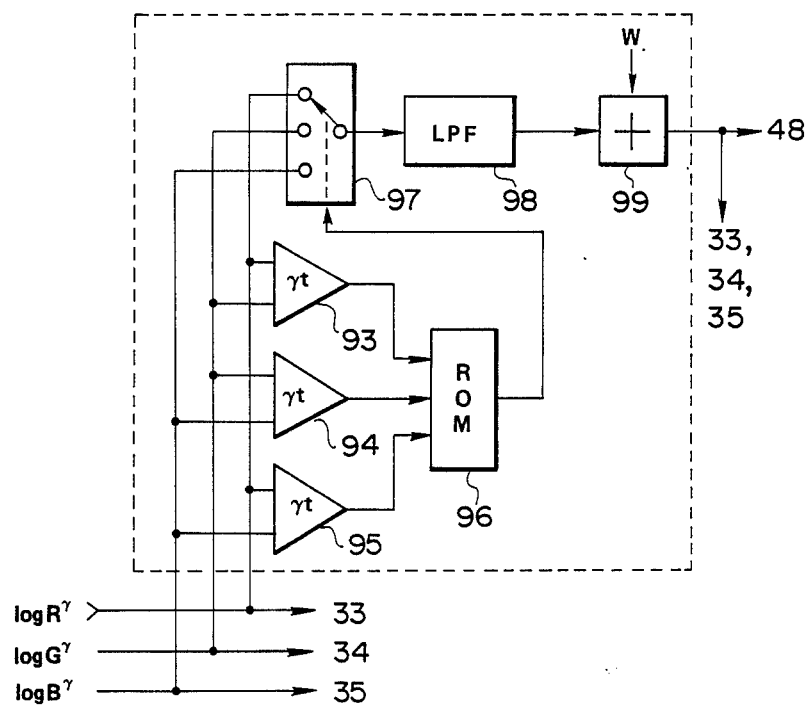
FIG. 14 is a block diagram showing the formation of the part setting a window width with the maximum level of an input signal as a reference.
FIG. 15 is an explanatory diagram showing an auxiliary color filter in the third embodiment of the present invention.
Figure 16:
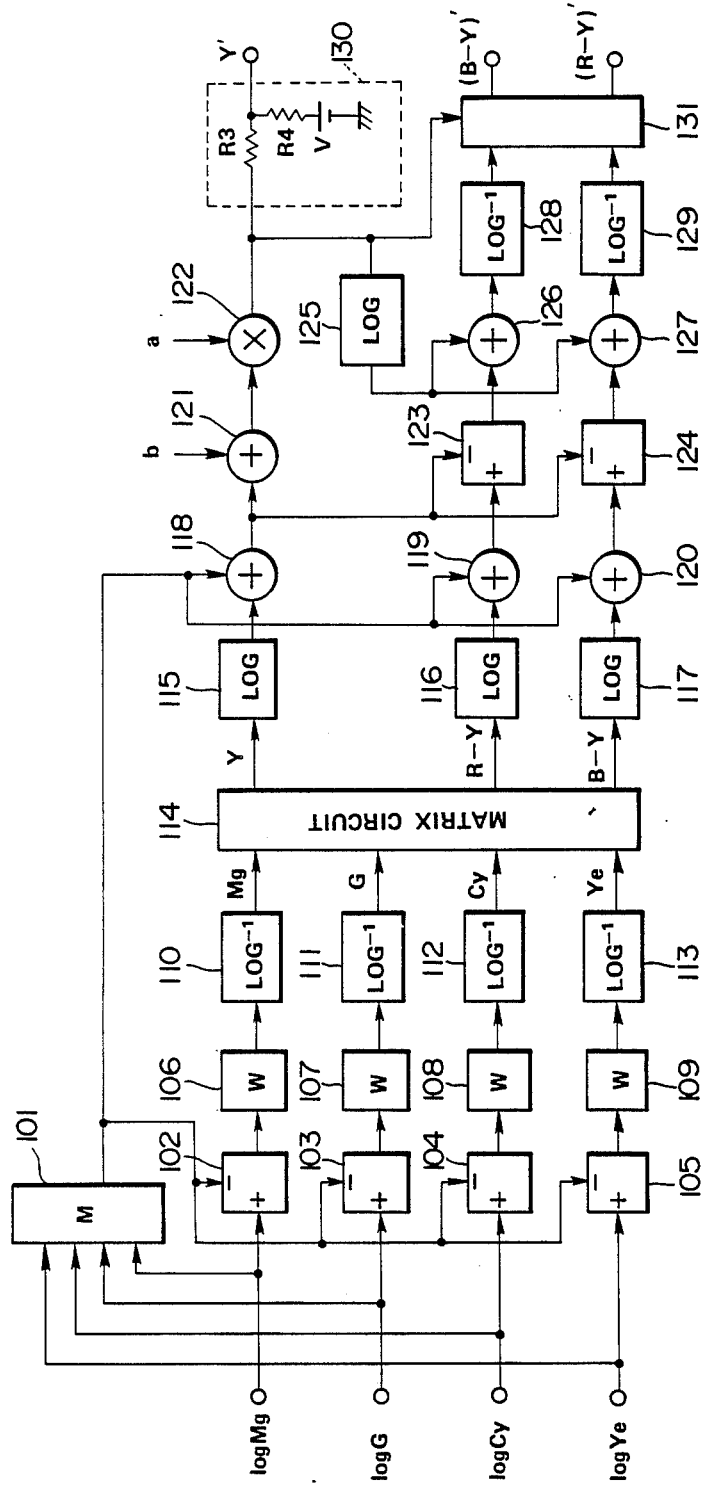
FIG. 16 is a formation diagram of a color signal processing circuit in the third embodiment of the present invention.

FIG. 15 shows an example of an auxiliary color filter in which four colors Mg, G, Cy and Ye are used. FIG. 16 shows a block diagram of a color signal processing circuit in the third embodiment. Signals log Ma, log G, log Cy and log Ye having logarithmic characteristics and obtained from an imaging device in which such auxiliary color filter as is shown in FIG. 15 is fitted to the light receiving surface are input respectively into subtracters 202 to 105. The value log M to be subtracted is given by the formula:

$$100M = \{(\log Ma + \log G + \log Cy + \log Ye)/4\} - W/2.$$

This value is produced by an average value operating circuit 101. The actual time average value of the signals output from the subtracters 102 to 105 is always half the limited value W of window circuits 106 to 109 and can be reproduced to linear signals by inverse-logarithmic amplifiers 110 to 113. (By the way, it may be made a window width from the maximum level to 50 dB below by using the system shown in FIG. 14.) The linear signals Mg, G, Cy and Ye output from the inverse-logarithmic amplifiers 110 to 113 are converted to a brightness signal Y, color difference signals R−Y and B−Y by a matrix circuit 114. It is needless to say that here the coefficient of the matrix of the operation in the matrix circuit 114 is set in response to the characteristic of the auxiliary color filter. In the case of the supplementary color filter shown in FIG. 15, if the filter passing rate is properly set, the brightness signal and color difference signal will be represented by the following formulae:

$$Y = Mg + Cy + G + Ye$$

$$R - Y = (G + Cy) - (Mg + Ye)$$

$$B - Y = (Mg + Cy) - (G + Ye)$$

That is to say, the coefficient of the matrix will be 1 and the matrix circuit 114 will be of a simple formation of only an adder or subtracter. Therefore, these signals are logarithmically compressed by logarithmic amplifiers 115 to 117 and then have log M added by adders 118 to 120 to obtain log Y, log (R−Y) and log (B−Y). The signal Y has the gain and dynamic range controlled the same as in the case shown in FIG. 10 by an adder 121 and multiplier 122. On the other hand, the signals R−Y and B−Y have the signal Y subtracted by subtracters 123 and 124, then have log (log Y) output from a logarithmic amplifier 125 added by adders 126 and 127 and are converted to linear signals by inverse-logarithmic amplifiers 128 and 129 to obtain visually corrected signals (R−Y)′=(R−Y) log Y/Y and (B−Y)′=(B−Y) log Y/Y. By the way, in case auxiliary color signals are used, the usual γ-correction will not be made. However, when the logarithmically compressed brightness signal is potentially divided by resistances R3 and R4, is passed through an attenuator 130 to which a bias voltage is given and is γ-corrected and the level of the color difference signal is adjusted in response to the brightness signal, the same effect as of the gamma correction can be obtained.

By the way, 131 represents a γ-correcting function converting circuit for correcting the color difference. The above obtained brightness signal Y′ and color difference signals (R−Y)′ and (B−Y) are converted to NTSC signals or converted to signals R′, G′ and B′ by the inverse matrix circuit.

Figure 17:
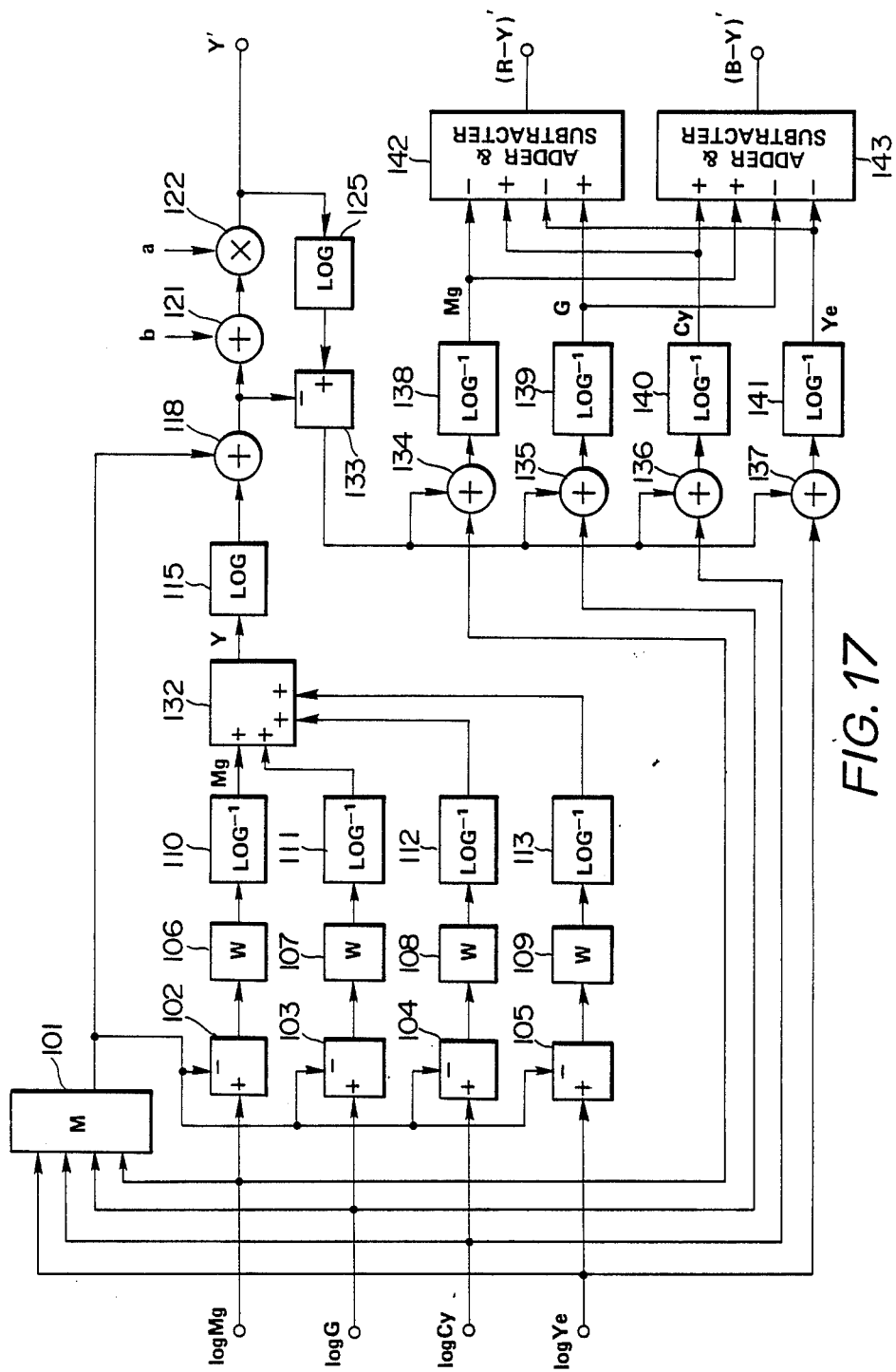
FIG. 17 is a formation diagram of a color signal processing circuit in the fourth embodiment of the present invention.

FIG. 17 shows a color signal processing circuit in the fourth embodiment. In this circuit, a color signal is processed in the case of using an auxiliary color filter. It is the same as is shown in FIG. 16 that signals of log Mg, log G, log Cy and log Ye are converted to linear signals Mg, G, Cy and Ye by an inverse-logarithmic amplifier of a floating point system. These signals are added by an adder 132 of four inputs to obtain a brightness signal Y. This brightness signal Y is further logarithmically compressed by a logarithmic amplifier 115, then has a coefficient M added by an adder 118 to be a signal log Y. This signal log Y has the gain and dynamic range adjusted respectively by an adder 121 and multiplier 122 to obtain a compressed brightness signal Y′.

The log Y signal is subtracted from the Y′ signal having passed through the logarithmic amplifier 125 by a subtracter 133 to obtain log (Y′/Y). This signal is added to log Mg, log G, log Cy and log Ye respectively by adders 134 to 137 to be signals obtained by multiplying the respective auxiliary color signals by Y′/Y. Then, four linear signals Mg·Y′/Y, G·Y′/Y, Cy·Y′/Y and Ye·Y′/Y. are obtained by inverse-logarithmic amplifiers 138 to 141 and are applied to adders and subtracters 142 and 143 of four inputs to obtain visually corrected color difference signals (R−Y)′ and (B−Y)′.

As explained above, even in case the auxiliary color filter is used, the same as in the case of the primary color signals of R, G and B, color logarithmic imaging can be made.

Figure 1:
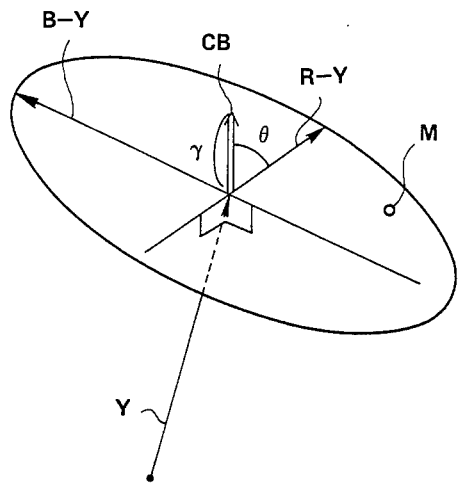
FIGS. 1 to 9 relate to the first embodiment of the present invention.

Now, in the above described respective embodiments, as shown in FIG. 1, by using two imaging devices 3a and 3b, a signal of a wide dynamic range (for example, of 100 dB) is obtained. However, if the output characteristic (photoelectric converting characteristic) on the imaging means side is made a logarithmic characteristic, the imaging device can be made one and therefore there is an advantage that the size can be made small.

The fifth embodiment of the present invention in which the output characteristic on the imaging side is made a logarithmic characteristic shall be explained in the following.

As a method of making the above mentioned output characteristic a logarithmic characteristic, it can be enumerated, for example, to logarithmically compress within the (imaging) device. It shall be explained as a concrete example to realize it by using an IL-CCD (Interline transfer type CCD) 145 provided with horizontal OFD's (overflow drains) 144 shown in FIG. 18.

In the above mentioned IL-CCD 145, vertical shift registers 147 are arranged alternately with light receiving element rows in the vertical direction and a transfer gate signal $\phi_{TG}$ is applied to transfer gates 148 arranged between the light receiving element rows 146 and vertical shift register 147 so that the signal charge accumulated in the adjacent light receiving element rows 146 may be transferred to the respective vertical shift registers 147. By applying the vertical transfer clock $\phi_v$ to the vertical shift registers 147, the signal charge can be transferred in the vertical direction to a horizontal shift register 149. By applying the horizontal shift clock $\phi_H$ for the number of picture elements in the horizontal direction to this horizontal shift register 149, a CCD output signal can be output through an output amplifier 150. By the way, the overflow drains 144 formed adjacently to the respective light receiving element rows usually have a positive voltage applied at a proper value (in the case of n channels) and have the electric charge accumulated in excess by the light receiving elements overflowed. In this embodiment, the voltage applied to these overflow drains 144 is controlled to make the output characteristic a logarithmic characteristic. By the way, the drains are earthed through a resistance R.

The method of logarithmically compressing within the device is fundamentally to vary the depth of the potential well of the respective light receiving elements of the device 145 according to the function V(t) represented by the following formula with the lapse of the exposure time t:

$$(BT-t)dV(t)/dt + V(t)$$

$$= A \log\{dV(t)/dt \cdot BT + t\}. \quad (1)$$

wherein the time t is less than the maximum exposure time (period) T, that is, $0 \leq t \leq T$, A is a constant representing the degree (dynamic range) of the logarithmic compression and B is a constant representing the gain.

Figure 19:
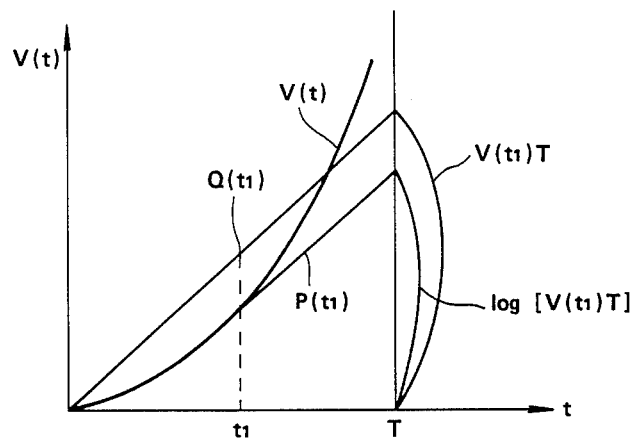
FIG. 19 is an explanatory diagram for making logarithmic compression characteristics by varying the depth of a potential well of a light receiving area of the solid state imaging device in FIG. 18 with the exposing time.

In order to lead the above mentioned formula (1), the function V(t) shown in FIG. 19 shall be considered.

In FIG. 19, the abscissa represents the time t, the ordinate represents the depth of the potential well and this function V(t) is the curve representing the variation with the time of the depth of the potential well.

That is to say, during one exposure period, at the time point of a little lapse from the exposure beginning point, the depth of the potential well will be so shallow that the light signal charge of a very low brightness will be all discharged but the light signal charge of the brightness of an intensity higher than that will be saturated with the depth of the potential well and the electric charge in excess of this saturation will be abandoned in the OFD 144.

Now, the depth of the potential well increasing with the time is represented by V(t). In this case, the electric charge amount for the depth of the potential well at each time t will be made an increasing height part and the accumulation of the light signal charge corresponding to the gradient dV(t)/dt of the tangent of V(t) at the time t will be repeated and will increase with this function V(t). The gradient dV(t)/dt of the tangent at the function V(t) at the above mentioned time t will become larger with the time t. Therefore, the substantial exposure time when, the lower the brightness component, the more the electric charge is accumulated will become longer and the signal level will increase that much. On the other hand, the higher the brightness component, the shorter the substantial exposure time and the signal increase on the high brightness level will be that much controlled.

The function V(t) can be determined as follows so that the rate of the above mentioned control may be a logarithmic compression:

The tangent $P(t_1)$ of the function V(t) at a time $t_1$ is represented by the following formula $$p(t_1) = dV(t_1)/dt \cdot t - \{dV(t_1)/dt \cdot t_1 = V(t_1)\}... \quad (2)$$

The photoelectric charge of the brightness having this gradient $dV(t_1)/dt$ will be generated by $$Q(T) = dV(t_1)/dt \cdot T... \quad (3)$$

during the exposure period and the tangent P(T) at the maximum exposure time T by $$P(T) = dV(t_1)/dt \cdot T - \{dV(t_1)/dt \cdot t_1 - V(t_1)\}... \quad (4)$$

from the formula (2) will be charged in the potential well.

Therefore, in order that the output characteristic of the device may have a logarithmic characteristic, it is necessary to establish the relation of $$P(T) = A \log\{Q(T)\}... \quad (5)$$

Now, when the incident light amount is 0 (that is, when the electric charge amount is 0), $P(T) = -\infty$ in the above mentioned formula (5). In the actual photoelectric conversion characteristic, the photoelectric charge begins at 0 and therefore it is necessary to begin P(T) also at 0. Therefore, in considering this, the above mentioned formula (5) should be $$P(T) = A \log\{Q(T) + 1\}... \quad (5')$$

(that is, equivalent to shifting the ordinate of the photoelectric conversion characteristic of the device by 1 rightward.) Also, to vary the gain is to enable T to be varied. For example, T may be multiplied by B and T in the formulae (3) and (4) may be replaced with B·T.

Therefore, from the formulae (3), (4) and (5'), the following formula is made:

$$dV(t_1)/dt \cdot B \cdot T - \{dV(t_1)/dt \cdot t_1 - V(t_1)\} = \quad (6)$$
$$A \log\{dV(t_1)/dt \cdot B \cdot T + 1\}$$

Here, the time $t_1$ is any time t from 0 to T, the above formula must be established and therefore, by replacing $t_1$ with t, the following formula is made:

$$dV(t)/dt \cdot B \cdot T - \{dV(t)/dt \cdot t - V(t) \cdot t - V(t)\} = \quad (7)$$
$$A \log\{dV(t)/dt \cdot B \cdot T + 1\}$$

When this formula (7) is arranged, it will become:

$$(B \cdot T - t)dV(t)/dt + V(t) = A \log\{dV(t)/dt \cdot B \cdot T + 1\}.$$

Thus, the formula (1) is determined.

Figure 20:
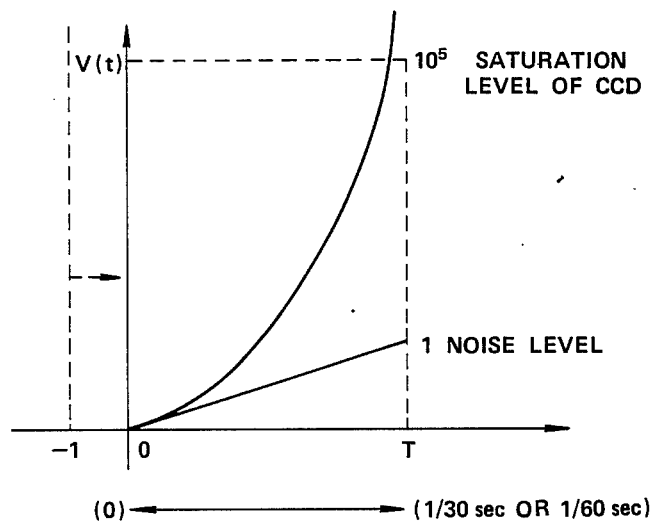
FIG. 20 is a graph showing the characteristics in case the depth of the potential well in FIG. 19 is set at the logarithmic compression characteristic.

A graph of the function V(t) satisfying the formula (1) is shown in FIG. 20.

On the actual circuit, in case a dynamic range, for example, of 100 dB is to be compressed, the constant A is so determined that the accumulated amount of such noise charge as, for example, a dark current at $t = T$ may be, for example, $1/10^5$ of the maximum saturated level E max of the device and the gain B is so determined that the light signal of 100 dB may be E max.

For information, when $A=1$ and $B=1$, V(t) will become:

$$V(t) = \log\{T/(T-t) - t/T.$$

Bt the way, here log represent a natural logarithm.

Figure 21:
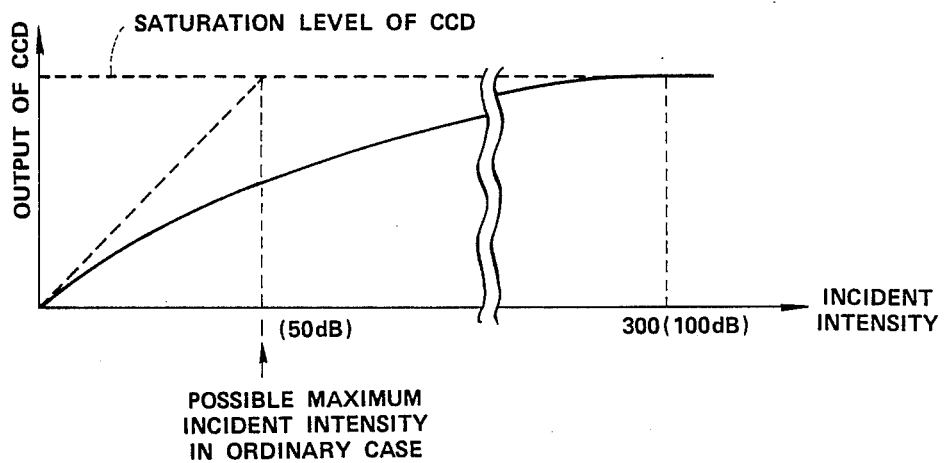
FIG. 21 is a characteristic diagram showing the input and output of the solid state imaging device in case they are set at the logarithmic compression characteristic.

FIG. 21 shows a photoelectric conversion characteristic of a device when the logarithmic compression is made within the device. However, this characteristic shows an example in which the imaging dynamic range is expanded to 100 dB by using a device of a dynamic range of 50 dB.

In the above mentioned IL-CCD 145, the depth of the potential well is varied by a method wherein the OFD gate voltage is continuously varied according to the above mentioned formula (1) from the level $V_2$ on which the barrier of the OFD gate becomes lowest and all the electric charge accumulated in the light receiving area is made to flow to the OFD to the level $V_0$ on which the barrier of the OFD gate becomes highest.

Figure 22:
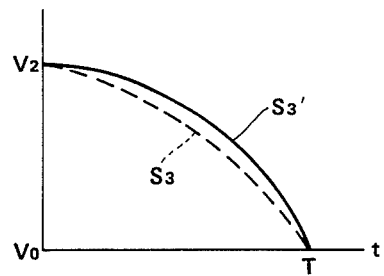
FIG. 22 is a wave form diagram of a control signal applied to an overdrain gate.

However, in fact, as the electric charge is negative, the voltage applied to the OFD gate reverses the polarity of the above mentioned formula (1), becomes a decreasing function decreasing $V_2$ and is as shown by the broken line in FIG. 22. By the way, the abscissa represents the time t and T is, for example, 1/30 sec. or 1/60 sec.

Figure 23:
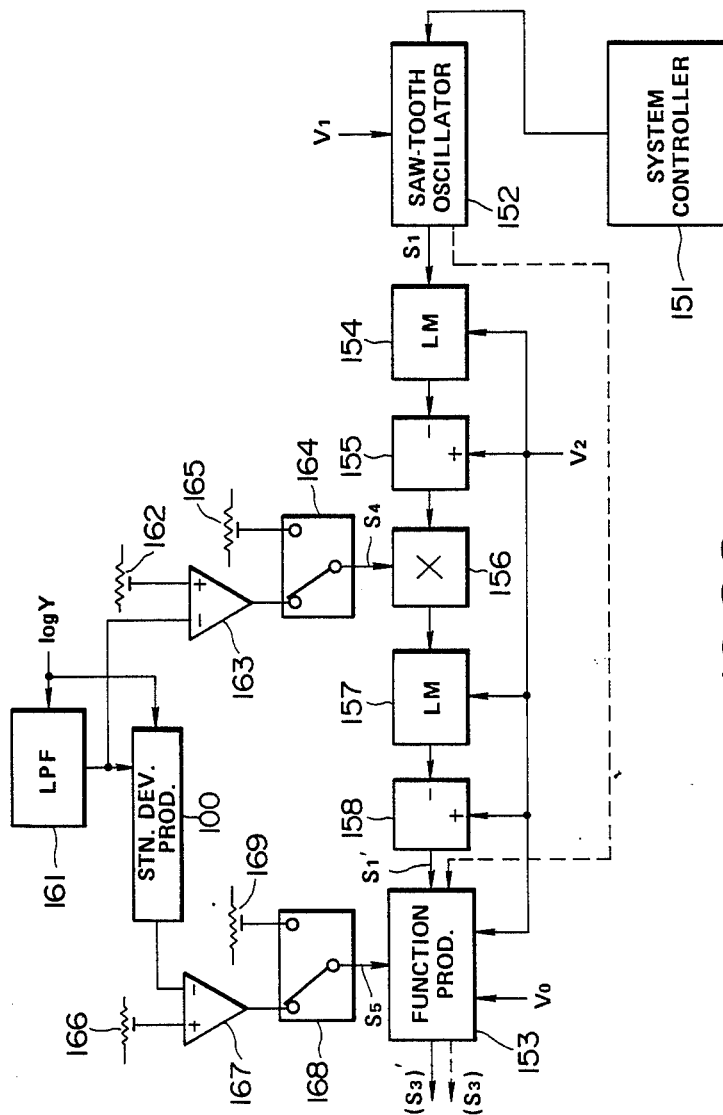
FIG. 23 is a block diagram showing the formation of a circuit generating the control signal applied to the overdrain gate.

The above mentioned OFD gate controlling signal $S_3$ is produced, for example, as follows:

FIG. 23 shows a block diagram of an OFD controlling signal generating circuit.

Figure 24:
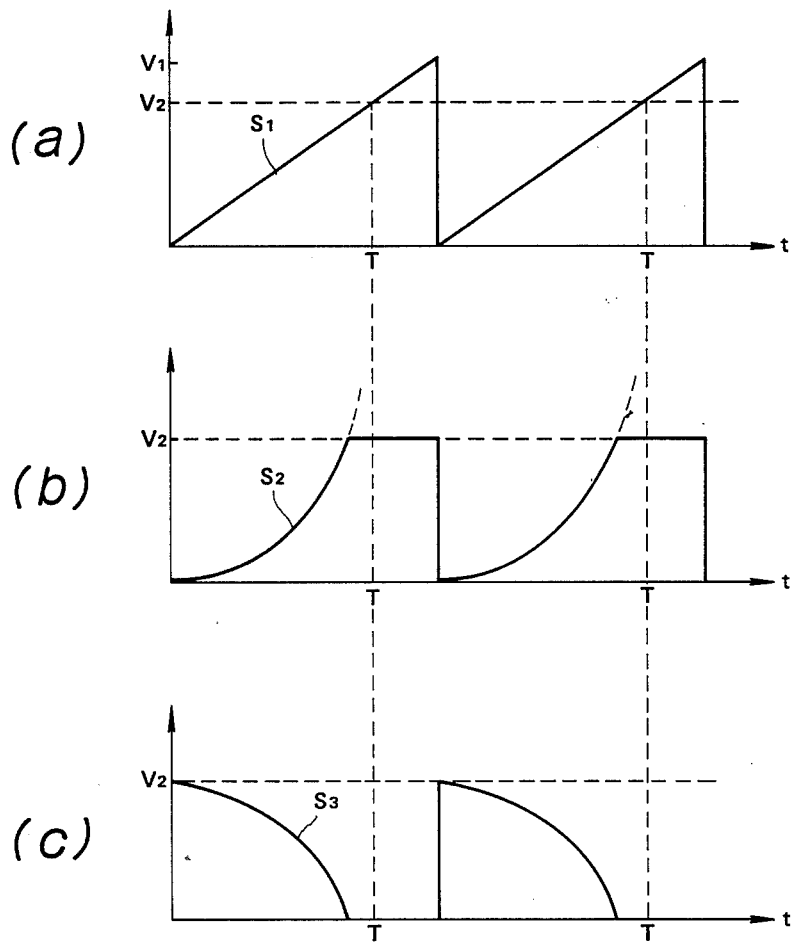
FIG. 24 is a diagram for explaining the operation of producing the control signal applied to the overdrain gate.

First of all, a fundamental system in which the gain and dynamic range are fixed shall be explained with the flow represented by the broken line in FIG. 23. A saw tooth-like wave $S_1$ shown in FIG. 24 (a) is output from a saw tooth-like wave generating circuit 152 in which the phase is synchronized by a timing signal output from a system controller 151. This saw tooth-like wave $S_1$ is of a frequency of 60 Hz (when the field is read out) or 30 Hz (when the frame is read out) and a voltage, for example, of $V_1$. However, the length part of the upper side produced when the saw tooth-like wave $S_1$ is limited by a voltage level $V_2$ lower than this peak voltage $V_1$ is so set as to correspond to a vertical blanking. This saw tooth-like wave $S_1$ is input into a function generating circuit 153 and a reverse output $S_3$ of a function curve $V(t)$ according to the above mentioned formula (1) is produced. This output $S_3$ is of a waveform shown in FIG. 24(c) in which the signal $S_2$ before being reversed shown in FIG. 24(b) is reversed. That is to say, this signal $S_3$ is of a voltage level $V_2$ when $t=0$ and is of a waveform clamped by $V_0$. By the way, by considering the $\gamma$ characteristic of the imaging device in the characteristic of this function generating circuit 153, the value of A in the formula (1) is made to have a characteristic obtained by correcting the $\gamma$ characteristic and $\gamma$ can be corrected within the device. For example, by making a control signal $S_3'$ shown by the solid line from the control signal $S_3$ shown by the broken line in FIG. 22, a signal having had $\gamma$ corrected can be output. When $\gamma$ is thus corrected within the device, the $\gamma$-correcting circuit provided in the video signal processing part will become unnecessary and the circuit can be simplified. (In this case, the broken line parts B in FIGS. 25 and 43 will become unnecessary.)

Now, the object to be imaged may be a bright object or may be, on the contrary, a dark object. The object may be wide or narrow in the dynamic range.

Therefore, in case it is not necessary to image the information of all the objects always with the same compression characteristic, it is effective to control the gain (automatic gain control expressed briefly by AGC or manual one) or control the dynamic range (automatic dynamic range control expressed briefly by ADC or manual one).

The above mentioned gain control can be made by controlling the exposure time and B in the formula (1) may be made variable. In the control circuit for this gain control, as shown in FIG. 23, the output signal $S_1$ of the saw tooth-like wave generating circuit 152 is input into a limiter 154, is limited by the voltage level $V_2$, is then input into a subtracter 155 and is subtracted from the voltage $V_2$. This subtraction output is input into a multiplier 156, is multiplied by a gain controlling signal $S_4$, is again input into a limiter 157, is limited with the voltage $V_2$, is input into a subtracter 158 and is subtracted from the voltage $V_2$. The output signal $S_1'$ of this subtracter 158 is input into a function generating circuit 153. At this time, the gain controlling signal $S_4$ is a log Y signal from a color logarithmically imaging signal processing part (See FIG. 25.) in the later step. An integrated value for one field (or for one frame) is determined by passing this log Y signal through LPF 161 and is input into the other input terminal of a comparing amplifier 163 in which a voltage set on a proper level by a variable resistance 162 is applied to one input terminal and the compared amplified output signal $S_4$ is input into the multiplier 156 through a switching switch 164, is multiplied and is controlled by AGC. When the imager switches this switching switch 164, the gain can be controlled manually by multiplying the voltage set at any value by the variable resistance 165.

The signal $S_4$ output through the above mentioned switching switch 164 corresponds to B in the formula (1).

Also, the dynamic range is controlled by controlling the characteristic of the above mentioned function generating circuit 153 with the dynamic range controlling signal $S_5$.

At this time, the dynamic range controlling signal $S_5$ is produced as follows.

First of all, the same as the gain controlling signal $S_4$, the log Y signal passed through the LPF 161 and the log Y signal before being passed through this LPF 161 are input into a standard deviation producing circuit represented by the reference numeral 100 in FIG. 10 (or 100' in FIG. 11) to obtain a signal output from this circuit 100.

This signal is applied to the other input terminal of a comparing amplifier 167 (which is provided independently of the gain control and in which a variable resistance 166 capable of being set on a proper level is applied to one input terminal and the compared output which has been passed through this comparing amplifier 167 and which is a dynamic range controlling signal $S_5$ passed through a switching switch 168 is input into the function generating circuit 153 to control the dynamic range by ADC. Also, instead of controlling it by ADC, the imager may switch the switching switch 168 to the manual side and may manually control it with a value set freely by a variable resistance 169. Here, the signal $S_5$ corresponds to A of the formula (1).

In the embodiment shown in the above mentioned FIG. 23, the manual and automatic controls can be made respectively with the switching switches 164 and 165.

Figure 25:
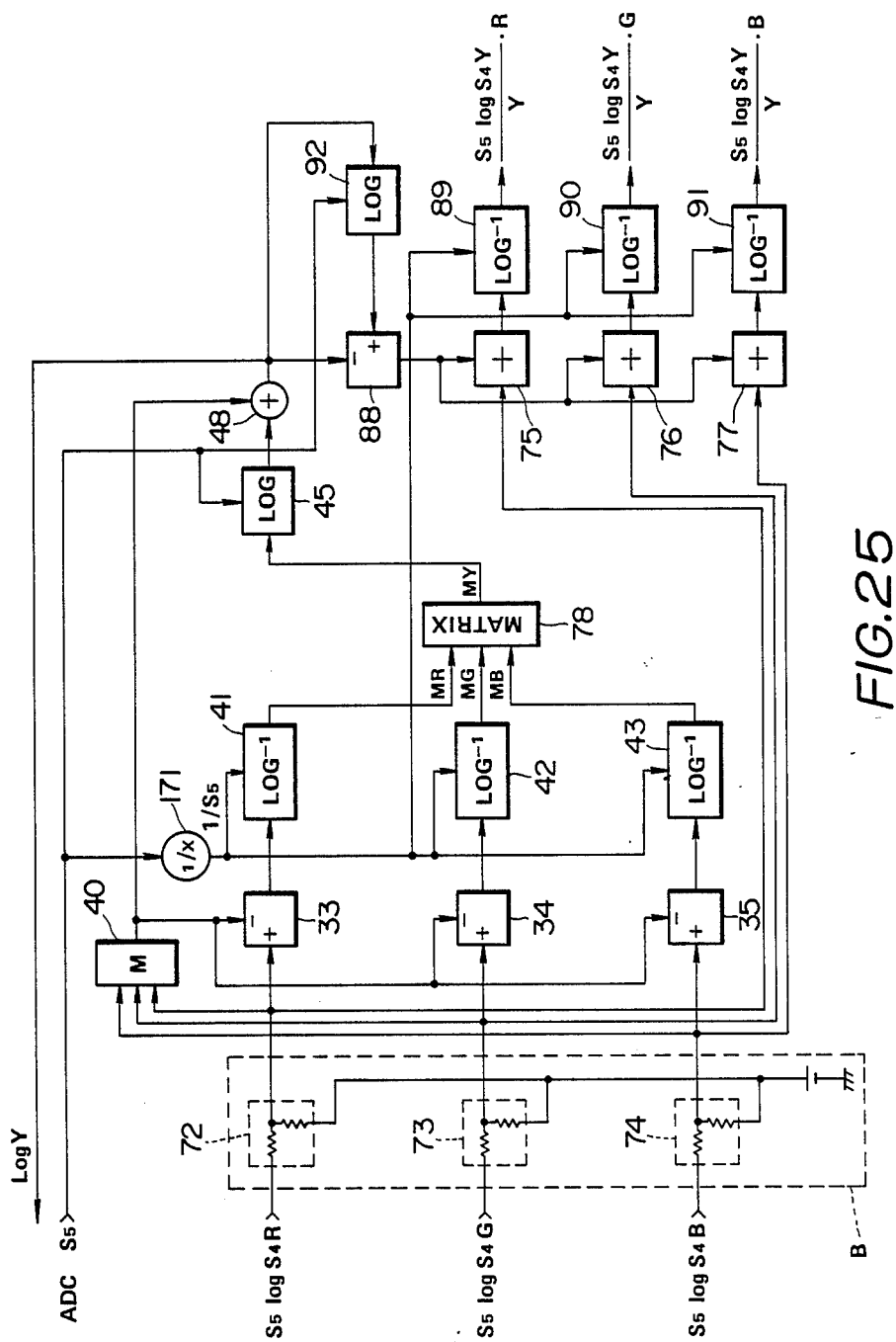
FIG. 25 is a formation diagram of a color video processing part in the fifth embodiment.

The color logarithmically imaging video signal processing part in this fifth embodiment is shown in FIG. 25.

In this embodiment, the logarithmic characteristic is automatically or manually variable.

Now, in the color logarithmically imaging video signal processing part, in the case of a floating operation, the video is once made linear, is then matrix-converted and is again logarithmically converted.

If the logarithmic characteristic of the output from the device is fixed, the inverse logarithmic amplifiers 41 to 43 and 89 to 91 and logarithmic amplifiers 45 and 92 may be fixed correspondingly.

However, in case the logarithmic characteristic of the output from the device is variable within the device or in the front step of the color logarithmically imaging video signal processing part, it is necessary to vary the characteristics of the inverse-logarithmic amplifiers 41 to 43 and 89 to 91 and logarithmic amplifiers 45 and 92 in response to its occasional logarithmic characteristic.

Therefore, the dynamic range controlling signal $S_5$ is used. First, $1/S_5$ is made by a divider 171 for the inverse-logarithmic amplifiers 41 to 43 and 89 to 91 and the characteristics of the inverse-logarithmic amplifiers 41 to 43 and 89 to 91 are controlled by using this signal 1/S₅ to make the correction.

Also, the correction is made by controlling the characteristics of the logarithmic amplifiers 45 and 92 by using the signal S₅ as it is for the logarithmic amplifiers 45 and 92.

The color signals MR, MG, MB passed through the above mentioned inverse-logarithmic amplifiers 41 to 43 have the brightness signal MY produced by the matrix circuit 78 and are input into the logarithmic amplifier 45. By the way, in the case of correcting $\gamma$ characteristic within the device, that is, in the case of using $S_3'$ instead of the signal S₃, the broken line B will be unnecessary.

In the above mentioned fifth embodiment, the logarithmic compression is made by controlling the OFD gate. However, in the sixth embodiment of the present invention, the same function is realized by an accumulated potential control (controlling the depth of the potential well) by using the FT-CCD (frame transfer type CCD) 173 shown in FIG. 26. (However, even in the IL-CCD, if the light receiving part is made a MOS photodiode instead of a diffusing photodiode, the same principle will be used.)

Figure 26:
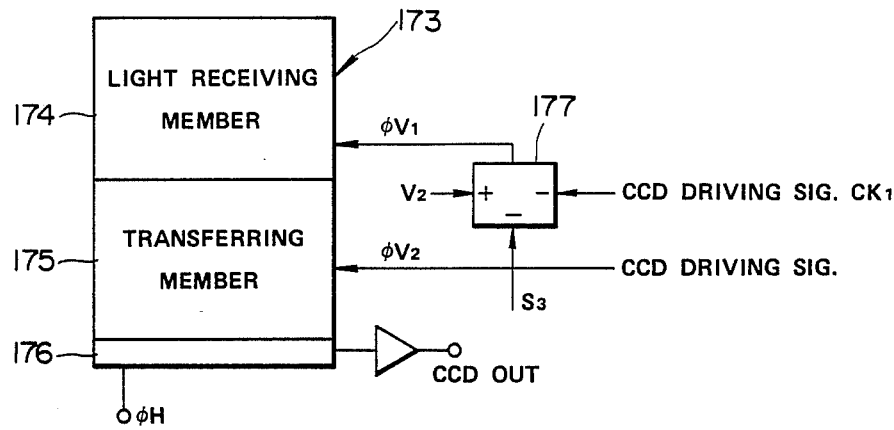
FIG. 26 is a formation diagram of a color video processing part in the sixth embodiment of the present invention.
Figure 27:
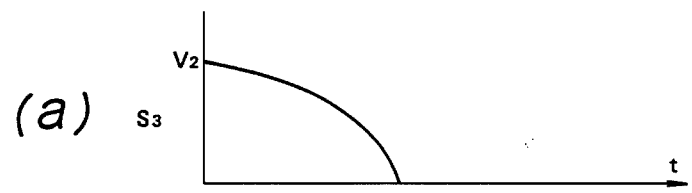
FIG. 27 is a timing chart for explaining the operation of the sixth embodiment.
Figure 27:
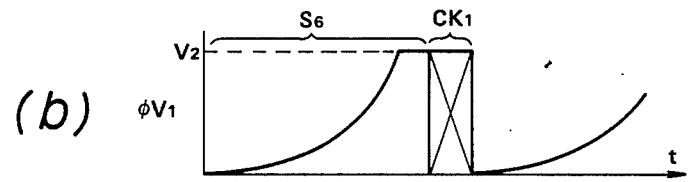
Figure 27:
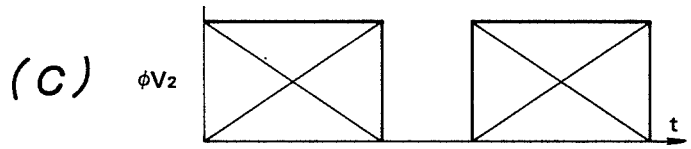
Figure 27:
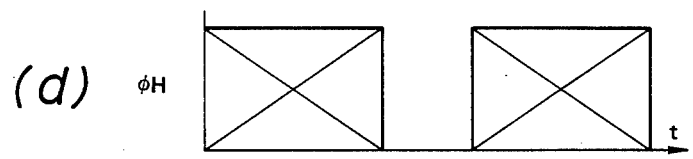

In FIG. 26, the FT-CCD 173 is provided with a transferring part 175 adjacently to the light receiving part (or accumulating part) 174 and, in an ordinary using method, the signal charge accumulated in the light receiving part 174 is transferred to the transferring part 175 by the application of a high speed vertical transferring signal CK₁. After the charge is transferred to this transferring part 175, a part of it is transferred in the vertical direction by a vertical transferring clock $\phi V_2$ shown in FIG. 27(i c), then it is repeated to apply a horizontal shifting clock $\phi H$ (See FIG. 27(d).) of the number of picture elements in the horizontal direction to the horizontal shift register 176 and a CCD signal is output through the output amplifier.

Now, in this embodiment, before the above mentioned vertical transferring clock CK₁ is applied, an accumulated potential controlling signal S₆ is applied as shown in FIG. 27(b) to be made an electric charge signal of a logarithmic compression characteristic and then the high speed transferring clock CK₁ is applied as described above and is transferred to the transferring part 175. That is to say, in this embodiment, the accumulated potential controlling signal S₆ and vertical transferring clock CK₁ are applied to the light receiving part 174 and are combined to be represented by a control signal $\phi V_1$.

As shown in FIG. 26, the above mentioned control signal $\phi V_1$ obtained by subtracting (however, in the case of applying it to the IL-CCD, it is not necessary to subtract the CCD driving signal CK₁) the CCD driving vertical transfer signal CK₁ from the signal S₆ (See FIG. 27(b).) provided by subtracting the signal S₃ (See FIG. 27(a).) from the voltage V₂ by the subtracter 177 is applied to the accumulating gate of the light receiving part 174. In this case, instead of subtracting the signal S₃ from the voltage V₂, the signal (shown in FIG. 24(b) before being reversed within the function generating circuit 153 shown in FIG. 23 may be added to V₂.

Also, $\phi V_1$ has been converted to a proper level when output from the subtracter 177.

Figure 28:
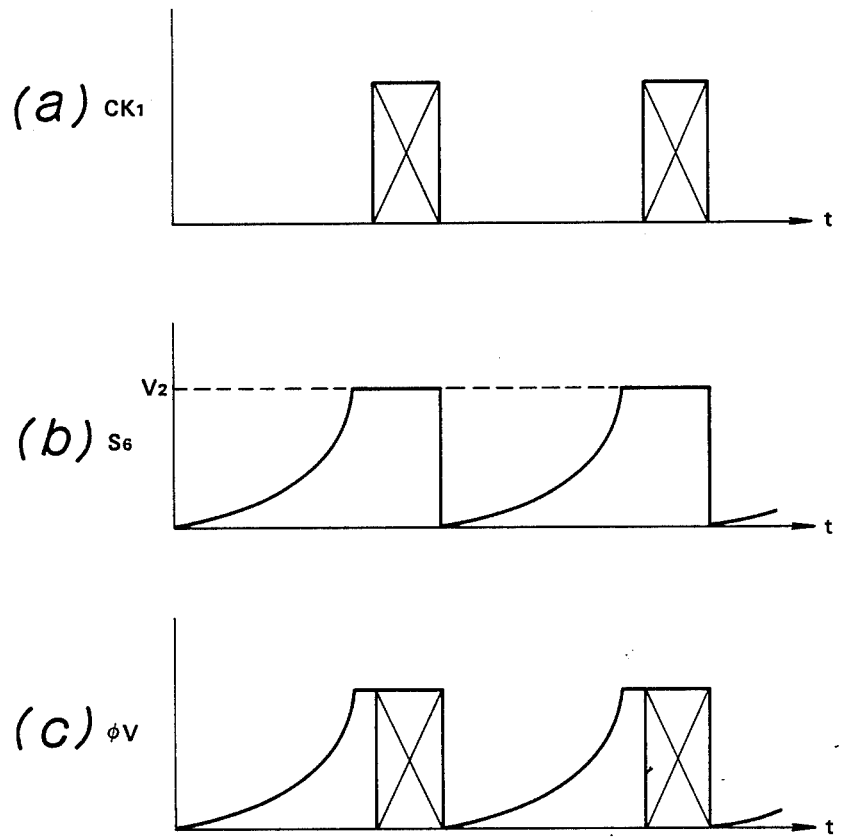
FIG. 28 is a timing chart for explaining the operation to produce a control signal for an accumulated potential in the sixth embodiment.

FIG. 28 shows how the above mentioned control signal $\phi V_1$ is produced. That is to say, the signal CK₁ shown in FIG. 28(a) is subtracted from the signal S₆ shown in FIG. 28(b) and produced by subtracting the signal S₃ from the voltage V₂ by the subtracter 177 to produce the signal $\phi V_1$.

Now, in the above mentioned fifth embodiment, in the case of the IL-CCD, the logarithmically compressed characteristic is realized by controlling the OFD gate. However, as in the seventh embodiment, the logarithmic compression within the device can be made by controlling the transfer gate.

Figure 29:
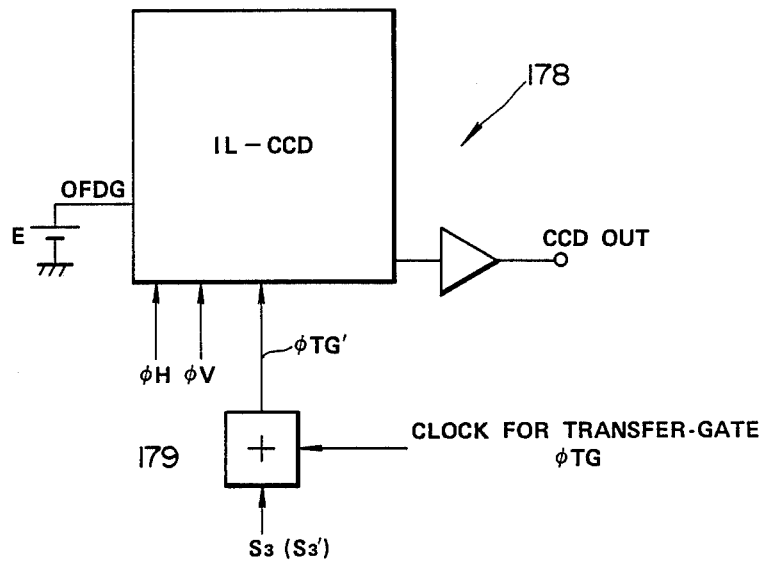
FIG. 29 is an explanatory view showing a solid state imaging device in the seventh embodiment.

FIG. 29 shows a logarithmically compressed IL-CCD 178 within the device by the transfer gate control in the seventh embodiment.

In this logarithmically compressed IL-CCD 178 within the device, a positive voltage V₀ is applied to the OFD gate of the IL-CCD and, in case the signal charge accumulated in the light receiving part becomes in excess, it will be made to flow to the OFD gate side (when above the voltage V₂ level). In the ordinary using method, the signal charge accumulated in the light receiving part is transferred to the vertical shift registers by the application of the transfer gate clock $\phi_{TG}$ and, except at the transferring time, is prevented from leaking to the vertical shift register side. However, in this embodiment, the logarithmically compressed characteristic is made by applying such control signal as leaks a part to the vertical shift register side at the time of accumulating the electric charge.

Figure 30:
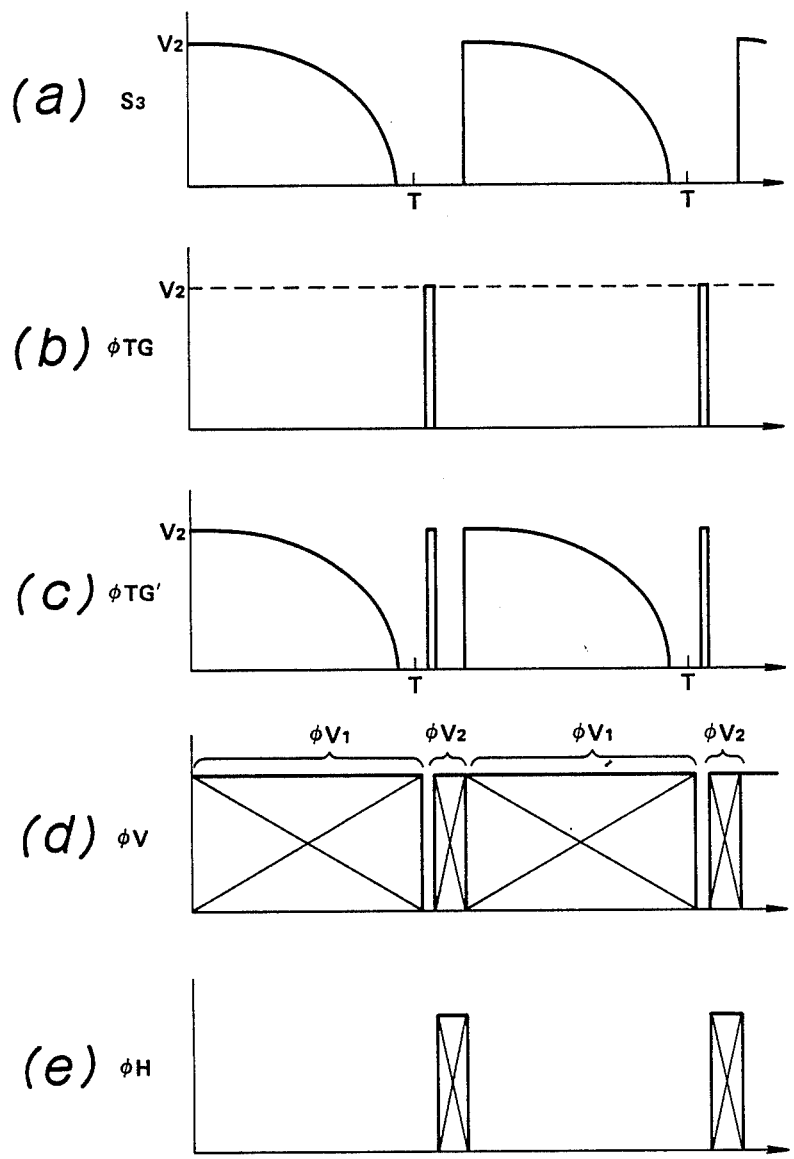
FIG. 30 is a diagram for explaining the device interior logarithmically compressing operation by the solid state imaging device shown in FIG. 29.

Therefore, the control signal S₃ shown in FIG. 30(a) and the transfer gate signal $\phi_{TG}$ shown in FIG. 30(b) are added by the adder 179 and such logarithmic compression controlling signal $\phi_{TG}'$ as is shown in FIG.(c) is produced and is applied to the transfer gate terminal. By the way, the above mentioned transfer gate signal $\phi_{TG}$ is output from a system controller.

The $V_{TG}'$ has been converted to a proper level when it is output from the adder 179.

The control signal S₃ shown in FIG. 30(a) is applied at the time of accumulating the electric charge (exposure time) and the electric charge part leaking to the vertical shift register side due to this control signal S₃ is swept out by the vertical transfer clock $\phi V_1$ shown in FIG. 30(d). Therefore, it is preferable to give this vertical transfer clock $\phi V_1$ the maximum clock velocity within the allowable range of the imaging device. On the other hand, the signal charge transferred to the vertical shift register by the transfer gate signal $\phi_{TG}$ output after one exposure time is logarithmically compressed through the output amplifier by the vertical transfer clock $\phi V_2$ and horizontal shift register clock $\phi H$ shown in FIGS. 30(d) and (e) to output a logarithmically compressed CCD signal. In this case, the clock $\phi V_2$ and clock $\phi H$ are output as synchronized with each other. (However, $\phi V_2$ and $\phi H$ are applied as displaced from each other by ½ in the phase.)

In this seventh embodiment, the vertical shift register has a function of sweeping out the excess electric charge in addition to the function of vertically transferring signal charge and therefore the capacity of absorbing the overflow charge can be improved.

Figure 31:
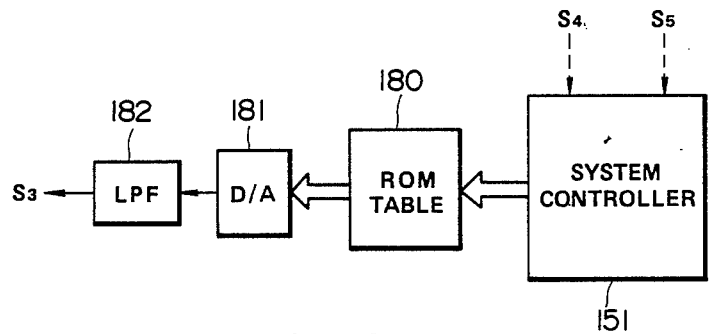
FIG. 31 is a block diagram showing the formation of a digital type control signal generating circuit in the eighth embodiment of the present invention.

Further, in the above mentioned embodiment, a control signal for making a logarithmically compressed characteristic is produced in the analogue circuit but, as shown, for example, in FIG. 31, a control signal can be produced also in the digital circuit.

Figure 32:
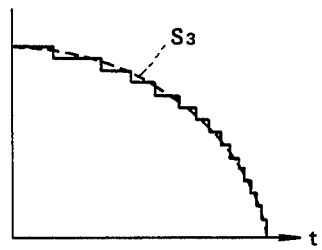
FIG. 32 is a waveform diagram of the control signal generated by the control signal generating circuit in FIG. 31.

In the control signal generating circuit in the eighth embodiment, as shown in FIG. 31, the output signal of a system controller 151 is applied to the address terminal of a look-up table (such as a ROM table) 180, the read-out data are converted to an analogue signal by a D/A converter 181 and this analogue signal is passed through an LPF 182 having a proper cut-off characteristic to be smoothed to produce a control signal $S_3$. The signal input into the above mentioned D/A converter 181 is a fine step-like signal shown by the solid line in FIG. 32 and is converted to an analogue signal by the D/A converter. The signal passed through the LPF 182 is a control signal $S_3$ shown by the broken line in the same FIG. 32.

In the above mentioned eighth embodiment, the gain is controlled by varying the clock velocity in response to the above mentioned signal $S_4$ in the system controller 151 and the dynamic range is controlled the same by controlling the address to the look-up table 180 in response to the above mentioned signal $S_5$ and reading out the information of the corresponding curve.

Figure 34:
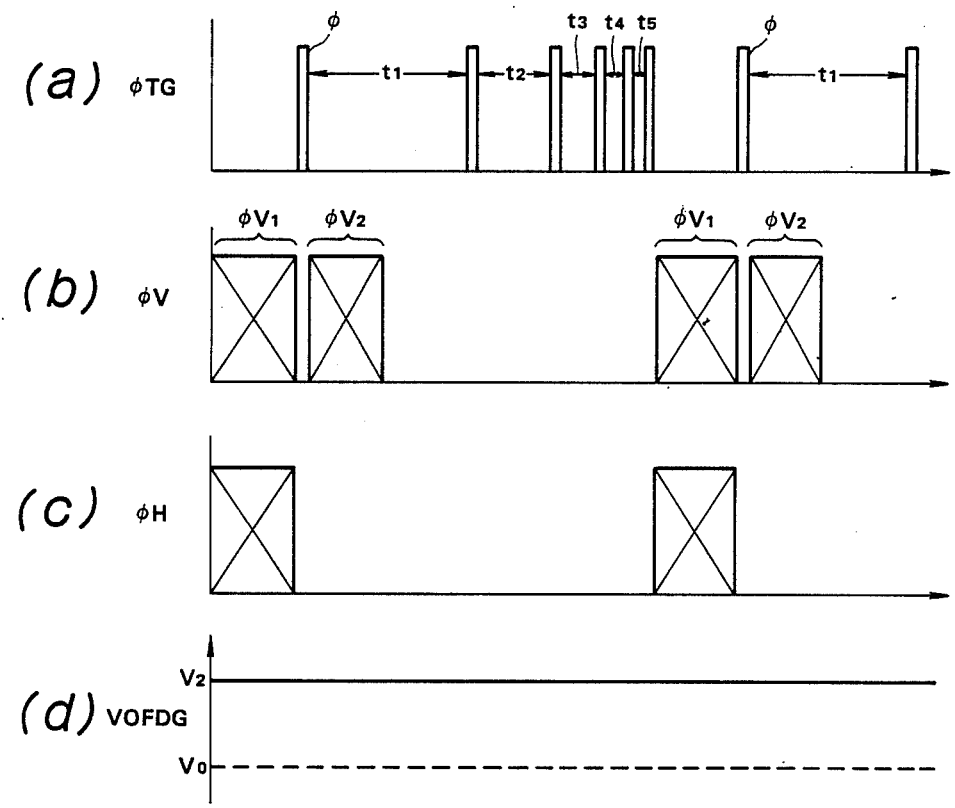
FIG. 34 is a diagram for explaining the operation of the ninth embodiment.

As another embodiment of the respective embodiments for obtaining the above mentioned logarithmically compressed characteristic within the device, the method shown in FIG. 34 may be used.

In the ninth embodiment of the present invention, as shown in FIG. 34, the exposure and the transfer to the vertical shift registers are N times during one exposure period, the charge amounts for the N times are added on the vertical shift registers and the logarithmic compression within the device is made.

Figure 33:
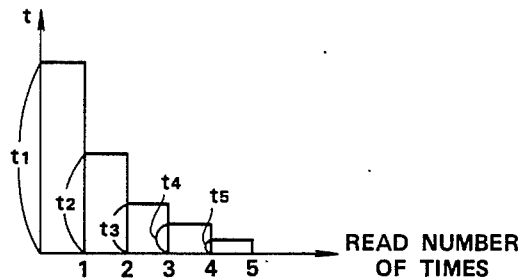
FIG. 33 is a diagram for explaining the method of logarithmically compressing within the device in the ninth embodiment.

However, at this time, the exposure time by once, twice . . . Nth time is non-linearly reduced in response to the formula (1) as shown in FIG. 33 and the OFD gate voltage is so set that the height of the gate may be 1/N of the normal height. After T times of reading out (to the vertical shift registers), the signal charge is read out the same as in ordinary reading out.

As shown in FIG. 34(a), just after the respective exposure times $t_1, t_2, \ldots$ the transfer gate clock $\phi_{TG}$ is applied, the signal charge accumulated during the respective exposure times is transferred to the vertical shift registers and is added by the shift registers. (Explained as applied to the IL-CCD in FIG. 18.) Just after the addition of the signal charge for the exposure time of N times, as shown in FIGS. 34(b) and (c), the vertical transfer clock $\phi V$ and the horizontal shift register clock $\phi H$ are applied to output a CCD signal from the output terminal.

Now, the unnecessary signal charge accumulated in the light receiving part while the CCD signal is being output the same as in ordinary reading out after N transfer gate clocks $\phi_{TG}$ are applied is swept out by applying one of the transfer gate clocks (shown by $\phi$ in FIG. 34(a)) and then applying the vertical transfer clock $\phi V_2$ for the number of the picture elements in the vertical direction as shown in FIG. 34(b) (then applying clocks for the number of the horizontal picture elements not illustrated to the horizontal shift register). By the way, the voltage $V_1$ in which the gate height is 1/N (here, for example, 1/5) for the voltage $V_0$ when the gate height is 1 is applied to the OFD gate as shown in FIG. 34 (d).

Thus, in this embodiment, a curved line characteristic making the photoelectric converting output characteristic of the CCD approximate the logarithmic characteristic is obtained.

The tenth embodiment of the present invention wherein the system of logarithmically compressing the signal within the imaging device and outputting it is applied to an X—Y address type imaging device instead of the CCD shall be explained in the following. In the X—Y address type imaging device, in order to successively scan the picture elements within the picture plane, the timings of starting and ending the exposure for the respective picture elements are different. Therefore, a consideration is required in the case of the signal compression. In the case of determining the timings of starting and ending the exposure by also using a mechanical shutter or in the case of using it in an endoscope of a field sequential system, the same as in the system described above in the CCD, pulses compressing the signal at a timing common to all the picture elements may be applied. However, in the general case, the exposure timing for the respective picture elements is different and therefore it is necessary to apply signal compressing pulses at a different timing. The case of applying this method to an SIT (Static Induction Transistor) which is an X—Y address type imaging device shall be explained in the following.

Figure 35:
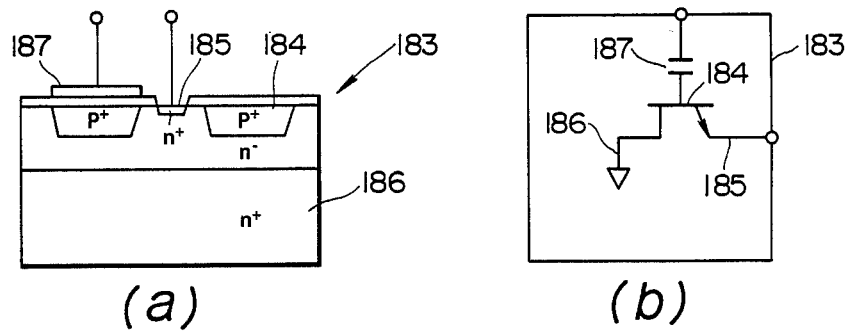
FIG. 35 is a diagram showing the structure and equivalent circuit of one picture element in the tenth embodiment of the present invention.
Figure 36:
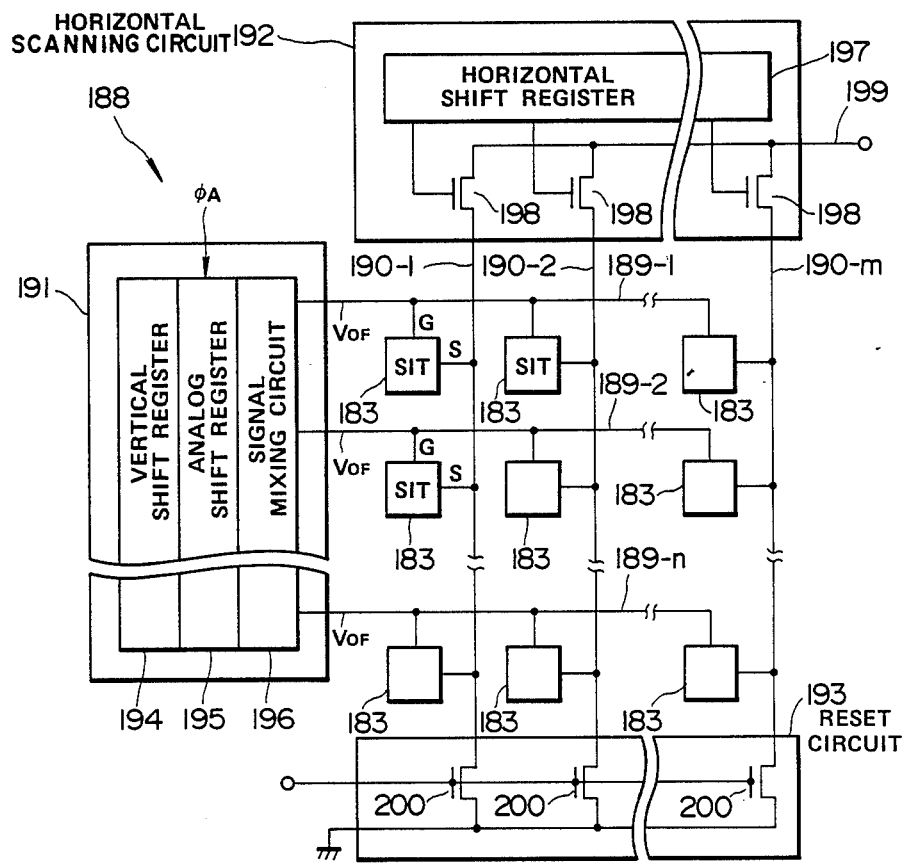
FIG. 36 is a formation diagram showing a solid state imaging device apparatus logarithmically compressing within the device in the tenth embodiment.

FIG. 35 shows the formation of one picture element 183 of an SIT image sensor, (a) shows a structure and (b) shows an equivalent circuit. When a light enters the picture element 183 shown in FIG. 35, holes will be accumulated on the gate 184, the gate potential will rise and the current flowing between the source 185 and drain 186 will increase. By the way, the reference numeral 187 represents a capacitor connected to the gate 184. The current between the above mentioned source 185 and drain 186 is detected from each picture element to obtain a video signal. The method of compressing the output signal in such imaging device is described in the above on Japanese patent application No. 213488/1983. Therefore, an imaging device in which a logarithmically compressed characteristic is obtained by using the principle shown here shall be explained. FIG. 36 shows the entire circuit formation of an imaging device apparatus 188.

In this imaging device apparatus 188, the picture elements 183 shown in FIG. 35 are arranged in the form of a matrix. The gates 184 of the respective elements are connected respectively to lines 189-1, 189-2, . . . , 189-n. The sources 185 are connected respectively to columns 190-1, 190-2, . . . , 190-m. The drains 186 of the respective picture elements 186 are connected in common to all the picture elements. The lines 189-i (i=1, 2, . . . , n) are connected to a vertical scanning circuit 191. The columns 190-i (i=m 1, 2, . . . , m) are connected to a horizontal scanning circuit 192 and resetting circuit 193.

the vertical scanning circuit 191 is provided with a vertical shift register 194, analogue shift register 195 and signal mixing circuit 196. The horizontal scanning circuit 192 is provided with a horizontal shift register 197, horizontal selecting switch 198 and video line 199. The resetting circuit 192 consists of a resetting switch 200. Signal waveforms showing the operation timing of the above mentioned imaging apparatus 188 are shown in FIG. 37.

Figure 37:
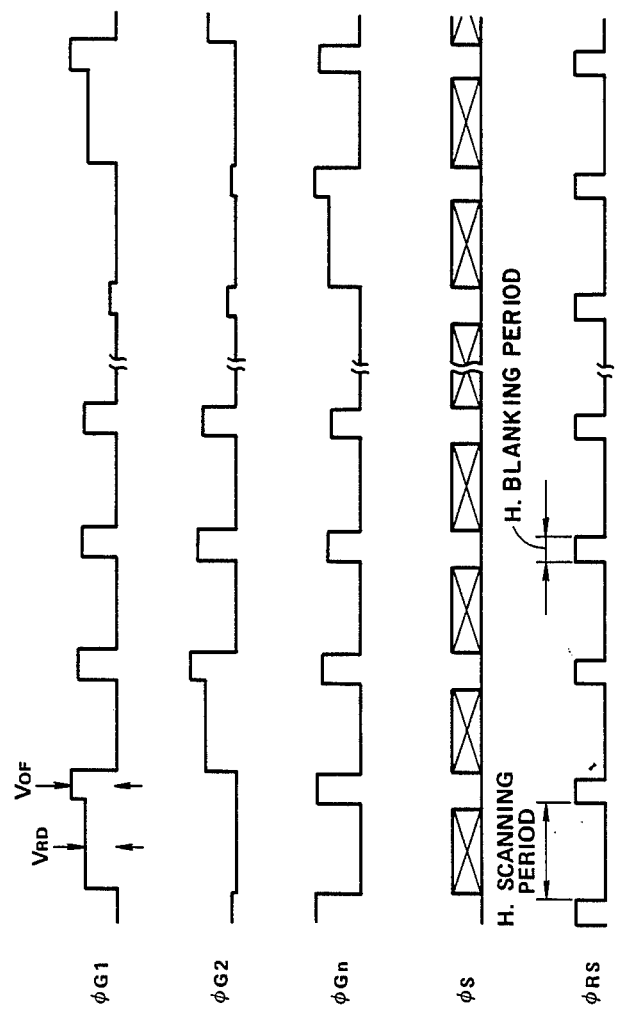
FIG. 37 is a timing chart for explaining the operation of the tenth embodiment.

In FIG. 37, $\phi S$ represents a pulse output from the horizontal scanning circuit 192. $\phi_{G1}, \phi_{G2}, \phi_{Gn}$ represent pulses output from the vertical scanning circuit 191. $\phi_{RS}$ represents a pulse to be applied to the resetting circuit 193.

The operation of the imaging device apparatus 188 shown in the above mentioned FIG. 36 shall be explained in the following with reference to FIG. 37.

In the respective pulses $\phi_{G1}, \phi_{G2}, \ldots, \phi_{Gn}$, the voltage $V_{RD}$ is a voltage for reading out the corresponding line 189-i. The timing to which this voltage $V_{RD}$ is applied is given by the vertical shift register 194. The voltage $V_{OF}$ is a voltage applied every horizontal blanking period and given by the analogue shift register 195.

Figure 38:
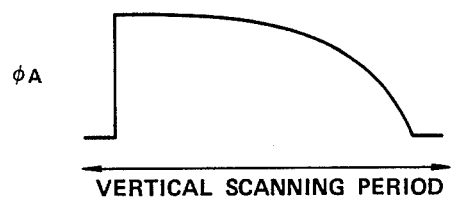
FIG. 38 is a waveform diagram of control signal pulses printed in an analogue shift register.

The signal mixing circuit 196 mixes the outputs of the vertical shift register 194 and analogue shift register 195 at a proper timing and produces pulses $\phi_{G1}$, $\phi_{G2}$, ... In the horizontal scanning circuit 192, as the horizontal shift register 197 operates every horizontal scanning period, the horizontal selecting switches 198, ..., 198 open successively and the signals of the columns 190-1, 190-2 and 190-n are read out successively by the video line 199. In the resetting circuit 193, the resetting switch 200 opens as synchronized with the pulse $V_{Rs}$ every horizontal blanking period. Now, the picture element 183 connected to the line 189-1 shall be considered. When the pulse $\phi_{G1}$ becomes $V_{RD}$, the signals of the respective picture elements 183 will be read out successively by the operation of the horizontal scanning circuit 192. During the succeeding horizontal blanking period, $V_{OF}$ will be applied at a value high enough to perfectly reset the respective picture elements 183 and, by the opening of the resetting switch 200, the picture element 183 will be reset and the gate of the picture element 183 will be of a low value as of the time of starting the integration. During the next horizontal blanking period after one horizontal scanning period, $V_{OF}$ will be of a rather low value. On the other hand, the gate potential of each picture element will have risen in response to the incident light amount. The gate potential will be clipped for the picture element 183 whose light amount has been large and the potential of the picture element of a small light amount will be kept unclipped as it is. Therefore, only the signal of the picture element 183 whose light amount has been large will be compressed. Even during the next blanking period, this signal compressing operation will be made again. The level of the compression is determined by the voltage $V_{OF}$. Then, in the same manner, the signal will be compressed every horizontal blanking period. After one vertical scanning period $\phi_{G1}$ will become $V_{RD}$ again and thereby the compressed signal will be read out. Here, if the voltage of $V_{OF}$ is varied according to the formula (1) as shown by $\phi_A$ in FIG. 38, a logarithmically compressed signal output will be obtained.

A signal $\phi_G$ delayed by the timing of reading out the picture element 183 by the operation of the vertical scanning circuit 191 is applied to the picture element 183 connected to the other line 189-i (i≠1). (This delay is given by the vertical shift register 194 on the read-out voltage $V_{RD}$ and by the analogue shift register 195 on the voltage $V_{OF}$.) Therefore, the operation of the respective picture elements 183 will be exactly the same as in the line 189-1 and the logarithmically compressed signals will be obtained from all the picture elements.

The degree of the signal compression can be freely set by varying the pulse $\phi_A$ as a logarithmic compression controlling signal input into the analogue shift register 195. If this pulse $\phi_A$ is normally made 0 volt, an uncompressed linear type output characteristic will be obtained. Also, if this pulse $\phi_A$ is switched to a high voltage and low voltage, a characteristic represented by two curved lines will be obtained. Also, in the case of conforming to the function of the formula (1), by adjusting the amplitude, gradient and the like, the dynamic range of the logarithmic compression can be varied. Therefore, the above described ACC and ADC can be controlled by the pulse $\phi_A$.

Figure 39:
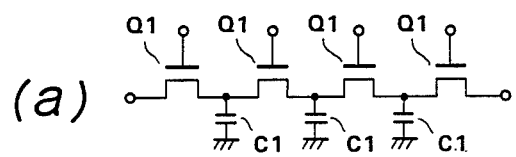
FIG. 39 is a diagram showing a BBD forming the analogue shift register in the tenth embodiment.
Figure 39:
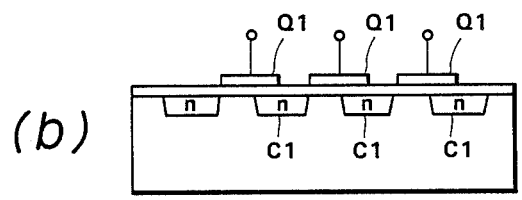

By the way, for example, a BBD (Bucket Brigade Device) can be used for the analogue shift register 195 to be used in the vertical scanning circuit 191. This BBD is of MOS transistors $Q_1$ and capacitors $C_1$ connected in many steps as shown in FIG. 39(a) and has such structure as is shown in FIG. 39(b). If the BBD is used, the analogue shift register 195 can be formed of a simple circuit.

The system of outputting signals as logarithmically compressed by the above described system can be applied also to an imaging device of another X—Y address system.

The eleventh embodiment of the present invention in which a CMD (Charge Modulation Device) is used shall be explained in the following.

FIG. 40 shows a formation of one picture element of a CMD, FIG. 40(a) shows a structure and FIG. 40(b) shows an equivalent circuit. Normally, a negative voltage is applied to a gate 201. When a light is incident, holes will be accumulated below the gate 201 and the potential will rise. When a voltage (negative voltage) higher than at the time of the light accumulation is applied to the gate 201 to read out a signal, a current between a source 202 and drain will flow in response to the light amount and the signal of the picture element will be read out. If a positive voltage is applied to the gate 201, the holes below the gate 201 will vanish and the gate 201 will be reset. The formation of the entire imaging device is to replace the picture element 183 in FIG. 36 with the CMD picture element shown in FIG. 40. The resetting circuit is unnecessary. The signal waveforms showing the operation timing are the same as in FIG. 37. The voltage of the gate pulses $\phi_{G1}$, $\phi_{G2}$, ..., $\phi_{Gn}$ may be only varied so as to be adapted to the CMD.

In such imaging device, when a positive voltage is applied to the gate 201 during the horizontal blanking period after the reading out, the picture element will be reset. A voltage lower than at the resetting time is applied during the next blanking period. In the picture element of a large incident light amount, the gate potential will be a positive potential and the signal will be clipped. On the other hand, in the picture element of a small light amount, the signal will be kept as it is. Therefore, only the signal whose light amount has been large will be compressed. Then, this compressing operation is made every horizontal blanking period. When the voltage applied to the gate during the blanking period is varied by the function of the formula (1), a logarithmically compressed signal output will be obtained.

An example in which an AMI (Amplified MOS Imager) is used is shown in the following as the twelfth embodiment of the present invention applied further to another X—Y address type imaging device.

FIG. 41 shows an equivalent circuit of one picture element 204 of an AMI. A photodiode 205 is connected to a gate of a MOS transistor 206 and a drain of the MOS transistor 206 is connected to a source of a MOS transistor 207. The photodiode 205 is reset by a positive voltage through a photodiode 208. When a light is incident, the cathode potential of the photodiode will reduce. Therefore, the current of the MOS transistor 206 will reduce when the light is stronger and will be obtained as an output signal.

The formation of the imaging device apparatus is as in FIG. 42 and is fundamentally the same as in FIG. 36. The same elements are represented by the same reference numerals. Two lines consisting of a read-out line 209 and resetting line 210 are provided for one picture element. The read-out line 209 is connected to the vertical shift register 194 and the resetting line 210 is connected to the analogue shift register 195.

The voltage $V_{OF}$ applied to the resetting line 210 is set at 0 V at the time of reading out a signal. After the signal is read out, when a high voltage is applied, in each picture element, the photodiode 205 will be reset through the diode 208. Thereafter, if $V_{OF}$ is reduced, the light signal will be retained as it is for the picture element of a small light amount but the voltage will be clipped and therefore the signal will be compressed in the picture element of a large light amount. By varying $V_{OF}$ according to the formula (1), a logarithmically compressed signal can be obtained.

As explained in the above on the imaging device, even in the X—Y address type imaging device, when the voltage clipping the signal of the part of a large light amount is properly varied and this voltage is varied in conformity with the timing of reading out the signal for each picture element, the signal can be logarithmically compressed within the imaging device.

Figure 18:
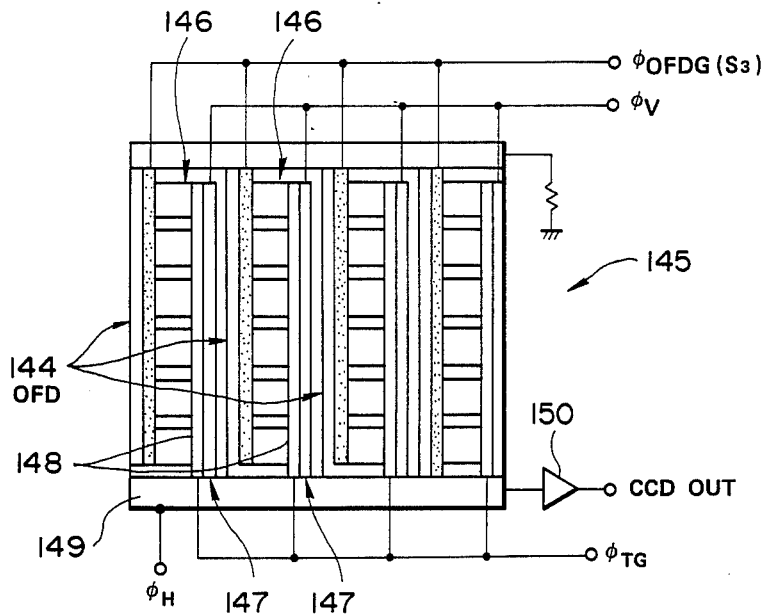
FIG. 18 is an explanatory view showing the formation of a solid state imaging device in the fifth embodiment of the present invention.

In the 5th to 12th embodiments in and after the above mentioned FIG. 18, examples of the logarithmic compression within the device are explained. When a mosaic-like or the like color filter array is fitted to the front surface of the device or a three-plate type structure is made, color imaging can be realized.

A logarithmically compressed color imaging apparatus can be realized as in FIG. 25 by using such devices realizing the logarithmically compressed characteristic. On the other hand, when an electric automatic gain controlling circuit and automatic dynamic range controlling circuit are combined in series with a log Y signal for making a device interior automatic gain controlling signal $S_4$ and automatic dynamic range controlling signal $S_5$ by using the devices of these embodiment and the output is used as a displaying log Y signal, the dynamic range can be extended, on the contrary, for an imaged object of a narrow dynamic range.

Figure 43:
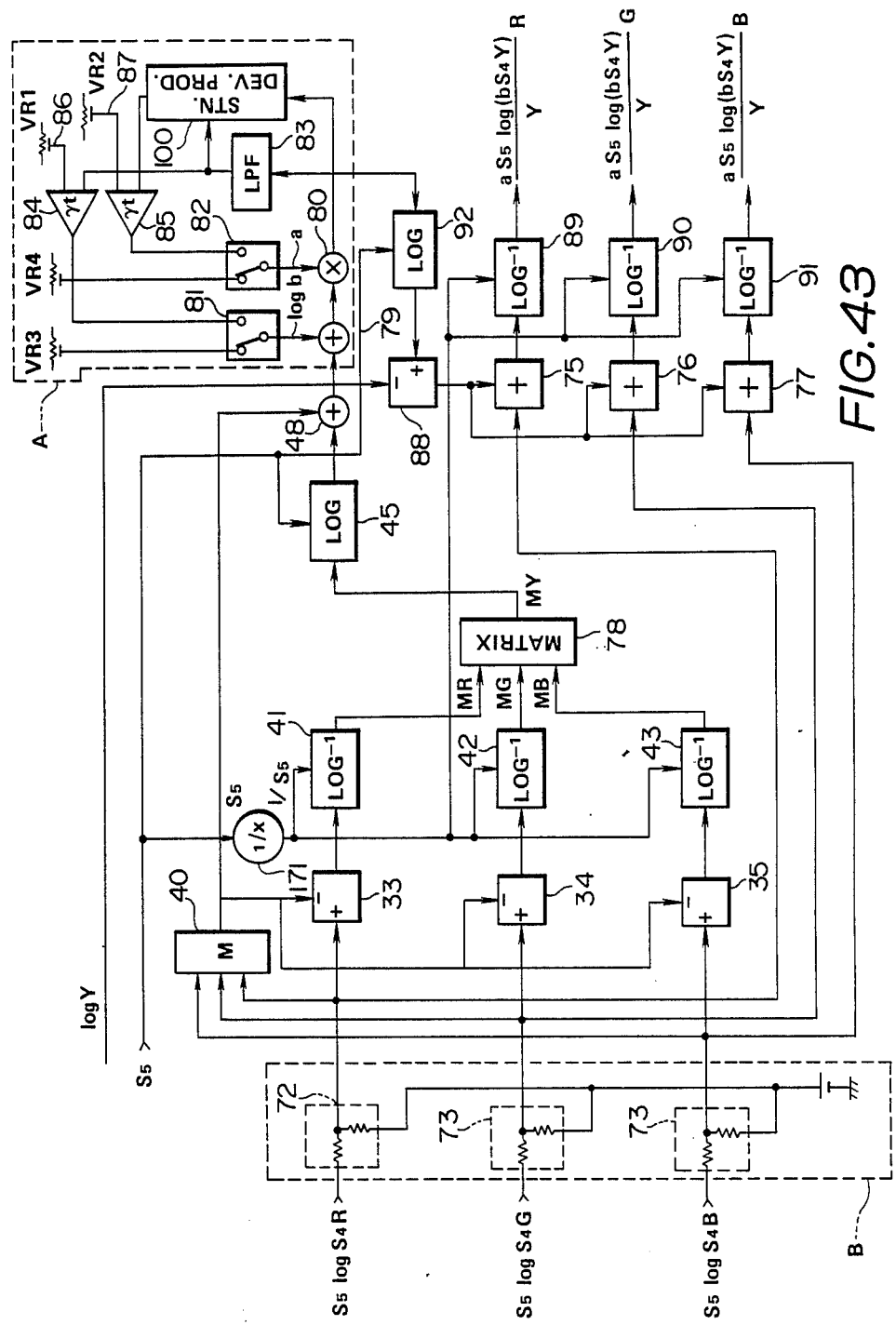
FIG. 43 is a formation diagram of a video processing part using a solid state imaging device logarithmically compressing within the device.

In the video signal processing part in FIG. 43, the part A enclosed with the broken line makes this operation. In FIG. 43, the parts except the part A are the same as in FIG. 25. The part A is explained in FIGS. 10 and 11 and shall not be explained here.

In the above respective embodiments of the device interior logarithmic compression, the solid state imaging device or particularly the CCD is mostly enumerated. For the imaging device, there is also such imaging tube as a visicon. In the visicon of the imaging tube, the photoelectric conversion characteristic is inherently a logarithmic characteristic.

Therefore, in the case of using the visicon, the output as it is used to input log R, log G and log B into the color logarithmically imaging video signal processing part to attain the object.

However, in this case, the logarithmic characteristic will be fixed and the ADC and manual adjustments will be electrically made in the later step.

There are such advantages as are in the following as the effects of the logarithmic compression within the device in the above described 5th to 12th embodiments:

By making the logarithmic compression within the device:

(1) As the output itself from the device has a logarithmic characteristic, the signal process in the later step may be of a simple formation and can be made small.

(2) The logarithmic compression can be made with one device or one set of devices (9n the case of a three-plate type) and no memory for the compression is required.

(3) The entire dynamic range of the imaged object can be put into the output of one device and an image information of any brightness level of the imaged object can be extracted and displayed in the circuit process in the later step.

(4) As the logarithmic compression is made within the device, S/N is better than in the case of making the logarithmic compression outside the device (as by using a plurality of devices or making a plurality of imagings and then compounding them with memories).

The embodiment wherein the signal is compressed within the CCD imaging device and the output has a logarithmic characteristic has been explained in the above. Now, in such case as of imaging an object having low contrast, it is better to impart an inverse logarithmic characteristic (exponential characteristic) to the device output. This corresponds to logarithmically converting the signal and then multiplying and subtracting the positive value to narrow the dynamic range to be displayed. It is more advantageous in respect of S/N to carry out this operation within the imaging device than in the signal processing circuit. An embodiment in which the CCD imaging device output is made to have an exponential characteristic shall be explained in the following.

Figure 44:
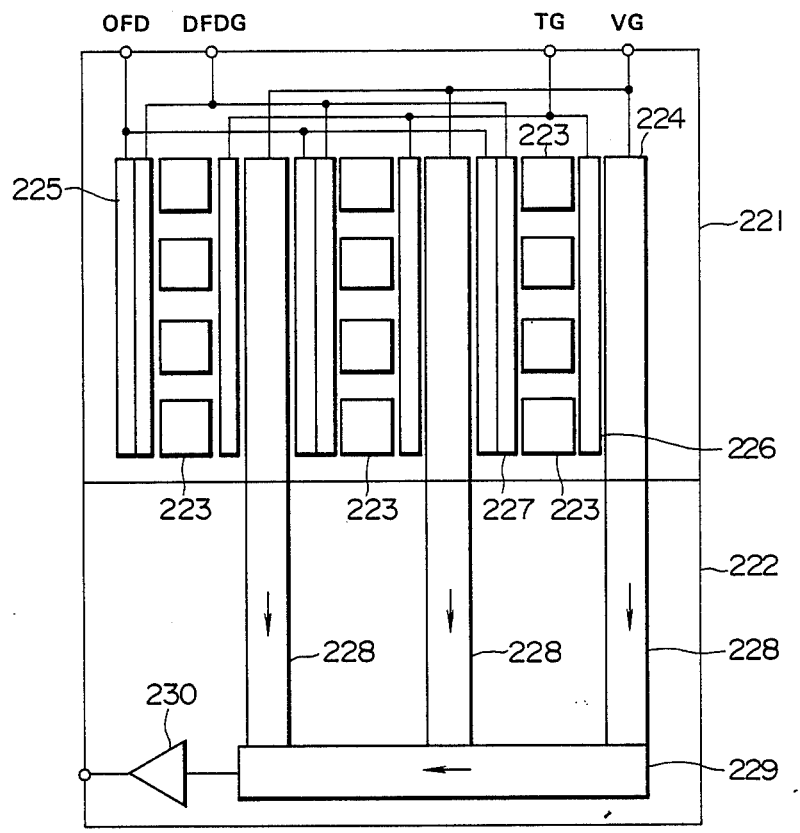
FIG. 44 is a formation diagram of a frame interline transfer type solid state imaging device used in the thirteenth embodiment of the present invention.

FIG. 44 shows a device formation of a CCD used in the thirteenth embodiment of the present invention. The reference numeral 221 represents a light receiving part and 222 represents a shielded accumulating part. In the light receiving part, photodiodes 223 are arranged in lines and columns. Shielded vertical shift registers 224 and overflow drains 225 are arranged adjacently to the photodiode columns. The reference numeral 226 represents a transfer gate controlling the electric charge transfer between the photodiode 223 and vertical shift register 224. The reference numeral 227 represents an OFD gate controlling the saturated level of the photodiode. In the shielded accumulating part 222, vertical shift registers 228 are provided as connected to the light receiving part 221 and the horizontal shift register 229 is connected to the vertical shift registers 224. An output amplifier 230 is connected to one end of the horizontal shift register 229. That is to say, this CCD forms a so-called frame interline transfer CCD (FIT CCD).

In such imaging device, the accumulated signal charge is immediately transferred to the shielded accumulating part 222 and, when the light is accumulated, the vertical shift registers 224 will be empty. Therefore, when the light is accumulated, if the potential of the transfer gate 226 is properly controlled and the electric charge overflowing from the photodiodes 223 to the vertical shift registers 224 is taken out as a signal, the output can be made to have an exponential characteristic.

Figure 45:
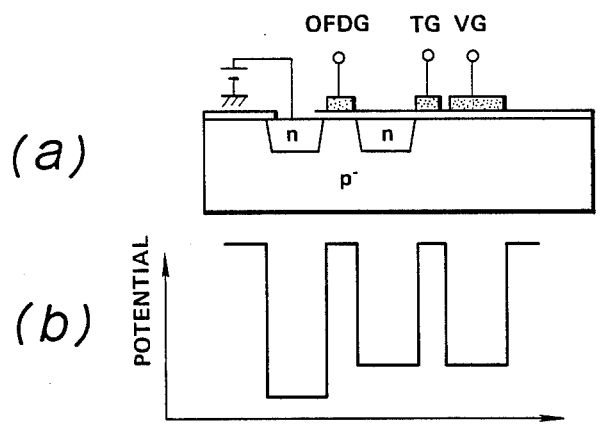
FIG. 45 is a diagram showing the sectioned structure and potential distribution of one picture element part of the thirteenth embodiment.
Figure 46:
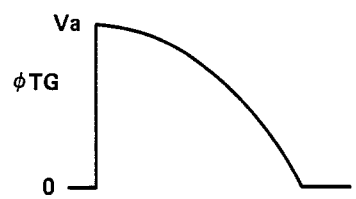
FIG. 46 is a waveform diagram of a control signal applied to a transfer gate.

FIG. 45(a) is a diagram showing the sectioned structures of the photodiode, vertical shift register and overflow drain and FIG. 45(b) shows a potential distribution. FIG. 46 shows a pulse $\phi_{TG}$ applied to the transfer gate. The pulse $\phi_{TG}$ is a pulse reducing with an upward convex curve from a positive level Va on which the photodiode charge is all transferred to the vertical shift registers. If this curve is represented by V(t), in order to obtain an output of a perfect exponential characteristic, V(t) will be given to satisfy the following formula for the time t:

$$V(t) = a\ exp(-bV(t)/t) + C \tag{8}$$

wherein a is a gain, b is a dynamic range and c is a constant for adjusting the DC part of the OFD gate voltage.

By applying the pulse $\phi_{TG}$ of the curve V(t) shown in FIG. 46 and satisfying the above mentioned formula (8) to the transfer gate 226 during the light accumulating period, the output of the exponential characteristic can be obtained.

By the way, in practice, the output may be approximated by a curved (folded) line approximation or another approximating function.

Figure 47:
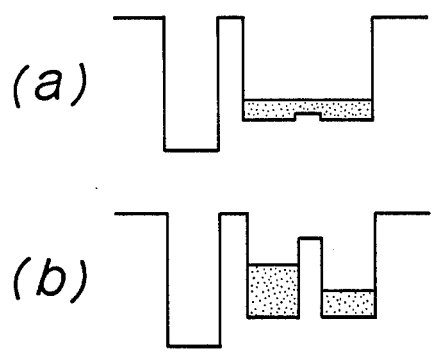
FIG. 47 is a diagram for explaining the operation in the thirteenth embodiment.
Figure 48:
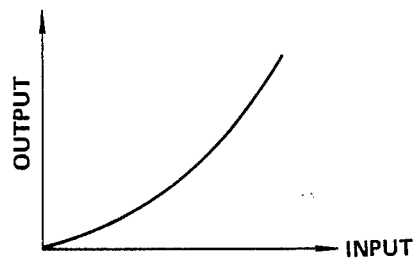
FIG. 48 is a characteristic diagram showing an output characteristic for an incident light intensity by the thirteenth embodiment.

When a photoelectric charge is accumulated while applying the pulse $\phi_{TG}$ of the curve shown in the above mentioned FIG. 46, the potential barrier between the photodiode and vertical shift register will be so low at the beginning of the accumulation that the electric charge will accumulated as divided to both (FIG. 47 (a)) but the barrier will become higher with the lapse of time and the electric charge will be accumulated only in the photodiode (FIG. 47 (b)). In this case, the weaker the incident light amount, the earlier the time when the electric charge becomes unable to pass over the barrier. Therefore, with the electric charge accumulated in the vertical shift register, the weaker the incident light amount, the shorter the accumulating time and the stronger the incident light amount, the longer the accumulating time. As a result, an exponential functional incident light strength versus output characteristic shown in FIG. 48 is obtained. In this case, if the saturated charge amounts of the photodiode and vertical shift register are equal to each other, the gradient of the tangent near the saturation of the output signal will be twice as large and the logarithmically converted signal will have a gain twice as large. In order to further increase this magnification, it is necessary to increase the saturated charge amount of the photodiode. That is to say, in order to makes the magnification N times as high, the saturated charge amount of the photodiode must be made (N−1) times as large. Therefore, the dimension of the photodiode part must be increased or the applied voltage must be increased. However, there are difficulties that, in the former, the device dimension increased and, in the latter, there is a restriction from the voltage resistance.

Therefore, a system of elevating the magnification by discharging with pulses the electric charge of the photodiode at the time of the light accumulation shall be described in the following.

Figure 49:
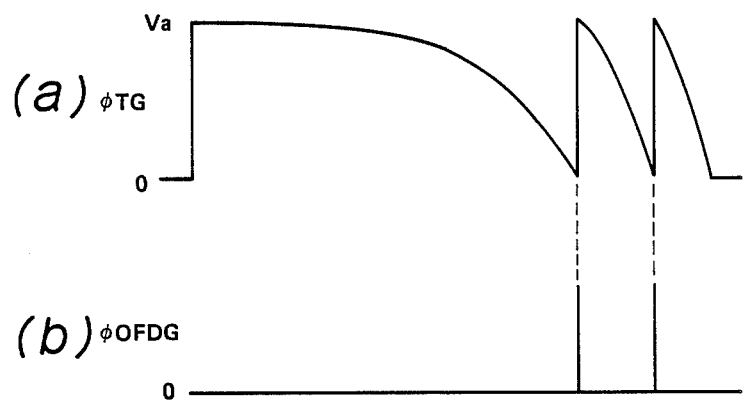
FIG. 49 is a waveform diagram in case the control signal is applied as divided into a plurality of times in order to increase the saturated charge amount.

FIG. 49 shows a pulse $\phi_{TG}$ to be applied to a transfer gate and a pulse $\phi_{OFDG}$ to be applied to an OFD gate. The pulse $\phi_{TG}$ reduces according to the formula (8) from Va. When it reaches OV, the voltage will be made high by Va. The pulse $\phi_{TG}$ continues to continuously vary according to the formula (8). On the other hand, just before $\phi_{TG}$ reaches OV, the positive pulse $\phi_{OFDG}$ is added. This variation is repeated a proper number of times.

Figure 50:
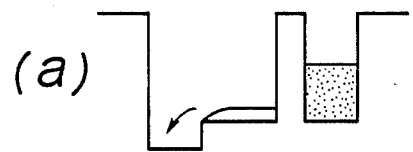
FIG. 50 is a diagram for explaining the operation in case the control signal of FIG. 49 is used.
Figure 50:
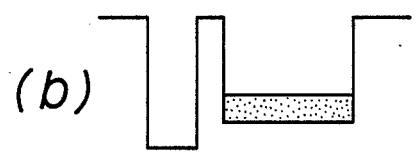
Figure 50:
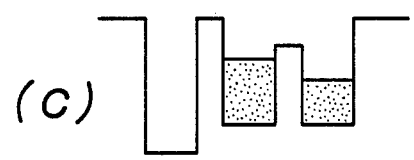
Figure 51:
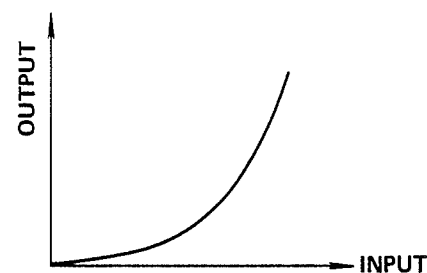
FIG. 51 is a diagram showing an output characteristic for an input light intensity in case the saturated charge amount is made large.

In case this pulse $\phi_{OFDG}$ is applied, the operation from the beginning of the light accumulation is the same as in the above mentioned embodiment. When the pulse of $\phi_{OFDG}$ is applied at the moment when the electric charge of the photodiode reaches the saturation, the electric charge of the photodiode will be discharged into the overflow drain as shown in FIG. 50(a). Just after this, the potential barrier between the photodiode and vertical shift register will become lower and the light accumulation will be resumed as shown in FIG. 50(b). When the potential barrier becomes higher with the time, only the electric charge of the picture element of a strong light amount will be accumulated in the vertical shift register as shown in FIG. 50(c). When this operation is repeated, the input versus output characteristic shown in FIG. 51 will be obtained. In case the electric charge is discharged n times in the course of the accumulation, the gradient near the saturation will become (n+2) times as large. As shown in FIG. 49, in case the charge is discharged twice in the course, the gain will become four times as large.

In such CCD imaging device as is shown in FIG. 44, naturally, the normal operation of accumulating the photoelectric charge in the photodiode can be made. Also, it is as described above that, when the potential barrier between the photodiode and overflow drain is properly increased during the light accumulation, the signal charge to be accumulated can be logarithmically compressed. Therefore, when this operation and the operation of the above mentioned exponential characteristic are switched over to each other, the logarithmic characteristic and exponential characteristic can be output by using the same device. Therefore, when the output of such device is connected to such logarithmically imaging processing circuit as is already described, the object can be imaged while contracting or expanding the observed dynamic range in response to the object.

Figure 52:
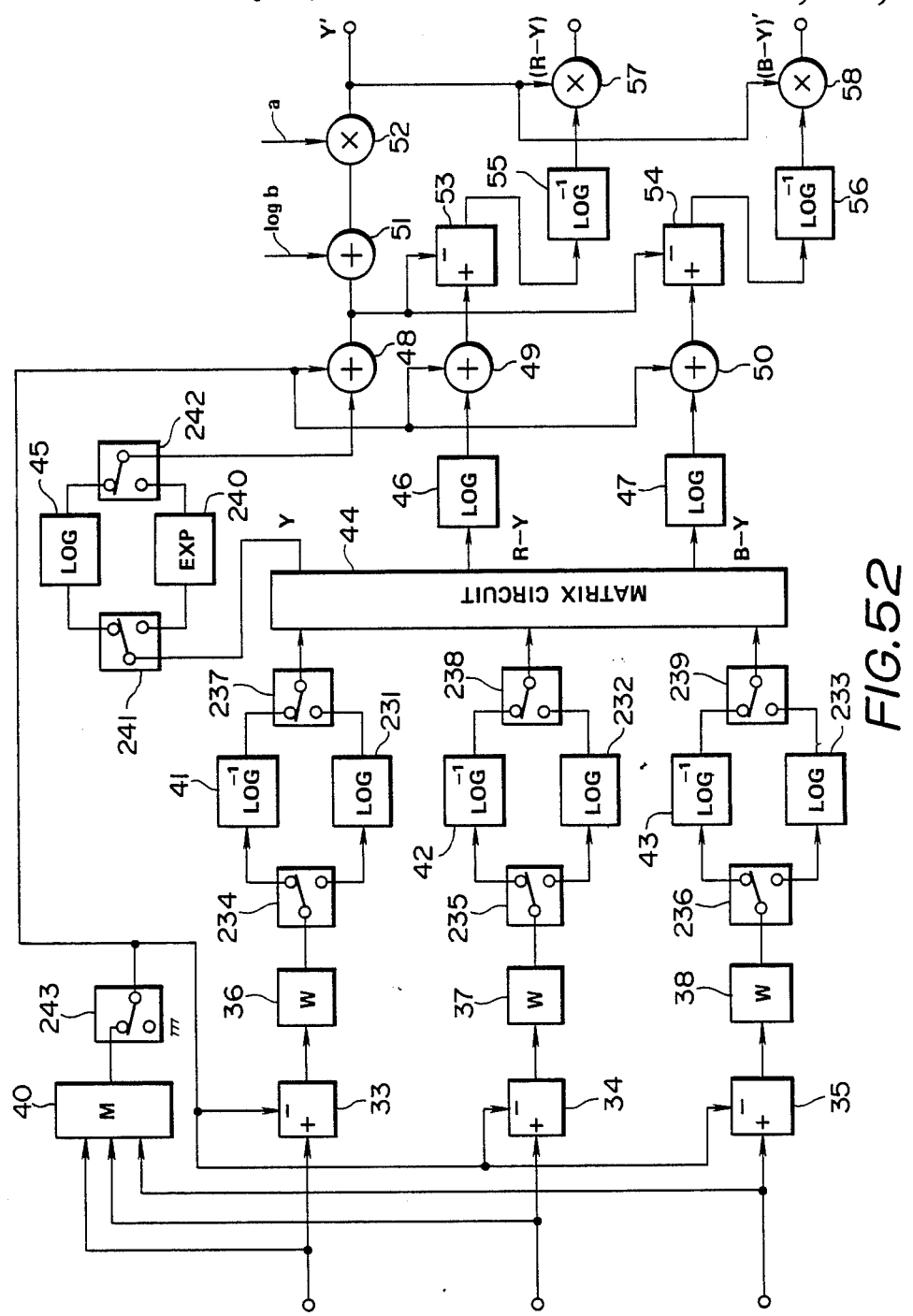
FIG. 52 is a formation diagram of a video processing part adaptable to an imaging signal of either of logarithmic and index characteristics.

A formation example of the logarithmically imaging signal processing part is shown in FIG. 52. The formation is fundamentally the same as in FIG. 3. The same reference numerals are attached to the same component parts. In the circuit, logarithmic amplifiers 231 to 233 are provided and the signals input into the inverse logarithmic amplifiers 41 to 43 are switched by switches 234 to 239. By the operation of these switches 234 to 239, the signals are input into the inverse logarithmic amplifiers 41 to 43 in case the device output is of a logarithmic characteristic and into the logarithmic amplifiers 231 to 233 in case the device output is of an exponential characteristic so as to be converted to linear type signals. In case the dynamic range imaged by the device is set as continuously varied, the gains of the logarithmic and inverse logarithmic amplifiers may be controlled in response to it and may be properly converted. This is the same as is explained in FIG. 25.

The brightness signal output from the matrix circuit 44 is switched by the switches 241 and 242, is input into the logarithmic amplifier 45 or exponential amplifier 240 and is returned to the logarithmic or exponential characteristic as of the time of imaging. In case the device output is of an exponential characteristic, the operation of the floating point system is not required and therefore, at this time, the output of the average value operating circuit 40 is switched over to the 0 level by the switch 243. Thereby, the addition and subtraction by the subtracters 33, 34 and 35 and adders 48, 49 and 50 are not particularly made and, for the output of the exponential characteristic, the color difference signal can be correctly visually corrected.

The other processes are the same as have been already explained and shall not be explained here.

Figure 54:
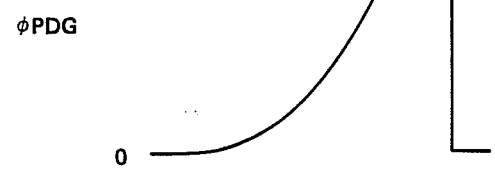
FIG. 54 is a waveform diagram of a control signal applied to a MOS photodiode.
Figure 53:
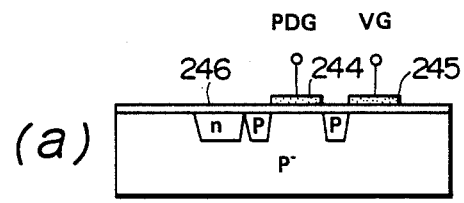
FIG. 53 is a diagram showing the sectioned structure and potential distribution near a MOS photodiode in the fourteenth embodiment.
Figure 53:
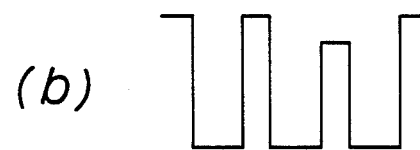

The above embodiments have been of the case that the photodiode is formed of a diffusing layer. The fourteenth embodiment of the present invention wherein the photodiode is formed of an MOS photodiode using an MOS gate is shown in the following. FIG. 53 is a view showing the sectioned structure of the vicinity of a photodiode and the potential distribution. The reference numeral 244 represents a gate (PD gate) on the photodiode, 245 represents a vertical shift register gate and 246 represents an overflow drain. FIG. 54 shows a pulse $\phi_{PDG}$ to be applied to the PD gate. $\phi_{PDG}$ represents a pulse increasing from the 0 level according to the formula (8).

Figure 55:
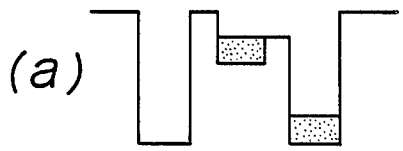
FIG. 55 is an operation explaining diagram.
Figure 55:
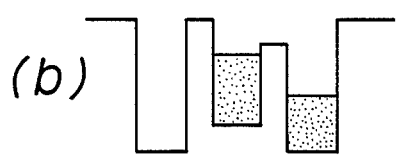

When the photoelectric charge is accumulated while adding such pulse, at the beginning of the accumulation, the potential well below the PD gate will be shallow and therefore the electric charge will be accumulated even in the vertical shift register as shown in FIG. 55(a) but, with the lapse of time, the potential well will become deeper and therefore thereafter the electric charge will be accumulated only in the photodiode as shown in FIG. 55(b). By the same principle as in the preceding embodiment, an output having an exponential characteristic is obtained. The larger the saturated electric charge amount of the MOS photodiode, the larger the gain of the exponential characteristic to be taken.

In this embodiment, as the electrode is present on the upper part of the photodiode, the photosensitivity is rather low but a transfer gate and overflow control gate are not required and there is a feature that the structure is simple.

By the way, in FIG. 44, the formation of the CCD imaging device is made an FIT-CCD to continuously image a picture image. After one picture plane is imaged, the imaging is stopped during the period required to read out the signal and, after reading out the signal ends, if the light accumulation on the next picture plane is started, an IL-CCD can be also used.

The overflow drain is adjacent to the photodiode but a so-called vertical overflow drain using an n substrate through a P layer below the photodiode may be used. By varying the potential barrier between the photodiode and overflow drain (n substrate) with the voltage applied to the n substrate, the same operation as in the preceding embodiment can be made.

In the above described embodiment, the apparatus and method for the logarithmic compression within the device are described but, in case an illuminating means is provided, for example, as in an electronic endoscope, by varying the light intensity of the light source forming the illuminating means, the object illuminating degree can be logarithmically compressed.

In this case, in case the imaging device forming the imaging means is provided with a color filter array, the color imaging will be made under a white illumination accord-to the systems of prior application examples (Japanese patent laid open No. 160917/1983 and U.S. Pat. No. 4,584,606).

On the other hand, the fifteenth embodiment of the present invention in the case of such field sequential imaging system (as RGB) for a monochromatic imaging device provided with no color filter array shall be explained. In the case of the field sequential imaging system, the illuminating light is varied successively so that the exposure amount (or the radiated light amount, that is, (light intensity)×(time)) may be of a ratio for example, of 1:300 (when the dynamic range of the device unit is 50 dB) for the respective illuminating lights.

After each illuminating period, a light intercepting period for the vertically transmitting period of the device is provided. In this case, in the illuminating means, the ratio of the (opening) window of each color filter may be made 1:300 for the respective colors of a rotary filter of RGB or, in the case of a strobo-illumination of RGB, the ratio of each ON time may be made 1:300 for the respective colors.

Thus, for example, twice, the exposure amount is changed by the same color R, at the first time, the output data are stored in an R frame memory, at the second time, while being successively read out of the above mentioned R frame memory, the data of the first time are added to the output data of the second time and then the contents of the above mentioned frame memory are re-written to the added data. By making it for the respective colors of R, G and B, picture image data having a logarithmic characteristic of the folded line approximation are accumulated in the respective frame memories. The data of the respective colors of R, G and B are arranged, are then input into the color logarithmically imaging video processing part shown, for example, in FIG. 10 through a video D/A converter and are then color-displayed as an RGB output or NTSC composite output in a monitor.

(By the way, in this embodiment, frame memories are prepared for the number of steps (in this embodiment, two steps) for the respective colors, the data are accumulated in the frame memories for the respective exposure levels and then, at time of reading out the data, the picture element information of the respective steps may be added.)

Figure 56:
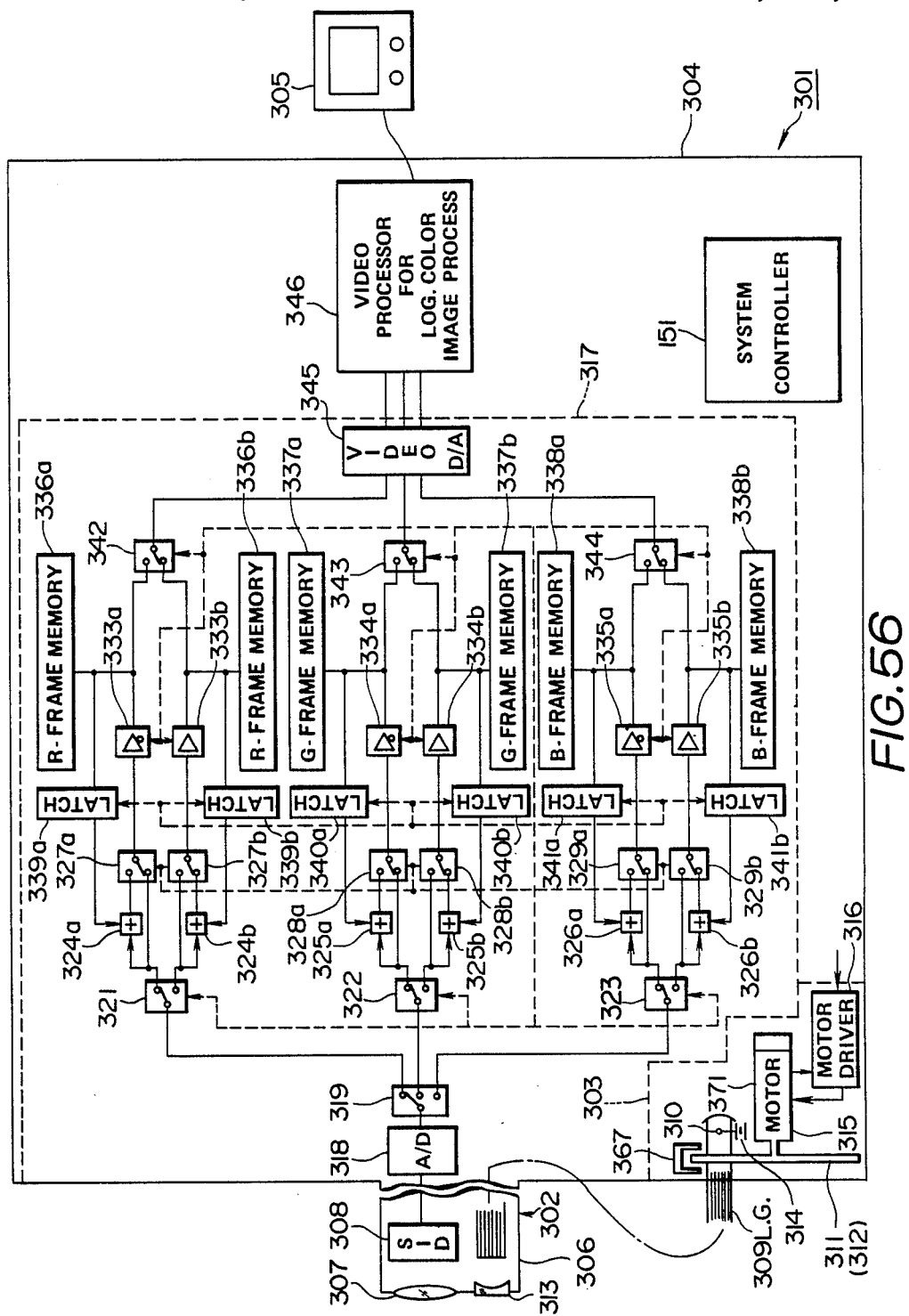
FIG. 56 is a formation view of a field sequential type electronic scope apparatus of the fifteen embodiment of the present invention.

FIG. 56 shows the formation of an electronic endoscope (hereafter scope) apparatus having a frame memory part in the center.

In FIG. 56, an electronic scope apparatus 301 is formed of an electronic scope 302 elongated so as to be insertable into a body cavity or the like, a scope controlling device part 304 to which this electronic scope 302 is connected and which houses a light source part 303 and signal processing means and a displaying monitor 305 connected to the video output terminal of this scope controlling device part.

In the tip part 306 of the above mentioned electronic scope 302 houses an image forming objective lens 307 and a solid state imaging device (SID) 308 arranged on the focus plane of this objective lens 307. A light guide 309 transmitting an illuminating light is inserted through this electronic scope 302 and is connected on the entrance end surface side to the light source part 303 so that a white light from a xenon lamp 310 or the like may be radiated as field sequential lights of R (red), G (green) and B (blue) through a rotary filter 311 or 312 shown in FIGS. 57(a) or (b).

The lights are emitted to the imaged object side through an illuminating lens 313 from the exit end surface of the light guide 309.

The above mentioned xenon lamp 310 is illuminated by means of the electric power of a current source 314. The RGB rotary filter 311 or 312 is rotated and driven by a motor 315 which is driven by a driving signal of a motor driver 316.

An SID driver not illustrated is arranged within the above mentioned scope controlling device 304. The signal read out of the SID 308 by the application of a driving signal from this SID driver is input into an A/D converter 318 within a frame memory part 317 through a signal cable and is converted to a digital signal. The signal passed through this A/D converter 318 is input into three multiplexers 321, 322 and 323 through a multiplexer 319.

Pairs of adders 324a and 324b; 325a and 325b; 326a and 326b and pairs of multiplexers 327a and 327b; 328a and 328b; and 329a and 329b are connected respectively to these three multiplexers 321, 322 and 323.

The outputs of the pairs of multiplexers 327a and 327b; 328a and 328b; and 329a and 329b switching the output terminals of the above mentioned respective adders 324a and 324b; 325a and 325b; and 326a and 326b and the contacts on one side of the above mentioned multiplexers 321, 322 and 323 with each other are input into pairs of R frame memories 336a and 336b, G frame memories 337a and 337b and B frame memories 338a and 338b through pairs of buffers 333a and 333b; 334a and 334b; and 335a and 333b. These pairs of frame memories 336a and 336b; 337a and 337b; and 338a and 338b are connected respectively to the adders 324a and 324b; 325a and 325b; and 326a and 326b through latches 339a and 339b; 340a and 340b; and 341a and 341b. The data read out of the frame memories 336a and 336b; 337a and 337b; and 338a and 338b and the data from the multiplexers 321, 322 and 323 are added and are again written into the frame memories 336a and 336b; 337a and 337b; and 338a and 338b through the multiplexers 327a and 327b; 328a and 328b; and 329a and 329b and the buffers 333a and 333b; 334a and 334b; and 335a and 335b.

The respective pairs of frame memories 336a and 336b; 337a and 337b; and 338a and 338b are connected to a video D/A converter 345 respectively through multiplexers 342, 343 and 344. The analogue signal converted by this video D/A converter 345 is input into a logarithmic color imaging video processing part 346 shown, for example, in FIG. 10 and its output is displayed by the monitor 305.

The frame memories 336a, 337a and 338a respectively of the above mentioned pairs of frame memories 336a and 336b; 337a and 337b; and 337a and 337b are used to read and write, for example, in even numbered fields and frame memories 336b, 337b and 338b on the other side are used to read and write in odd numbered fields.

Figure 57:
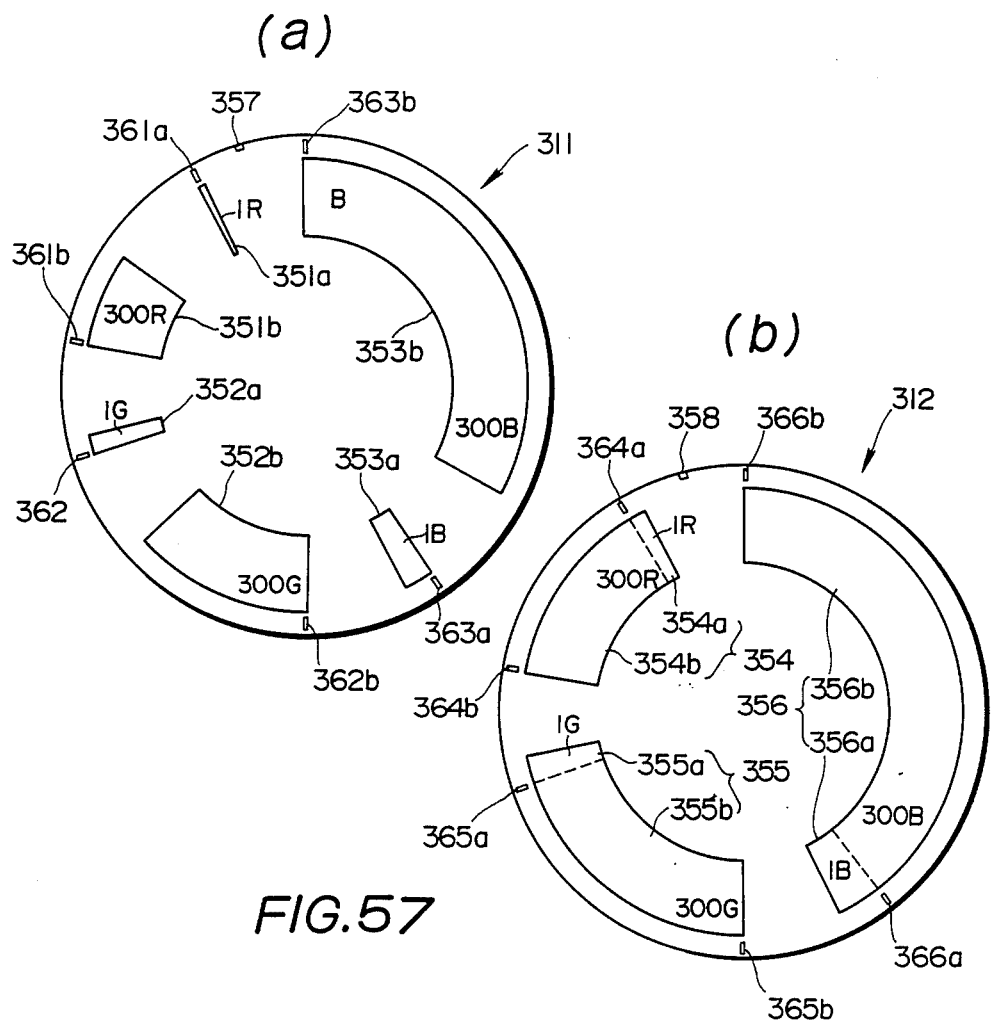
FIG. 57 is an explanatory diagram showing a RGB rotary filter in the case of field sequential illumination.

Now, the RGB rotary filter 311 or 312 forming the light source part 303 is shown in FIG. 57.

By the way, FIG. 57(a) is of an example of using a line transfer system, frame transfer system or X—Y address system for the SID 308 housed in the electronic scope tip part 306 and FIG. 57(b) is of an example of using an interline transfer system.

In FIG. 57(a), R dichroic filters 351a and 351b, G dichroic filters 352a and 352b and B dichroic filters 353a and 353b are set to be of filter areas of a ratio of 1:300 (for example, 1R and 300R mean that the area ratio is 1:300).

In FIG. 57(a), a light intercepting part is provided between the respective filters (for example, 351a and 351b). In the RGB rotary filter 312 in the case of the interline transfer type SID, as shown in FIG. 57(b), no light intercepting part is provided and R.G.B dichroic filters 353a and 354b; 355a and 355b; and 356a and 356b are formed as respectively connected and are represented respectively by 354, 355 and 356.

The colors of the respective filters are discriminated from the positions of start markers 357 (in the case of FIG. 57(a)) and 358 (in the case of FIG. 57(b)). The timing of reading out after each exposure is detected by a position sensor (or reader) 367 (See FIG. 56.) of read markers 361a and 361b; 362a and 362b; and 363a and 363b (in the case of FIG. 57 (A)) and 364a and 364b; 365a and 365b; and 366a and 366b (in the case of FIG. 57 (b)). The case of using the filter 311 of FIG. 57 (a) shall be explained.

Figure 58:
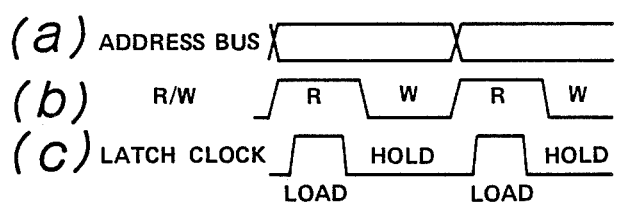
FIG. 58 is a timing chart relating to a frame memory and latch at the time of a light mode.

For example, the picture image data in even number fields exposed by the R (G) ((B)) dichroic filter 351a (352a) ((353a)) represented by 1R (1G) ((1B)) are written into the R frame memory 336a (G frame memory 337a) ((B frame memory 338a)) through the A/D converter 318, multiplexers 321 (322) ( 323)) and 327a (328a) ((329a)) and latches 333a (334a) ((335a)) (compounded in the same order). Then, after being exposed by R (G) ((B)) filter 351b (352b) ((353b)) represented by 300R (300G) ((300B)), the picture image data are taken into the R frame memory 336a (337a) ((338a)) through the A/D converter 318, multiplexer 319, multiplexer 321 (322) ((323)), adder 324a (325a) ((326a)), multiplexer 327a (328a) ((329a)) and buffer 333a (334a) ((335a)). By the way, in the respective frame memories 336a to 332b, the data write-in velocity and read-out velocity are determined independently respectively by the transferring capacity of the SID 308 and the displaying timing of the monitor 305. Also, as shown at the time of writing in the data as shown in FIG. 58, for the period in which the address is designated as shown in FIG. 58(a), the read/write is made at a velocity twice as high as shown in FIG. 58(b), the data read out of the frame memory at the time of reading as shown in FIG. 58(c) are taken in by the latch and are held to be output at time of a writing signal.

That is to say, the latches 339a to 341b as synchronized with the timing of the reading latch the data from the respective frame memories 336a to 338b. When the data imaged by the filter 351b of 300R are input, the data imaged under the filter 351a of 1R and latched by the latch 339a will be added by the adder 324a and then (in the case of even number fields) will be written again into the R frame memory 336 at the writing timing.

That is to say, in case all the exposures of R by using the R filters 351a and 351b are completed, the data under the illumination of (1R+300R) will be housed in the R frame memory 336a. This is the same also with G and B.

By repeating this with R, G and B, RGB data for one field are memorized. When this operation ends, the multiplexers 321 to 323 and 342 to 344 are switched, the same operation is made in the other RGB frame memories 336b, 337b, 338b and the data are written successively into said frame memories 336b, 337b and 338b. At the same time, the above mentioned written-in RGB frame memories 336a, 337a and 338a on one side become read modes. The data are read out simultaneously from these frame memories 336a, 337a and 338a and are transmitted to the color logarithmic imaging video signal processing part (shown, for example, in FIG. 10) in the later step through the video D/A converter 345 of three channels and its output is displayed by the monitor 305.

By the way, in the light source part 303 shown in FIG. 56, the motor 315 is controlled by the motor driver 316 into which the rotation velocity detected by such rotation velocity detecting part 371 as a rotary encoder or tachometer is input so as to be of a rotation at a fixed velocity.

By the way, the above mentioned frame memory part 317 and motor driver 316 are controlled by the system control part 151.

The case of using the rotary filter 311 of FIG. 57(a) has been explained in the above. In the case of using an IL-CCD for the SID 308, the rotary filter 312 shown in FIG. 57(b) is used and the data are transferred to the vertical shift register at the timing of the respective read marks 364a to 366b and are continuously exposed to the same color on the imaging plane.

The operation after the data are taken in is the same as is explained in the above.

In the case of using the above mentioned IL-CCD, there are merits that, as the device shutter function is utilized, the setting of the compression ratio can be changed and, as the exposure with the same color can be made continuously and the light intercepting part can be limited to be minimum, the rate of the exposure period (in the peripheral part of the rotary filter) can be made large.

In the above mentioned 15th embodiment, the logarithmically compressed color imaging is made by controlling the illuminating period. However, the imaging device logarithmically compressing within the device can be applied to the electronic scope by replacing a part of the conventional electronic scope with the above described color imaging apparatus of the embodiment logarithmically compressing within the device.

The imaging system of the electronic scope can be made an RGB field sequential imaging system by using the above mentioned device interior logarithmically compressed system fitted with no color filter array and incorporating a sole light source incorporating, for example, the RGB rotary color filter, multiplexer, A/D converter, frame memory for three frames (in fact, 6 frames are preferable for the capacity the same as in the above mentioned 15th embodiment), video D/A converter and the like.

If an electronic scope is formed of such color logarithmically compressed characteristic as is described above, there will be a defect that the latitude will be narrow but the characteristic of the general electronic scope can be improved.

In the case of such deep inner object to be imaged as, for example, the gullet or intestines, in the picture image by the conventional electronic scope, such flaws that the inner part of the object collapses to be black and the near part is saturated to be white occur but, by the electronic scope of this logarithmically compressed characteristic, such flaws can be dissolved, not only the observation and measurement in an easily discriminating state are possible but also the picture image information of all the dynamic ranges of the imaged object can be recorded, for example, in a tape or disc and therefore it is very advantageous to the routine inspection or picture image processing.

An embodiment of applying the logarithmic color imaging to an electronic camera shall be explained in the following.

Figure 59:
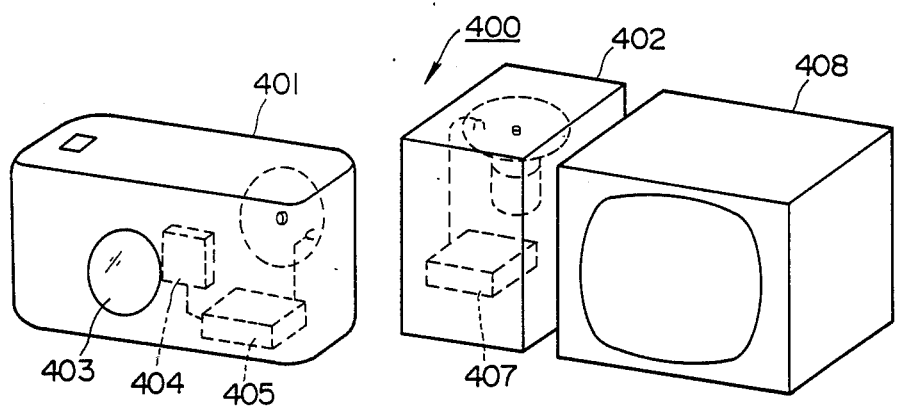
FIG. 59 a schematic view of the present invention as applied to an electronic camera.

The electronic camera is to record or reproduce a stationary picture by recording in a recording medium an electric signal output from an imaging device instead of a camera exposing an image on a silver salt film. Its schematic view is shown in FIG. 59.

The reference numeral 401 represents an electronic camera imager and 402 represents a reproducer. In the imager 401, the image of an object to be imaged is projected onto an imaging device 404 by using a lens 403. The output of the imaging device 404 is recorded in such recording medium 406 as, for example, a magnetic disc through a signal processing circuit 405. This magnetic disc is set in the reproducer 402 and a signal read out by a recording and reproducing circuit is output to a TV monitor 408 through a signal processing circuit 407 to reproduce a picture image. In the case of the logarithmic color imaging in such electronic color system 400, various systems are considered depending on how such functions as of the above described logarithmic compression of the signal and processing of the color signal are to be incorporated.

Figure 60:
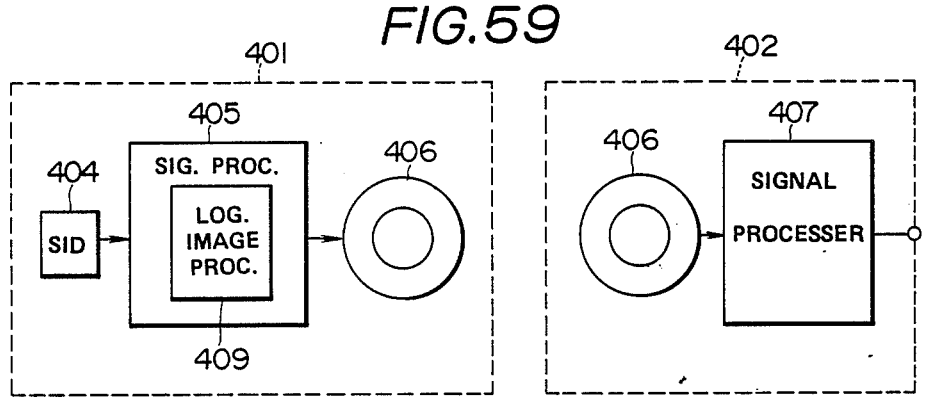
FIG. 60 is a formation diagram of the sixteenth embodiment of the present invention containing a logarithmic imaging processing function on the imaging device side.

In the sixteenth embodiment shown in FIG. 60, all the logarithmic imaging processes are incorporated within the imager 401. Such logarithmic imaging processing circuit 409 as is shown, for example, in FIG. 3 is located within the signal processing circuit 405 into which the imaging output of the imaging device 404 is input within the imager 401. The video signal having a dynamic range, for example, of 100 dB by such means as is described above has here the brightness signal logarithmically compressed and the chromatic aberration signal visually corrected and is recorded in the recording medium 406. The dynamic range of the signal processed as mentioned above is compressed to about 50 dB the same as in the normal signal and therefore the signal can be recorded in the same recording capacity as in the normal case. In the case, for example, of a still video floppy system standard, the signal of one field is recorded in one track of a magnetic disc.

The signal recorded in the recording medium is reproduced in the reproducer 402 and is input into the signal processing circuit 407. In this case, the signal processing circuit may be exactly the same as the one for the normal picture image not logarithmically imaged. The video signal is output from the signal processing circuit 407 and is delivered to a TV monitor.

In case the logarithmic color imaging process is to be made all on the imager 401 side as explained above, the gain and dynamic range of the signal must be controlled all on the imager 401 side. The imager 401 may be provided with a switch for setting the gain and dynamic range and a variable resistance or the like to manually control them. Also, in the case of continuously imaging a plurality of picture images by continuously operating the imaging device 404 (continuous photographing mode), they can be automatically set. Therefore, they are automatically adjusted by using such automatic gain adjusting circuit and automatic dynamic range adjusting circuit as are shown in FIG. 10 and by using the average value of the brightness signal of the front frame.

In the case of imaging only one picture image, the automatic control thus utilizing the information of the front frame can not be made. In this case, a light measuring device is provided within the imager 401, the gain and dynamic range are set by using the information of measuring the light at the time of starting the imaging and the imaging can be made.

Figure 61:
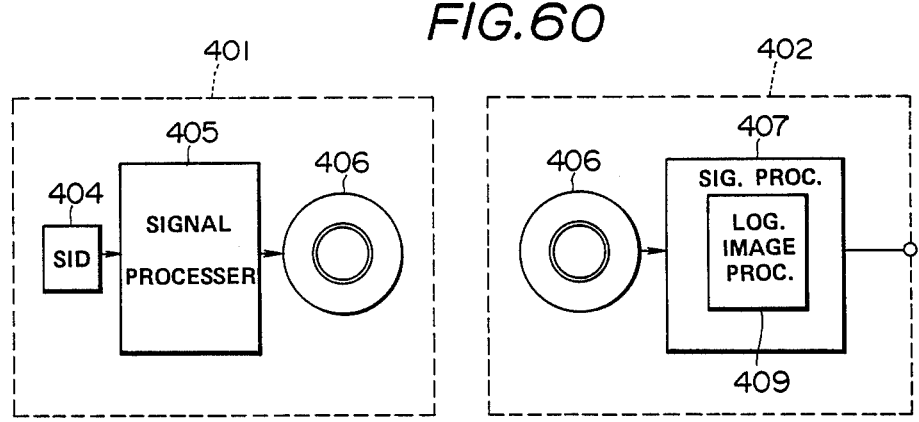
FIG. 61 is a formation diagram of the seventeenth embodiment of the present invention containing a logarithmic imaging processing function on the reproducing device side.

FIG. 61 shows the seventeenth embodiment wherein the logarithmic imaging is processed by the reproducer. In the imager 401, two picture images (of a dynamic range of 50 dB) different in the exposure amount by 50 dB are imaged and are recorded in the recording medium. For the means, the light accumulating time, for example, of the imaging device 404 is set to be 16.7 ms by a mechanical shutter or the shutter operation of the imaging device itself and the image is taken. The video signal at this time is recorded in the recording medium 406 through the signal processing circuit 405. Then, the light accumulating time is set to be 0.05 ms and the image is taken. This video signal is again recorded in the recording medium. By such means, signals different in the exposure amount by 50 dB are recorded in two tracks, for example, of a magnetic disc. That is to say, in this case, the recording capacity of the recording medium is required to be twice as large as normal. On the other hand, in the reproducer 402, the two picture images recorded in the recording medium are logarithmically imaged to be one picture image. For example, two tracks of the magnetic disc are reproduced by double heads and the two picture images are simultaneously read out. This picture image signal is made a pair of primary color signals by an RGB separating circuit within the signal processing circuit 407 and is then logarithmically converted by the logarithmic amplifier the same as shown in FIG. 2. Then, the signals for two sheets for each primary color are added to be a primary color signal having a dynamic range of 100 dB. Then, the brightness signal is compressed and the color difference signal is corrected in the logarithmic imaging processing circuit 409 within the signal processing circuit 407. The processed video signal is output from the reproducer and is displayed by the TV monitor.

In case the logarithmic imaging processing circuit is provided on the reproducer 402 side as in this embodiment, there is a feature that the gain and dynamic range of the picture image can be freely set in the reproducer 402 and even the picture image already recorded in the recording medium can be observed while changing the effect of the picture image.

In the above mentioned system, the capacity of the recording medium is required to be twice as large as normal but can be made smaller by compressing the data.

Figure 62:
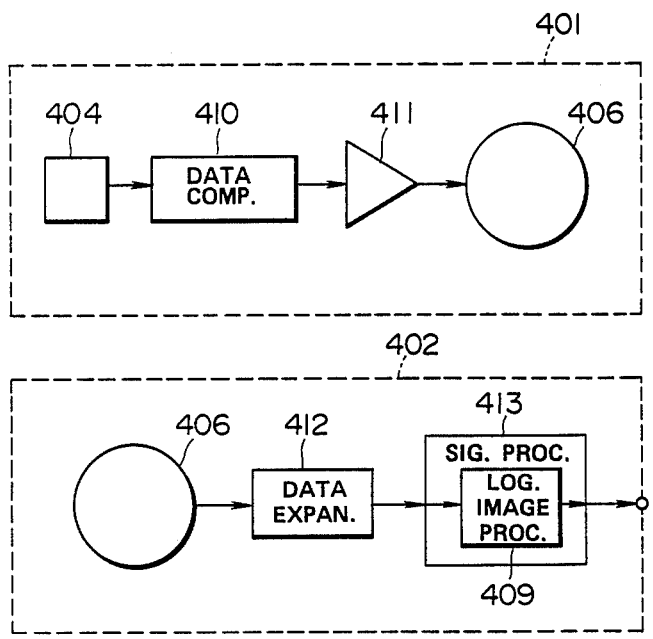
FIG. 62 is a formation diagram of the eighteenth embodiment of the present invention.

FIG. 62 shows the eighteenth embodiment of the present invention wherein the capacity of the recording medium may be small.

The signal output from the imaging device 404 within the reproducer 401 is compressed in a data compressing circuit 410 and is recorded in the recording medium through a recording amplifier 411. In the reproducer 402, the signal read out of the recording medium 406 is returned to the signal as of before the compression by a data extending or expansion circuit 412 and is then transmitted to a signal processing circuit 413. Here, by the logarithmic imaging processing circuit 409, the brightness signal is compressed and the color difference signal is compressed to obtain a video signal.

In this embodiment, the same as in the above mentioned 17th embodiment, a logarithmic imaging processing circuit is provided within the reproducer and therefore the gain and dynamic range of the picture image can be freely set. Also, a function converting circuit can be provided within the final step of the signal processing circuit 407 to vary the brightness signal. Thereby, the brightness signal can be not only logarithmically compressed but also set to have the best effect in reproducing the picture image.

Figure 63:
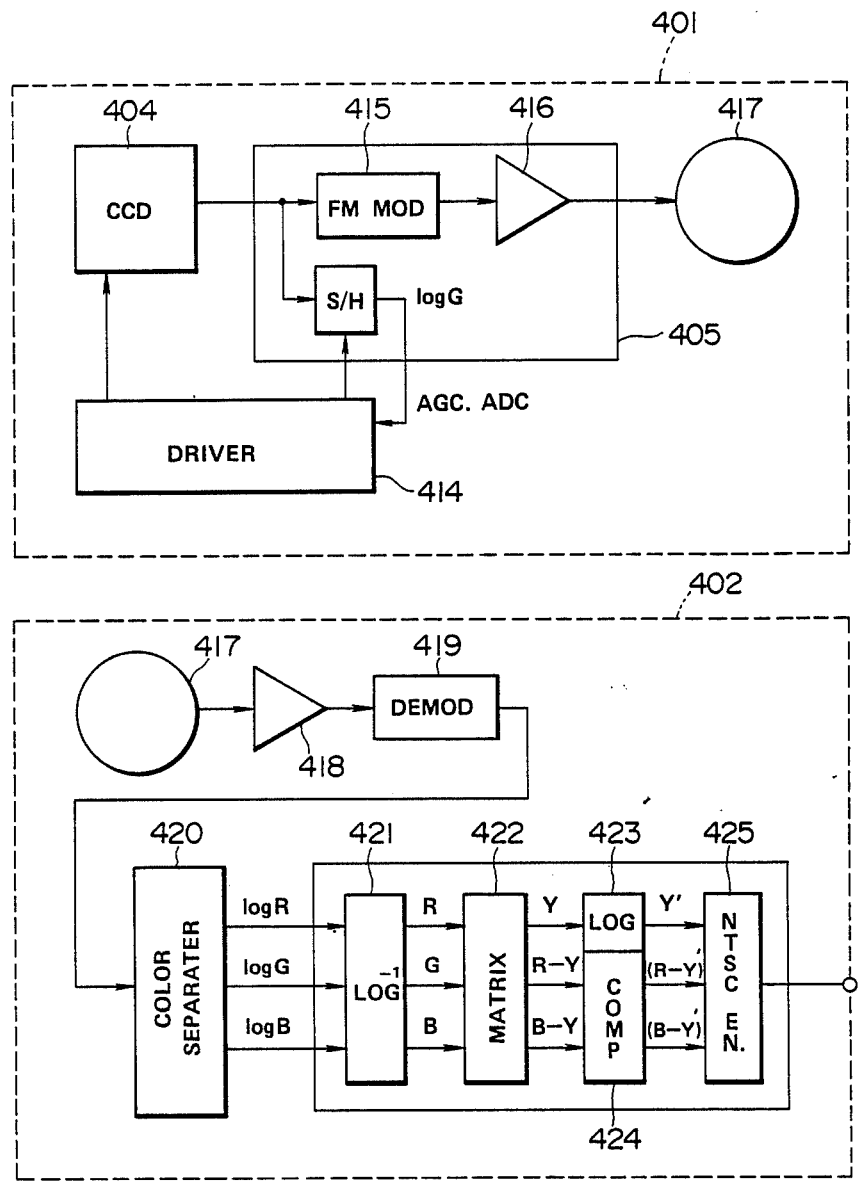
FIG. 63 is a formation diagram of the nineteenth embodiment of the present invention wherein only the logarithmic compression is made in an imaging device.

The nineteenth embodiment provided with a logarithmic imaging processing circuit as divided into an imager and a reproducer shall be explained in the following. Various concrete examples can be considered on such case. FIG. 63 shows an example of only logarithmically compressing the signal in the imager.

A logarithmic amplifier can be used for the logarithmic compression. However, it is advantageous in respect of S/N to carry out the logarithmic compression with the imaging device itself. In FIG. 63, in the imager 401, the imaging device 404 carrying out the logarithmic compression within it is located and its output is input into the signal processing circuit 405.

The reference numeral 414 represents a driving circuit driving the imaging device. As explained above, when the form of the pulse applied to the overflow drain of the imaging device 404 from the driving circuit 414 is varied, the gain and dynamic range will vary.

In the case of automatically carrying out this control, as described above, the signal of log Y is required. In the formation in FIG. 63, as the log & signal is output on the reproducer side, when the log G signal obtained from the imaging device is used instead of the log Y signal, the automatic gain control and automatic dynamic range control can be made practically enough.

The logarithmically compressed signal output from the imaging device is recorded in the recording medium, is FM modulated by an FM modulator within the signal processing circuit in case such recording medium as, for example, a magnetic disc is used, is amplified by the recording amplifier 416 and is written into the magnetic disc 417. By the way, in case the dynamic range is varied at the time of imaging, the signal showing the dynamic range is also recorded in the magnetic disc.

In the reproducer 402, the signal read out of the magnetic disc is amplified by the reproducing amplifier 418, is returned to the original signal by an FM modulator 419 and is further separated into signals of log R, log G and log B by a color separating circuit 420. These signals are converted to linear signals by an inverse-logarithmic amplifier 421. However, by referring to the recorded dynamic range at this time, a proper inverse conversion must be made. The inverse-logarithmic amplifier can be made of a formation of such floating point system as is described, for example, in the above. The R, G and B signals having become linear signals are converted to a brightness signal Y and color difference signals R−Y and B−Y. Then, the brightness signal is again logarithmically compressed by a logarithmic amplifier 423. The compressed degree at this time may be of the same value as of the above mentioned compressed degree at the time of imaging or may be properly set while seeing the effect of the reproduction of the picture image.

The color difference signals R−Y and B−Y are multiplied by log Y/Y by a correcting or compensating circuit 424 to be visually corrected. These processed signals Y', (R−Y)' and (B−Y)' are converted to NTSC signals by an encoder 425 and output to a monitor.

Figure 64:
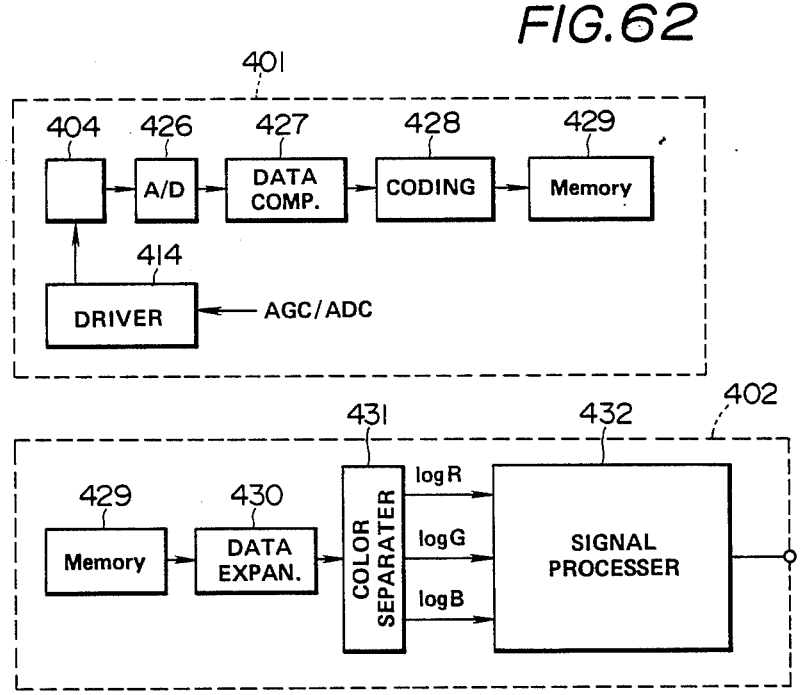
FIG. 64 is a formation diagram of the twentieth embodiment of the present invention wherein an IC memory is used for the recording medium.

FIG. 64 shows the twentieth embodiment of the present invention. In this embodiment, an IC memory is used for the recording medium. In the imager 401, the signal output from the imaging device 4304 is converted to a digital value by an A/D converter 426. Here, the same as in the above, it is preferable to apply a signal compressing pulse to the imaging device 404 from the driving circuit 414 so that the output may have a logarithmic characteristic. In this case, if the quantizing bits of the A//d converter 426 are 8 bits, a signal of 48 dB can be recorded. However, in order that the quantizing error may not be conspicuous in the case of later observing only the picture image in a narrow light amount range on the reproducer side, it is preferable to provide the quantizing bits to be 10 to 12 bits. After the data amount is reduced by a data compressing circuit 427 and encoding circuit 428, the video signal converted to a digital value is recorded in an IC memory 429.

In the reproducer 402, the signal output from the IC memory 429 is recovered to the original signal by a data extending circuit 430 and is then separated into signals of log R, log G and log B by a color separating circuit 431. These signals are then converted to linear signals within a signal processing circuit 432 and are converted to brightness and color difference signals by a matrix operation. Further, the brightness signal is compressed and the color difference signals are corrected. Then, the signals are output as video signals. By the way, in the process in the above reproducer, as the signal is obtained as a digital value from the IC memory, the process can be continued as it is by a digital operation. However, even in that case, the finally output video signal is made an analogue signal by the D/A converter.

By the way, in the apparatus shown, for example, in FIG. 56, the signals imaged respectively at illumination intensities of 1:300 can be displayed alternately frame by frame by the monitor.

By the way, in the case of the logarithmic compression, the color difference signals log (R−Y) and log (B−Y) are multiplied log Y/Y so that color tone may not displace. However, the color tone can be strengthened by making this ratio variable.

Figure 65:
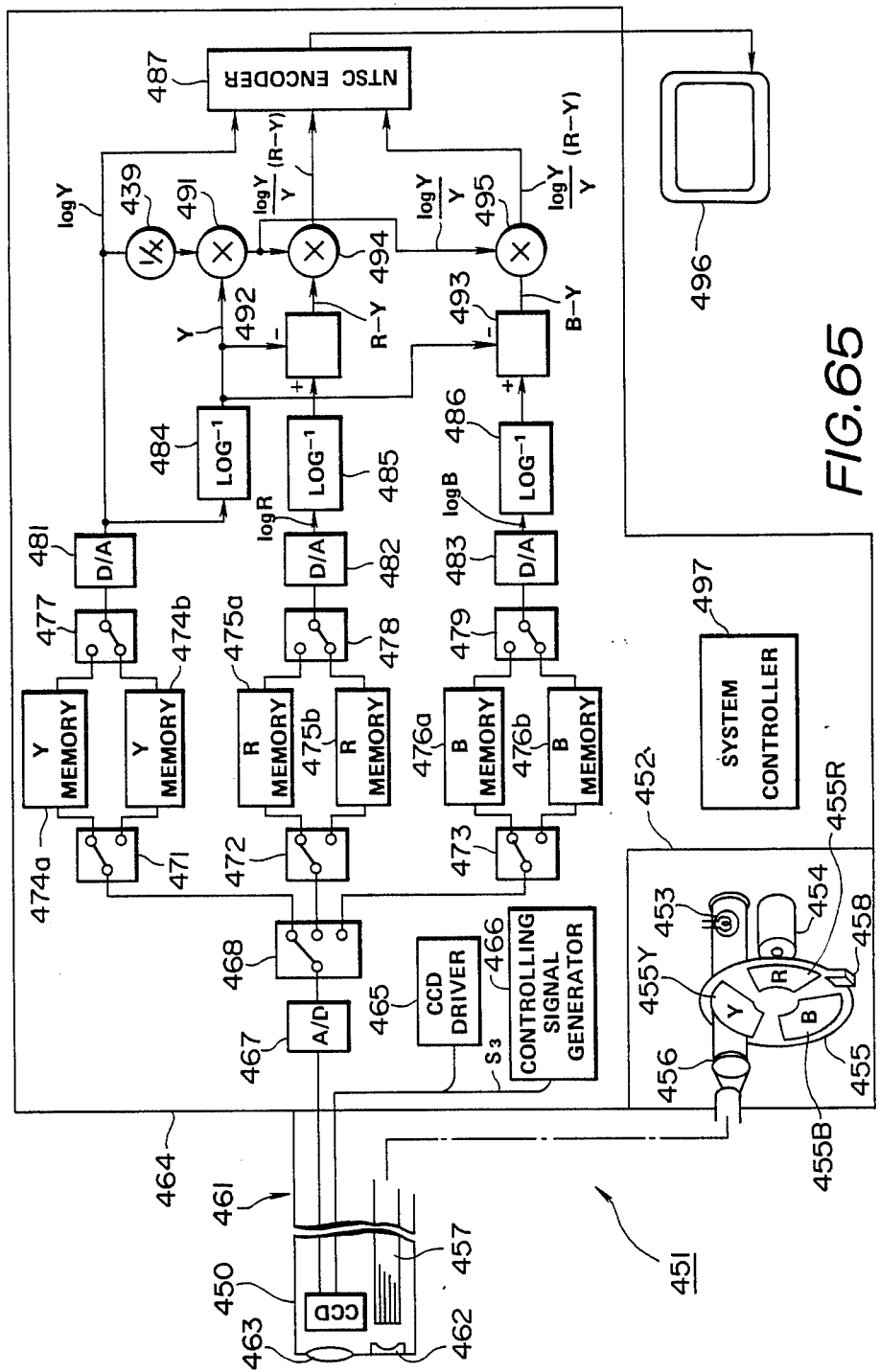
FIG. 65 is a formation diagram of an electronic endoscope apparatus of the twenty-first embodiment of the present invention.

Now, as shown in FIG. 65, an electronic endoscope 451 can be formed by using a device interior logarithmically compressed CCD 450 (shown, for example, in FIG. 18).

In such case, a field sequential type light source device 452 is used for the illuminating light. The white light of a light source lamp 453 is made field sequential lights of Y, R and B by a color rotary filter 455 rotated by a motor 455. The lights are condensed and radiated onto a light guide 457 through a condenser lens 456.

The above mentioned color rotary filter 455 is formed of a brightness filter 455Y (made by combining color filters, for example, of R, G and B at an area ratio of 0.3:0.59:0.11), R filter 455R and B filter 455B. By the way, the rotating position of the color rotary filter 455 is detected, for example, by a rotating position sensor 458.

The illuminating light radiated onto the incident end surface of the above mentioned light guide 457 is emitted toward an object to be imaged through an illuminating lens 462 from the emitting end surface on the tip side of an electronic scope 462 and forms an image in a CCD 450 whose light receiving part is arranged on the focus plane of an image forming lens 463 by the image forming lens 463. As a driving signal for reading out the signal is applied to the CCD 450 from a driving circuit 465 within a signal processing device 464, a photoelectrically converted signal is output.

Therefore, a logarithmic compression controlling signal $S_3$ is applied, for example, to the overflow drain gate of this CCD 450 from a control signal generating circuit 466 (shown, for example, in FIG. 23) at the time of receiving each field sequential light and a logarithmically compressed signal is output from this CCD 450.

The signal output from the above mentioned CCD 450 is converted to digital data by an A/D converter 467 and is led to a selected contact in a multiplexer 468. Three sets of switches 471, 472 and 473 are provided on the output contact side of this multiplexer 468, pairs of memories 474a and 474b; 475a and 475b; and 476a and 476b are connected to the respective two contacts and the output terminals of these pairs of memories 474a and 474b; 475a and 475b; and 476a and 476b are connected respectively to the two contacts of switches 477, 478 and 479.

Switches 471 and 477 respectively on the input side and output side of the above mentioned memories 474a and 474b are alternately switched so as to select memories different from each other and are of a dual port memory structure in which data can be written in and read out nonsynchronously. The other memories 475a and 475b; and 476a and 476b are also made the same.

In the case of a brightness illuminating light having passed, for example, through the brightness filter 355 Y, the illustrated contact is selected in the multiplexer 468 and the signal read out of the CCD 450 is written into the memory 474a on one side through the switch 471. In this case, from the memory 474b on the other side, the data written in before one frame period are read out through the switch 477. This reading out is made simultaneously also from the other memories 475b and 476b. The data are made respectively analogue signals, that is, log Y, log R and log B signals by D/A converters 481, 482 and 483. These respective signals are passed respectively through inverse-logarithmic amplifying circuits 484, 485 and 486 to be Y, R and B signals.

The above mentioned log Y signal is input directly into an NTSC encoder 487, is input into a divider 489 and has 1 divided by log Y to produce a signal of 1/log Y. This 1/log Y signal is multiplied by the Y signal by a multiplier 491 to produce a log Y/Y signal.

On the other hand, the above mentioned R and B signals are input into subtracters 492 and 493 and the above mentioned signal is subtracted to produce color difference signals of R−Y and B−Y. These R−Y and B−Y signals are input respectively into multipliers 494 and 495 and are multiplied by the above mentioned log Y/Y to produce (R−Y) log Y/Y and (B−Y) log Y/Y signals. These signals are input into the NTSC encoder 487, are converted to NTSC composite video signals and are displayed by a monitor 496. By the way, the memory reading and writing are controlled by a system controller.

According to this embodiment, as the signal logarithmically compressed in the CCD 451 itself can be output, the color imaging part can be made small and is adapted to an endoscope required to be small. As the brightness filter 455Y is used for the illuminating means, the formation of the signal processing system can be simplified.

By the way, a partial combination of the respective embodiments also belongs to the present invention.

Figure 66:
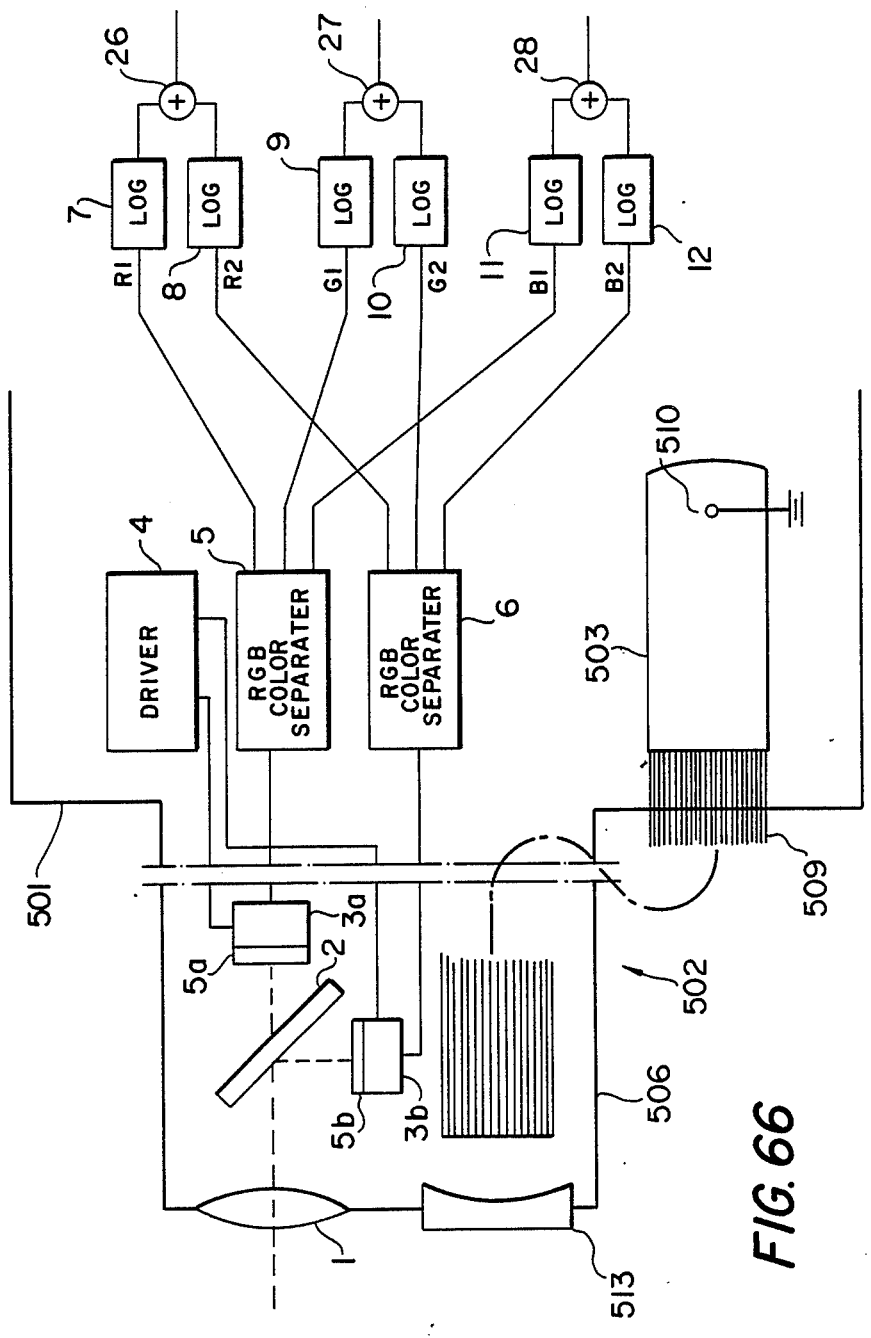
FIG. 66 shows the apparatus of FIG. 2 housed in the tip part of an electronic endoscope.

For example, FIG. 66 shows an electronic endoscope apparatus 501 incorporating the apparatus of the first embodiment of the invention as shown in FIGS. 2 and 3. In this embodiment, the image forming lens 1, half-silvered mirror 2 and imaging devices 3a and 3b are mounted in the tip part 506 of an electronic endoscope 502. The apparatus also includes a light guide 509 to conduct light from lamp 510 of light source 503 to the tip part 506 to be projected through illuminating lens 513. The remainder of the apparatus is as described with respect to FIGS. 2 and 3.

What is claimed is:

1. A logarithmic color imaging apparatus comprising:
    an imaging device for converting a light image of an object to at least one electric output signal;
    a color separating means for separating each output signal of said imaging device into separate output signals for different primary colors or auxiliary colors;
    a first logarithmic compressing means for logarithmically compressing the output signals of said color separating means for the different primary colors or auxiliary colors;
    an inverse-logarithmic converting means for inverse-logrithmically converting output signals of said first logarithmic compressing means;

a matrix-converting means for linear-matrix-converting output signals of said inverse-logarithmic converting means;

a second logarithmic compressing means for logarithmically compressing output signals of said matrix-converting means; and a color signal compounding means for producing a logarithmically compressed brightness signal from output signals of said second logarithmic compressing means.

2. An apparatus according to claim 1 wherein said imaging device comprises an image forming lens, a beam splitter arranged on an optical axis on an output light side of said image forming lens and having different light distribution ratios and a pair of imaging devices for receiving respective lights distributed by said beam splitter, wherein each imaging device produces one electric output signal.

3. An apparatus according to claim 1 wherein said imaging device has a color separating color filter fitted in a light receiving part.

4. An apparatus according to claim 1 wherein said color separating means is a color filter means provided in said imaging device and a color separating circuit for extracting separate color-separated color output signals from each output signal of said imaging device.

5. An apparatus according to claim 1 wherein said inverse-logarithmic converting means comprises an averaging circuit for taking in the output signals of said first logarithmic compressing means and determining the average value of said output signals, a subtractor for subtracting said average value from the output signals of the first logarithmic compressing means, a window circuit for passing output signals of the subtractor within a predetermined level range having said average value as a center value and an inverse-logarithmic amplifying circuit for making output signals of the window circuit have an inverse-logarithmically converted characteristic over said predetermined level range.

6. An apparatus according to claim 1 wherein said inverse-logarithmic converting means comprises a maximum signal detecting circuit for taking in the output signals of said first logarithmic compressing means and detecting the maximum signal level of said output signals at a high speed, a window circuit for passing the output signals of the first logarithmic compressing means within a predetermined level range having the maximum signal level detected by said maximum signal detecting circuit as a upper value and a signal level a predetermined level below the maximum signal level as a lower value, and an inverse-logarithmic amplifying circuit for making output signals of the window circuit have an inverse-logarithmically converted characteristic over the predetermined level range.

7. A logarithmic color imaging apparatus comprising:
a field sequential type illuminating means for sequentially illuminating an object with light of a plurality of different colors;
an imaging device for converting a light image of said object to at least one electric output signal in coordination with said field sequential type illuminating means;
a memory means for switching each signal of said imaging device in synchronism with said field sequential type illuminating means to produce separate output signals for the different colors and memorizing the same;
a first logarithmic compressing means for logarithmically compressing output signals of said memory means;
an inverse-logarithmic converting means for inverse-logarithmically converting output signals of said first logarithmic compressing means;
a matrix-converting means for linear-matrix-converting output signals of said inverse-logarithmic converting means;
a second logarithmic compressing means for logarithmically compressing output signals of said matrix-converting means; and
a color signal compounding means for producing a logarithmically compressed brightness signal from output signals of said second logarithmic compressing means.

8. An apparatus according to claim 1 or 7 wherein said imaging device comprises an image forming lens and a single imaging device arranged on the focus plane of said image forming lens.

9. An apparatus according to claim 1 or 7 wherein the imaging device converts the light image of the object into at least two electric output signals each representing a different range of light levels, and wherein said first logarithmic compressing means is logarithmic amplifier means for amplifying the output signals with an approximately logarithmic characteristic and adder means for adding together the output signals for the same color representing the different ranges of light levels.

10. An apparatus according to claim 1 or 7 wherein said color signal compounding means comprises a brightness logarithmic compressing circuit for logarithmically compressing a brightness signal produced from the output signals of said second logarithmic compressing means and a standardizing circuit for imparting a compression factor equal to the degree of compression of said brightness logarithmic compressing circuit applied to color difference signals produced from output signals of said second logarithmic compressing means.

11. An apparatus according to claim 1 or 2 wherein said color signal compounding means has a gain adjusting means for adjusting the gain of the logarithmically compressed brightness signal.

12. An apparatus according to claim 11 wherein said gain adjusting means has a means for manually setting the gain.

13. An apparatus according to claim 11 wherein said gain adjusting means has an automatic gain adjusting means for holding the gain at a reference value.

14. An apparatus according to claim 1 or 7 wherein said color signal compounding means has a dynamic range controlling means for controlling the dynamic range of the logarithmically compressed brightness signal.

15. An apparatus according to claim 14 wherein said dynamic range controlling means has a means for manually setting the dynamic range.

16. An apparatus according to claim 14 wherein said dynamic range controlling means has means for producing a standard deviation value of the logarithmically compressed brightness signal and has an automatic dynamic range controlling means for holding said standard deviation value fixed relative to a dynamic range reference value.

17. An apparatus according to claim 1 or 2 wherein said color signal compounding means has a gamma correcting means for correcting the gamma of color difference signals produced from the output signals of the second logarithmic compressing means.

18. A logarithmic compression characteristic color imaging apparatus comprising an imaging device including a pair of color imaging devices for converting a light image to electric output signals, a pair of RGB separating circuits for separating the output signals of said pair of color imaging devices into three primary color signals and a logarithmic amplifying means for amplifying the color signals such that they have an approximately logarithmic characteristic.

19. An apparatus according to any of claim 1, 7, or 18 wherein said imaging device is housed in the tip part of an insertable part in an electronic endoscope.

20. A logarithmically compressed color signal processing apparatus comprising:
- a first logarithmic compressing means for logarithmically compressing input color signals for respective primary colors or auxiliary colors;
- an inverse-logarithmic converting means for inverse-logarithmically converting output signals of said first logarithmic compressing means;
- a matrix-converting means for linear-matrix-converting output signals of said inverse-logarithmic converting means;
- a second logarithmic compressing means for logarithmically compressing output signals of said matrix-converting means; and
- a color signal compounding means for producing a logarithmically compressed brightness signal from output signals of said second logarithmic compressing means.

21. An electronic camera reproducer comprising:
- a first logarithmic compressing means for logarithmically compressing signals for respective primary colors of a video signal recorded in a recording medium;
- an inverse-logarithmic converting means for inverse-logarithmically converting output signals of said first logarithmic compressing means;
- a matrix-converting means for linear-matrix-converting output signals of said inverse-logarithmic converting means;
- a second logarithmic compressing means for logarithmically compressing output signals of said matrix-converting circuit; and
- a color signal compounding means for compounding output signals of said second logarithmic compressing circuit and output signals of said first logarithmic compressing circuit.

* * * * *